(12) United States Patent
Hsiao et al.

(10) Patent No.: US 12,514,883 B2
(45) Date of Patent: Jan. 6, 2026

(54) COMPOSITIONS AND METHODS FOR MODULATING LIPID AND STEROID METABOLISM

(71) Applicant: The Regents of the University of California, Oakland, CA (US)

(72) Inventors: Elaine Y. Hsiao, Los Angeles, CA (US); Thomas Fung, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 707 days.

(21) Appl. No.: 17/168,944

(22) Filed: Feb. 5, 2021

(65) Prior Publication Data

US 2021/0268036 A1    Sep. 2, 2021

Related U.S. Application Data

(63) Continuation of application No. PCT/US2020/021434, filed on Mar. 6, 2020.

(60) Provisional application No. 62/815,760, filed on Mar. 8, 2019.

(51) Int. Cl.
| | |
|---|---|
| *A61K 35/742* | (2015.01) |
| *A61K 9/00* | (2006.01) |
| *A61K 45/06* | (2006.01) |

(52) U.S. Cl.
CPC .......... *A61K 35/742* (2013.01); *A61K 9/0053* (2013.01); *A61K 45/06* (2013.01)

(58) Field of Classification Search
None
See application file for complete search history.

(56) References Cited

U.S. PATENT DOCUMENTS

| | | | |
|---|---|---|---|
| 2007/0116671 | A1 | 5/2007 | Prakash et al. |
| 2016/0151430 | A1 | 6/2016 | Honda et al. |
| 2019/0070225 | A1 | 3/2019 | Strandwitz et al. |
| 2019/0381113 | A1 | 12/2019 | Pamer et al. |

FOREIGN PATENT DOCUMENTS

| | | | | |
|---|---|---|---|---|
| WO | WO-0154681 A2 | * | 8/2001 | ............ A61K 31/00 |
| WO | WO-2004056324 A2 | * | 7/2004 | ........... C07D 471/04 |
| WO | WO-2013037068 A1 | * | 3/2013 | ............ A61K 35/74 |
| WO | WO-2016/011019 A1 | | 1/2016 | |
| WO | WO-2016/036615 A1 | | 3/2016 | |
| WO | WO-2017/123592 A1 | | 7/2017 | |
| WO | WO-2017/136795 A1 | | 8/2017 | |
| WO | WO-2017160711 A1 | * | 9/2017 | ............ A61K 35/74 |
| WO | WO-2018/042304 A1 | | 3/2018 | |
| WO | WO-2019/169143 A1 | | 9/2019 | |
| WO | WO-2020/185581 A2 | | 9/2020 | |
| WO | WO-2020/264390 A2 | | 12/2020 | |
| WO | WO-2023/114180 A1 | | 6/2023 | |

OTHER PUBLICATIONS

Pullman et al. Plos Biology, Oct. 2009, vol. 7, Issue 10, pp. 1-10.*
Bello et al. Drug Des Devel Ther. 2011; 5: 95-109.*
Kargbo et al. ACS Med. Chem. Lett. 2018, 9, 864-865.*
Abell et al. Journal of Psychosomatic Research 30(2): 143-146, 1986.*
Gershon et al., "The Serotonin Signaling System: From Basic Understanding To Drug Development for Functional GI Disorders," Gastroenterology, 132(1): 397-414 (2007).
International Search Report and Written Opinion for International Application No. PCT/US2020/021434 dated Nov. 12, 2021.
Bae et al., "Cardiac Arrest Associated With Psilocybin Use and Hereditary Hemochromatosis." Cureus 15(5) (2023): 1-5.
Neumann et al., "Cardiac roles of serotonin (5-HT) and 5-HT-receptors in health and disease." International Journal of Molecular Sciences 24(5) (2023): 4765.
Browne et al., "Culturing of 'unculturable' human microboita reveals novel taxa and extensive sporulation," Nature 533 (2016): 543-546.
Chiang et al., "Up to date on cholesterol 7 alpha-hydroxylase (CYP7A1) in bile acid synthesis." Liver research, 4.2: 47-63 (2020).
International Search Report and Written Opinion for International Application No. PCT/US22/52657 dated May 8, 2023.
Maki et al., "Bacterial succession and specialization within the poultry gastrointestinal tract." 2021. PhD Thesis. Iowa State University.
Yu et al., "Complex carbohydrate utilization by gut bacteria modulates host food preference." bioRxiv (2024).
Bosshard et al., "*Turicibacter sanguinis* gen. nov., sp. nov., a novel anaerobic, Gram-positive bacterium" International Journal of Systematic and Evolutionary Microbiology 52, 1263-1266 (2002).
Extended European Search Report for Application No. 20770191.3 dated Apr. 14, 2023.
Fung et al., "Intestinal seratonin and fluoxetine exposure modulate bacterial colonization in the gut" Nature Microbiology, 4: 2064-2073 (2019).

(Continued)

*Primary Examiner* — Oluwatosin A Ogunbiyi
(74) *Attorney, Agent, or Firm* — Foley Hoag LLP; David P. Halstead; Erin Foley

(57) ABSTRACT

Provided herein are methods and compositions related to promoting or reducing colonization of spore-forming bacteria in a patient's gut, comprising administering a serotonin receptor agonist or a selective serotonin reuptake inhibitor, respectively. In some aspects, provided herein are methods of modulating lipid and steroid metabolism.

22 Claims, 59 Drawing Sheets

Specification includes a Sequence Listing.

(56) References Cited

OTHER PUBLICATIONS

Yano et al., "Indigenous Bacteria from the Gut Microbiota Regulate Host Serotonin Biosynthesis" Cell, 161: 264-276 (2015).

* cited by examiner

Figure 7A

Bacterial pre-treatment only

SEQUENCE LISTING

```
<160> NUMBER OF SEQ ID NOS: 3

<210> SEQ ID NO 1
<211> LENGTH: 26
<212> TYPE: DNA
<213> ORGANISM: Artificial Sequence
<220> FEATURE:
<223> OTHER INFORMATION: Description of Artificial Sequence: Synthetic
      probe

<400> SEQUENCE: 1
gcayctttaa actttcgtcc tatccg                                           26

<210> SEQ ID NO 2
<211> LENGTH: 522
<212> TYPE: PRT
<213> ORGANISM: Homo sapiens

<400> SEQUENCE: 2

Gln Gly Glu Arg Glu Thr Trp Gly Lys Lys Val Asp Phe Leu Leu Ser
1               5                   10                  15

Val Ile Gly Tyr Ala Val Asp Leu Gly Asn Val Trp Arg Phe Pro Tyr
            20                  25                  30

Ile Cys Ala Gln Asn Gly Gly Ala Phe Leu Leu Pro Tyr Thr Ile
        35                  40                  45

Met Ala Ile Phe Gly Gly Ile Pro Leu Phe Tyr Met Glu Leu Ala Leu
    50                  55                  60

Gly Gln Tyr His Arg Asn Gly Cys Ile Ser Ile Trp Arg Lys Ile Cys
65                  70                  75                  80
```

```
Pro Ile Phe Lys Gly Ile Gly Tyr Ala Ile Cys Ile Ala Phe Tyr
                85              90              95
Ile Ala Ser Tyr Tyr Asn Thr Ile Met Ala Trp Ala Leu Tyr Leu
            100             105             110
Ile Ser Ser Phe Thr Asp Gln Leu Pro Trp Thr Ser Cys Lys Asn Ser
            115             120             125
Trp Asn Thr Gly Asn Cys Thr Asn Tyr Phe Ser Glu Asp Asn Ile Thr
130             135             140
Trp Thr Leu His Ser Thr Ser Pro Ala Glu Glu Phe Tyr Thr Arg His
145             150             155             160
Val Leu Gln Ile His Arg Ser Lys Gly Leu Gln Asp Leu Gly Gly Ile
                165             170             175
Ser Trp Gln Leu Ala Leu Cys Ile Met Leu Ile Phe Thr Val Ile Tyr
            180             185             190
Phe Ser Ile Trp Lys Gly Val Lys Thr Ser Gly Lys Val Val Trp Val
            195             200             205
Thr Ala Thr Phe Pro Tyr Ile Ala Leu Ser Val Leu Leu Val Arg Gly
210             215             220
Ala Thr Leu Pro Gly Ala Trp Arg Gly Val Leu Phe Tyr Leu Lys Pro
225             230             235             240
Asn Trp Gln Lys Leu Leu Glu Thr Gly Val Trp Ile Asp Ala Ala Ala
            245             250             255
Gln Ile Phe Phe Ser Leu Gly Pro Gly Phe Gly Val Leu Leu Ala Phe
            260             265             270
Ala Ser Tyr Asn Lys Phe Asn Asn Asn Cys Tyr Gln Asp Ala Leu Val
            275             280             285
Thr Ser Val Val Asn Cys Met Thr Ser Phe Val Ser Gly Phe Val Ile
290             295             300
Phe Thr Val Leu Gly Tyr Met Ala Glu Met Arg Asn Glu Asp Val Ser
305             310             315             320
Glu Val Ala Lys Asp Ala Gly Pro Ser Leu Leu Phe Ile Thr Tyr Ala
                325             330             335
Glu Ala Ile Ala Asn Met Pro Ala Ser Thr Phe Phe Ala Ile Ile Phe
            340             345             350
Phe Leu Met Leu Ile Thr Leu Gly Leu Asp Ser Ser Phe Ala Gly Leu
            355             360             365
Glu Gly Val Ile Thr Ala Val Leu Asp Glu Phe Pro His Val Trp Ala
            370             375             380
Lys Arg Arg Glu Arg Phe Val Leu Ala Val Val Ile Thr Cys Phe Phe
385             390             395             400
Gly Ser Leu Val Thr Leu Thr Phe Gly Gly Ala Tyr Val Val Lys Leu
            405             410             415
Leu Glu Glu Tyr Ala Thr Gly Pro Ala Val Leu Thr Val Ala Leu Ile
            420             425             430
Glu Ala Val Ala Val Ser Trp Phe Tyr Gly Ile Thr Gln Phe Cys Arg
            435             440             445
Asp Val Lys Glu Met Leu Gly Phe Ser Pro Gly Trp Phe Trp Arg Ile
450             455             460
Cys Trp Val Ala Ile Ser Pro Leu Phe Leu Phe Ile Ile Ala Ser
465             470             475             480
Phe Leu Met Ser Pro Pro Gln Leu Arg Leu Phe Gln Tyr Asn Tyr Pro
            485             490             495
Tyr Trp Ser Ile Ile Leu Gly Tyr Ala Ile Gly Thr Ser Ser Phe Ile
```

```
                    500                 505                 510
Cys Ile Pro Thr Tyr Ile Ala Tyr Arg Leu
            515                 520

<210> SEQ ID NO 3
<211> LENGTH: 489
<212> TYPE: PRT
<213> ORGANISM: Turicibacter sanguinis

<400> SEQUENCE: 3

Met Ala Arg Gln Gln Trp Ser Ser Arg Ser Thr Phe Ile Met Ala Ala
1               5                   10                  15

Ile Gly Ser Ala Val Gly Leu Gly Asn Ala Trp Arg Phe Pro Gly Ile
            20                  25                  30

Ala Tyr Ala Asn Gly Gly Gly Ala Phe Leu Ile Pro Tyr Phe Val Ala
        35                  40                  45

Leu Leu Thr Ala Gly Ile Pro Leu Leu Ala Leu Glu Leu Ser Ile Gly
    50                  55                  60

Lys Lys Tyr Gln Ser Gly Ala Pro Ser Ala Phe Ala Lys Met Asn Lys
65                  70                  75                  80

Lys Phe Glu Trp Ile Gly Trp Trp Gly Val Gly Thr Ala Phe Cys Ile
                85                  90                  95

Cys Ala Tyr Tyr Ser Val Val Val Ala Trp Val Ile Glu Tyr Val Ala
            100                 105                 110

Leu Ser Phe Lys Ser Pro Trp Ile Glu Lys Gly Ala Ala Asp Ile Phe
        115                 120                 125

Thr Gly Asp Val Leu Gln Val Ser Ser Gly Met Phe Asp Phe Gly Gly
    130                 135                 140

Phe Ser Pro Val Val Phe Leu Ala Leu Ile Phe Ala Trp Val Cys Ile
145                 150                 155                 160

Trp Tyr Cys Ile Arg His Gly Val Thr Ser Val Gly Lys Val Val Lys
                165                 170                 175

Tyr Thr Val Ile Leu Pro Val Ile Leu Leu Val Phe Leu Ile Ile Arg
            180                 185                 190

Ala Met Thr Leu Pro Gly Ala Phe Asp Gly Leu Ser Tyr Tyr Leu Val
        195                 200                 205

Pro Asp Trp Ser Ala Leu Leu Asp Ile Asn Val Trp Ala Ala Ala Tyr
    210                 215                 220

Gly Gln Ile Phe Phe Ser Leu Ser Ile Leu Phe Ser Ile Met Val Ala
225                 230                 235                 240

Tyr Gly Ser Tyr Leu Asn Lys Glu Ala Glu Val Thr Lys Asp Ala Met
                245                 250                 255

Ile Ile Gly Phe Ala Asp Ala Gly Ile Ser Phe Leu Ser Gly Ile Ala
            260                 265                 270

Ala Phe Gly Thr Leu Gly Tyr Leu Ser Ala Val Ser Gly Thr Pro Ile
        275                 280                 285

Ser Gln Met Lys His Thr Gly Ile Met Leu Ala Phe Val Thr Tyr Pro
    290                 295                 300

Glu Ala Leu Ala Gln Met Pro Gly Gly Arg Leu Val Val Ile Leu Phe
305                 310                 315                 320

Ser Leu Val Phe Phe Ile Met Leu Phe Thr Leu Ala Ile Asp Ser Ala
                325                 330                 335

Phe Ser Ile Val Glu Ala Ile Ile Thr Ala Val Val Asp Lys Phe Gly
            340                 345                 350
```

-continued

```
Trp Asn Lys Ser Lys Thr Thr Leu Trp Val Cys Val Ile Gly Phe Ala
        355                 360                 365

Ser Ser Leu Ile Phe Ala Thr Arg Ala Gly Leu Tyr Trp Leu Asp Val
    370                 375                 380

Val Asp His Phe Val Asn Asp Phe Asn Leu Ile Ala Ile Gly Phe Val
385                 390                 395                 400

Glu Cys Leu Ala Leu Gly Trp Val Phe Gly Ala Asp Asn Ile Arg Asp
                405                 410                 415

Tyr Leu Asn Ser Asn Thr Asp Phe Lys Tyr Gly Lys Trp Trp Ser Ala
            420                 425                 430

Cys Ile Lys Tyr Leu Cys Pro Val Ile Phe Leu Phe Ile Ser Val Thr
        435                 440                 445

Tyr Leu Ile Thr Asn Leu Thr Thr Pro Tyr Asp Gly Tyr Pro Val Ser
    450                 455                 460

Asn Leu Ile Ala Gly Gly Trp Gly Ile Val Leu Leu Thr Val Ile Phe
465                 470                 475                 480

Gly Ile Gly Ile Ser Leu Val Lys Gly
                485
```

COMPOSITIONS AND METHODS FOR MODULATING LIPID AND STEROID METABOLISM

RELATED APPLICATIONS

This application is a continuation application of International Patent Application No. PCT/US20/21434, filed Mar. 6, 2020; which claims the benefit of priority to U.S. Provisional Patent Application Ser. No. 62/815,760, filed Mar. 8, 2019, the contents of each of which are hereby incorporated herein by reference in their entirety.

GOVERNMENT SUPPORT

This invention was made with Government support under Grant Number OD017924, awarded by the National Institutes of Health. The Government has certain rights in the invention.

SEQUENCE LISTING

The instant application contains a Sequence Listing which has been submitted electronically in ASCII format and is hereby incorporated by reference in its entirety. Said ASCII copy, created on May 21, 2021, is named UCH-15801_SL.txt and is 9,334 bytes in size.

BACKGROUND

Animals have co-evolved with a diverse community of intestinal microorganisms that fundamentally influence host physiology, including core functions of the immune, metabolic and nervous systems. Many host-microbial interactions are mediated by bacterial production of a variety of chemical factors that are sensed by host epithelial, immune, endocrine and neuronal cells. While mechanisms for interkingdom signaling of microorganisms to their hosts have been described for many pathogenic bacteria, little is known regarding the signaling networks used by symbiotic gut bacteria to communicate with host cells and the downstream consequences of microbial-host signaling on the gut microbiota. New methods to modulate the microbiota are needed to regulate cellular function.

SUMMARY

The present invention is based, at least in part, on select bacteria indigenous to the gut microbiota that signal bidirectionally with the host serotonergic system to promote their colonization and fitness in the intestine. Elevating levels of intestinal luminal 5-HT by oral supplementation or genetic deficiency in the host 5-HT transporter (SERT) increases the relative abundance of spore-forming members of the gut microbiota. Within this microbial community, *Turicibacter sanguinis* was identified as a gut bacterium that expresses a neurotransmitter sodium symporter-related protein with sequence and structural homology to mammalian SERT. *T. sanguinis* imports 5-HT through a mechanism that is inhibited by the selective 5-HT reuptake inhibitor, fluoxetine. 5-HT reduces the expression of sporulation factors and membrane transporters in *T. sanguinis*, which is reversed by fluoxetine exposure. Treating *T. sanguinis* with 5-HT or fluoxetine modulates its competitive colonization in the gastrointestinal tract of antibiotic-treated mice. In addition, fluoxetine reduces the membership of *T. sanguinis* in the gut microbiota of conventionally-colonized mice. Host association with *T. sanguinis* alters intestinal expression of multiple gene pathways, including those important for lipid and steroid metabolism, with corresponding reductions in host systemic triglyceride levels and inguinal adipocyte size.

In some aspects, methods for promoting colonization of spore-forming bacteria in a patient's gut are disclosed. Such methods include administering a serotonin receptor agonist. Numerous embodiments are further provided that can be applied to any aspect of the present invention described herein. For example, in some embodiments, the serotonin receptor agonist is administered orally, rectally, intravenously, intraperitoneally, or subcutaneously. In some embodiments, the spore-forming bacteria comprises *Turicibacter sanguinis*. Examples of the serotonin receptor agonist are 5-HT, psilocybin, psilocin, N,N-dimethyltryptamine, 5-methoxy-N,N-dimethyltryptamine, bufotenin, lysergic acid diethylamide, ergine (LSA), mescaline, 2,5-dimethoxy-4-bromophenethylamine, 25I-NBOMe, 3,4-methylenedioxyamphetamine, and 2,5-dimethoxy-4-methylamphetamine. In some embodiments, the spore-forming bacteria downregulates the expression of a gene in the patient's gut. Examples of the downregulated genes are Bpgm, Neat1, Atf3, Bhlhe40, Slc20a1, Cldn4, 1810011O10Rik, Fam84a, Ctss, Npc111, H2-BI, Fos, Ppfia3, Trdmt1, Plekhg6, Scd2, ENSMUSG00000104340, Mfsd7b, Id3, Ccng2, Cdc42se2, Rhou, P2ry2, Got1, Enc1, Mgam, Slc5a1, Ube2q1, Plekhf2, Dsg2, Pgpep1, 0610007P14Rik, Hmgcs1, Ipmk, Fam118a, Stx3, Peli1, Ptgr2, Rgp1, Scly, Dusp8, Ccdc116, Lss, Odf3b, Per3, Msmo1, Smim24, Tef, Sqle, Ldlr, Insig1, Fdft1, Sema3b, and Hmgcr. In some embodiments, the spore-forming bacteria upregulate the expression of a gene in the patient's gut. Examples of the upregulated genes are Pdzd2, Ahrr, Txnlp, Rgs1, Smoc1, Atp1b2, Nrg1, Il1r1, Pdrg1, Rexo2, ENSMUSG00000102160, ENSMUSG00000108064, Gramdfa, Ckm, Ckb, 8430408G22Rik, Flna, Myl9, Tagln, Acta2, Anxa6, Ptrf, Hspa1a, Banp, Hoxb6, Slc15a4, Ddit4, Hsp90ab1, Creld1, Fst, Il1rl1, Slc38a2, Dmrt3, Mocs2, and Atg1612.

In some aspects, methods for reducing colonization of spore-forming bacteria in a patient's gut are disclosed. Such methods include administering a selective serotonin reuptake inhibitor. Numerous embodiments are further provided that can be applied to any aspect of the present invention described herein. For example, in some embodiments, the selective serotonin reuptake inhibitor is administered orally, rectally, intravenously, intraperitoneally, or subcutaneously. In some embodiments, the spore-forming bacteria is *Turicibacter sanguinis*. Examples of the selective serotonin reuptake inhibitor are citalopram, escitalopram, fluoxetine, fluvoxamine, paroxetine, sertraline, dapoxetine, indalpine, zimelidine, alaproclate, centpropazine, cericlamine, femoxetine, ifoxetine, omiloxetine, panuramine, pirandamine, and seproxetine. In some embodiments, the spore-forming bacteria downregulates the expression of a gene in the patient's gut. Examples of the downregulated genes are Bpgm, Neat1, Atf3, Bhlhe40, Slc20a1, Cldn4, 1810011O10Rik, Fam84a, Ctss, Npc111, H2-BI, Fos, Ppfia3, Trdmt1, Plekhg6, Scd2, ENSMUSG00000104340, Mfsd7b, Id3, Ccng2, Cdc42se2, Rhou, P2ry2, Got1, Enc1, Mgam, Slc5a1, Ube2q1, Plekhf2, Dsg2, Pgpep1, 0610007P14Rik, Hmgcs1, Ipmk, Fam118a, Stx3, Peli1, Ptgr2, Rgp1, Scly, Dusp8, Ccdc116, Lss, Odf3b, Per3, Msmo1, Smim24, Tef, Sqle, Ldlr, Insig1, Fdft1, Sema3b, and Hmgcr. In some embodiments, the spore-forming bacteria upregulates the expression of a gene in the patient's gut. Examples of the upregulated genes are Pdzd2, Ahrr, Txnlp, Rgs1, Smoc1, Atp1b2, Nrg1, Il1r1, Pdrg1, Rexo2, ENSMUSG00000102160, ENSMUSG00000108064, Gramdfa, Ckm, Ckb, 8430408G22Rik, Flna, Myl9, Tagln, Acta2, Anxa6, Ptrf, Hspa1a, Banp, Hoxb6, Slc15a4, Ddit4, Hsp90ab1, Creld1, Fst, Il1rl1, Slc38a2, Dmrt3, Mocs2, and Atg1612.

In some aspects, methods for upregulating lipid and steroid metabolism by promoting colonization of spore-forming bacteria in a patient's gut are disclosed. Such methods include, administering a serotonin receptor agonist. Numerous embodiments are further provided that can be applied to any aspect of the present invention described herein. For example, in some embodiments, the serotonin receptor agonist is administered orally, rectally, intravenously, intraperitoneally, or subcutaneously. In some embodiments, the spore-forming bacteria is *Turicibacter sanguinis*. Examples of the serotonin receptor agonist are 5-HT, psilocybin, psilocin, N,N-dimethyltryptamine, 5-methoxy-N,N-dimethyltryptamine, bufotenin, lysergic acid diethylamide, ergine (LSA), mescaline, 2,5-dimethoxy-4-bromophenethylamine, 25I-NBOMe, 3,4-methylenedioxyamphetamine, or 2,5-dimethoxy-4-methylamphetamine.

In some aspects, methods for treating or inhibiting cardiovascular disease by promoting colonization of spore-forming bacteria in a patient's gut are disclosed, such methods include, administering a serotonin receptor agonist. Numerous embodiments are further provided that can be applied to any aspect of the present invention described herein. For example, in some embodiments, the serotonin receptor agonist is administered orally, rectally, intravenously, intraperitoneally, or subcutaneously. In some embodiments, the spore-forming bacteria is *Turicibacter sanguinis*. Examples of the serotonin receptor agonist are 5-HT, psilocybin, psilocin, N,N-dimethyltryptamine, 5-methoxy-N,N-dimethyltryptamine, bufotenin, lysergic acid diethylamide, ergine (LSA), mescaline, 2,5-dimethoxy-4-bromophenethylamine, 25I-NBOMe, 3,4-methylenedioxyamphetamine, and 2,5-dimethoxy-4-methylamphetamine. In some embodiments, the spore-forming bacteria downregulates the expression of a gene (such as Npc1l1) in the patient's gut. In some embodiments, the cardiovascular disease is arteriosclerosis, atherosclerosis, stroke, ischemia, endothelium dysfunctions, peripheral vascular disease, coronary heart disease, myocardial infarction, cerebral infarction, restenosis, dyslipidemia, dyslipoproteinemia, or hypertension.

In some aspects, methods for treating or inhibiting a metabolic disorder by promoting colonization of spore-forming bacteria in a patient's gut are disclosed. Such methods include administering a serotonin receptor agonist. Numerous embodiments are further provided that can be applied to any aspect of the present invention described herein. For example, in some embodiments, the serotonin receptor agonist is administered orally, rectally, intravenously, intraperitoneally, or subcutaneously. In some embodiments, the spore-forming bacteria is *Turici-bacter sanguinis*. Examples of the serotonin receptor agonist are 5-HT, psilocybin, psilocin, N,N-dimethyltryptamine, 5-methoxy-N,N-dimethyltryptamine, bufotenin, lysergic acid diethylamide, ergine (LSA), mescaline, 2,5-dimethoxy-4-bromophenethylamine, 25I-NBOMe, 3,4-methylenedioxyamphetamine, and 2,5-dimethoxy-4-methylamphetamine. In some embodiments, the spore-forming bacteria downregulates the expression of a gene (such as Insig1) in the patient's gut. In some embodiments, the metabolic disorder is type II diabetes, impaired glucose tolerance, insulin resistance, obesity, fatty liver, non-alcoholic steatohepatitis, or dyslipidemia.

In some aspects, methods for treating or inhibiting an intestinal inflammatory disease by promoting colonization of spore-forming bacteria in a patient's gut are disclosed. Such methods include administering a serotonin receptor agonist. Numerous embodiments are further provided that can be applied to any aspect of the present invention described herein. For example, in some embodiments, the serotonin receptor agonist is administered orally, rectally, intravenously, intraperitoneally, or subcutaneously. In some embodiments, the spore-forming bacteria is *Turicibacter sanguinis*. Examples of the serotonin receptor agonist are 5-HT, psilocybin, psilocin, N,N-dimethyltryptamine, 5-methoxy-N,N-dimethyltryptamine, bufotenin, lysergic acid diethylamide, ergine (LSA), mescaline, 2,5-dimethoxy-4-bromophenethylamine, 25I-NBOMe, 3,4-methylenedioxyamphetamine, and 2,5-dimethoxy-4-methylamphetamine. In some embodiments, the spore-forming bacteria upregulates the expression of a gene (such as Il1rl and Il1rl1) in the patient's gut. In some embodiments, the intestinal inflammatory disease is irritable bowel syndrome (IBS), Crohn's disease, inflammatory bowel disease (IBD), peptic ulcer disease, diarrhea, ileus, post-operative bowel dysmotility, collagenous lymphocytic colitis, vomiting, cyclic vomiting syndrome, chemotherapy-induced nausea and vomiting, radiation-induced nausea and vomiting, post-operative nausea and vomiting, or ulcerative colitis.

In some aspects, methods of treating hypercholesterolemia, hyperlipidemia, hyperlipoproteinemia or hepatic steatosis by promoting colonization of spore-forming bacteria in a patient's gut are disclosed. Such methods include administering a serotonin receptor agonist. Numerous embodiments are further provided that can be applied to any aspect of the present invention described herein. For example, in some embodiments, the hypercholesterolemia, hyperlipidemia, or hyperlipoproteinemia is congenital hypercholesterolemia, hyperlipidemia, or hyperlipoproteinemia. The hypercholesterolemia, hyperlipidemia, or hyperlipoproteinemia may be autosomal dominant hypercholesterolemia (ADH), familial hypercholesterolemia (FH), polygenic hypercholesterolemia, familial combined hyperlipidemia (FCHL), hyperapobetalipoprotememia, or small dense LDL syndrome (LDL phenotype B). The hypercholesterolemia, hyperlipidemia, hyperlipoproteinemia or hepatic steatosis may be acquired hypercholesterolemia, hyperlipidemia, or hyperlipoproteinemia. In some embodiments, the hypercholesterolemia, hyperlipidemia, hyperlipoproteinemia or hepatic steatosis is associated with diabetes mellitus, hyperlipidemic diet and/or sedentary lifestyle, obesity, metabolic syndrome, intrinsic or secondary liver disease, biliary cirrhosis or other bile stasis disorders, alcoholism, pancreatitis, nephrotic syndrome, endstage renal disease, hypothyroidism, iatrogenesis due to administration of thiazides, beta-blockers, retinoids, highly active antiretroviral agents, estrogen, progestins, or glucocorticoids.

In some aspects, methods of treating diseases, disorders, or syndromes associated with defects in lipid absorption or metabolism or caused by hyperlipidemia by promoting colonization of spore-forming bacteria in a patient's gut are disclosed. Such methods include administering a serotonin receptor agonist. In some aspects, methods of preventing and treating hepatic dysfunction associated with nonalcoholic fatty liver disease (NAFLD), steatosis-induced liver injury, fibrosis, cirrhosis, or non-alcoholic steatohepatitis (NASH) by promoting colonization of spore-forming bacteria in a patient's gut are disclosed. Such methods include administering a serotonin receptor agonist. Numerous embodiments are further provided that can be applied to any aspect of the present invention described herein. For example, in some embodiments, the serotonin receptor agonist is administered orally, rectally, intravenously, intraperitoneally, or subcutaneously. In some embodiments, the spore-forming bacteria is *Turicibacter sanguinis*. Examples of the serotonin receptor agonist are 5-HT, psilocybin, psilocin, N,N-dimethyltryptamine, 5-methoxy-N,N-dimethyltryptamine, bufotenin, lysergic acid diethylamide, ergine (LSA), mescaline, 2,5-dimethoxy-4-bromophenethylamine, 25I-NBOMe, 3,4-methylenedioxyamphetamine, and 2,5-dimethoxy-4-methylamphetamine. In some embodiments, the methods further comprises administering a spore-forming bacteria in a patient's gut. In some embodiments, the spore-forming bacteria comprises *Turicibacter sanguinis*.

BRIEF DESCRIPTION OF THE FIGURES

FIG. 1A shows fecal 5-HT levels from SPF mice orally supplemented with 5-HT or vehicle in drinking water (two-tailed, unpaired Student's t-test; n=6-8). FIG. 1B shows alpha-diversity of OTUs derived from 16S rDNA sequencing of feces following vehicle vs. 5-HT treatment (two-way ANOVA with Bonferroni, n=3-4). FIG. 1C shows taxonomic diversity of the fecal microbiota after vehicle vs. 5-HT treatment (n=3-4). FIG. 1D shows relative abundance of bacterial taxa in fecal microbiota after vehicle vs 5-HT treatment (two-way ANOVA with Kruskal-Wallis, n=3-4). FIG. 1E shows fecal 5-HT levels from SPF wild-type (WT), SERT$^{+/-}$ (HET) and SERT$^{-/-}$ (KO) mice. (one-way ANOVA with Bonferroni, n=13-15). FIG. 1F shows alpha-diversity of OTUs derived from 16S rDNA sequencing of feces from SERT-deficient mice relative to WT controls (n=10-12). FIG. 1G shows taxonomic diversity of the fecal microbiota after vehicle vs. 5-HT treatment (n=10-12). FIG. 1H shows relative abundance of bacterial taxa in fecal microbiota of SERT-deficient mice relative to WT controls (one-way ANOVA with Kruskal Wallis, n=10-12). FIG. 1I shows linear correlation between relative abundance of *Turicibacter* vs. Clostridiaceae in fecal microbiota from SERT-deficient mice vs. WT controls (n=13-15). (*p<0.05, p<0.01, **p<0.0001, n.s.=not statistically significant)

FIG. 2A shows colon tissue and fecal levels of 5-HT in mice that were conventionally colonized (SPF), germ-free (GF) or colonized with mouse-derived (m) or human-derived (h) spore-forming bacteria (Sp) (one-way ANOVA with Bonferroni, n=7-37). FIG. 2B shows fecal levels 5-HT in mice that are SPF, germ-free (GF) or colonized with mouse-derived (m) or human-derived (h) spore-forming bacteria (Sp) (one-way ANOVA with Bonferroni, n=6-10). FIG. 2C shows taxonomic diversity of the fecal microbiota of SPF, mSp- and hSp-colonized mice (n=3-4). FIG. 2D shows linear correlation between relative abundance of *Turicibacter* in the fecal microbiota and colon 5-HT levels (n=3-4). FIG. 2E shows linear correlation between relative abundance of *Turicibacter* in the fecal microbiota and fecal 5-HT (n=3-4). FIG. 2F shows levels of 5-HT in culture supernatant after 0, 12, 25 and 36 hours of *T. sanguinis* MOL361 growth in Schaedler broth supplemented with vehicle or 200 uM fluoxetine (two-way ANOVA with Bonferroni, n=3-4). FIG. 2G shows uptake by *T. sanguinis* exposed to vehicle (veh) or APP$^+$, either alone (APP) or with 200 μM 5-HT (+5-HT) or fluoxetine (+Flx) pretreatment for 30 min (one-way ANOVA with Bonferroni; test n=33, 33, 18 and 23 cultures, respectively). FIG. 2H shows representative images of *T. sanguinis* exposed to vehicle (Veh), APP, +5-HT or +Flx for 30 min (representing n=33, 33, 18 and 23 cultures, respectively). Scale bar denotes 20 um. FIG. 2I shows [$^3$H]5-HT uptake by *T. sanguinis* after pre-treatment with vehicle (Veh) or fluoxetine (+Flx) (one-way ANOVA with Bonferroni, n=6-9). Dotted line reflects background signal from non-specific binding of radiolabel to membrane filter. FIG. 2J shows top: Predicted structural model for the putative SERT homolog CUW_0748 in *T. sanguinis* MOL361 compared to hSERT. Bottom: qPCR product for CUW_0748 cDNA generated from *T. sanguinis* RNA relative to no-reverse transcriptase control (n=3). FIG. 2K left panel shows APP$^+$ uptake in *B. theta* expressing CUW_0748 or vector controls (pFD340) at 20 min after exposure to veh, APP or +5-HT (one-way ANOVA with Bonferroni test; n=7 cultures). FIG. 2K right panel shows representative images of APP$^+$ uptake in *B. theta* expressing CUW_0748 or pFD340 controls, with the brightness at 90% higher than that in FIG. 2L shows [$^3$H]5-HT uptake by *B. theta* expressing CUW_0748 or control vector (pFD340) (two-tailed unpaired Student's t-test, n=6). (*p<0.05, p<0.01, *p<0.001, ****p<0.0001, n.s.=not statistically significant).

FIG. 3A shows that differentially expressed genes in *T. sanguinis* MOL361 after 4 hr exposure to vehicle, 200 uM 5-HT, or 200 uM 5-HT with fluoxetine (Flx). Bolded numbers represent total differentially expressed genes. Numbers denote upregulated genes; numbers denote downregulated genes. Numbers in parentheses denote subsets of 5-HT-regulated genes that were further differentially expressed by exposure to Flx (n=3). FIG. 3B shows heatmap of differentially expressed genes (q<0.05) filtered by coefficient of variation <3 (n=3). FIG. 3C shows GO term enrichment analysis of genes differentially expressed by 5-HT (q<0.05) compared to vehicle control and by 5-HT+Flx compared to 5-HT. FIG. 3D shows protein network analysis of 54 differentially expressed genes (q<0.05) that were downregulated in *T. sanguinis* treated with 5-HT relative to vehicle. FIG. 3E shows protein network analysis of 257 differentially expressed genes (q<0.05) that were upregulated in *T. sanguinis* treated with 5-HT+Flx relative to 5-HT. FIG. 3F shows representative images of *T. sanguinis* treated for 4 h with vehicle, 200 μM 5-HT or 5-HT with Flx, and stained with FM 4-64 membrane dye and DAPI (n=3 cultures). Scale bars: 10 μm. FIG. 3G shows number of FM 4-64 puncta per area of *T. sanguinis* (one-way ANOVA with Bonferroni test; n=3 cultures). FIG. 3H shows viability of *T. sanguinis* after 4 h exposure to vehicle, 200 μM 5-HT or 5-HT with Flx (one-way ANOVA with Bonferroni test; n=3 cultures; P=0.9891 for the NS comparison). FIG. 3I shows representative FISH images of *T. sanguinis* (green) and intestinal epithelial cells (DAPI, blue) in small intestines from antibiotic-treated mice gavaged with *T. sanguinis* pretreated for 4 hr with vehicle, 200 uM 5-HT, or 200 uM 5-HT with Flx (n=9). Scale bar denotes 100 um. FIG. 3J shows *T. sanguinis* cell counts from FISH images of small intestines colonized with *T. sanguinis* (one-way ANOVA with Bonferroni, n=9). FIG. 3K shows relative abundance of *Turicibacter* measured by 16S rDNA sequencing of small intestinal lumenal contents (one-way ANOVA with Bonferroni, n=9). FIG. 3L shows taxonomic diversity based on 16S rDNA sequencing of fecal microbiota on day 7 of Flx treatment. FIG. 3M shows relative abundance of *Turici-*

*bacter* in feces from SPF mice at 0, 1, 4, and 7 days of oral gavage with 10 mg/kg fluoxetine (Flx) (two-way ANOVA with Bonferroni, n=9-18). (*p<0.05, p<0.01, *p<0.001, n.s.=not statistically significant).

Figure 4A:
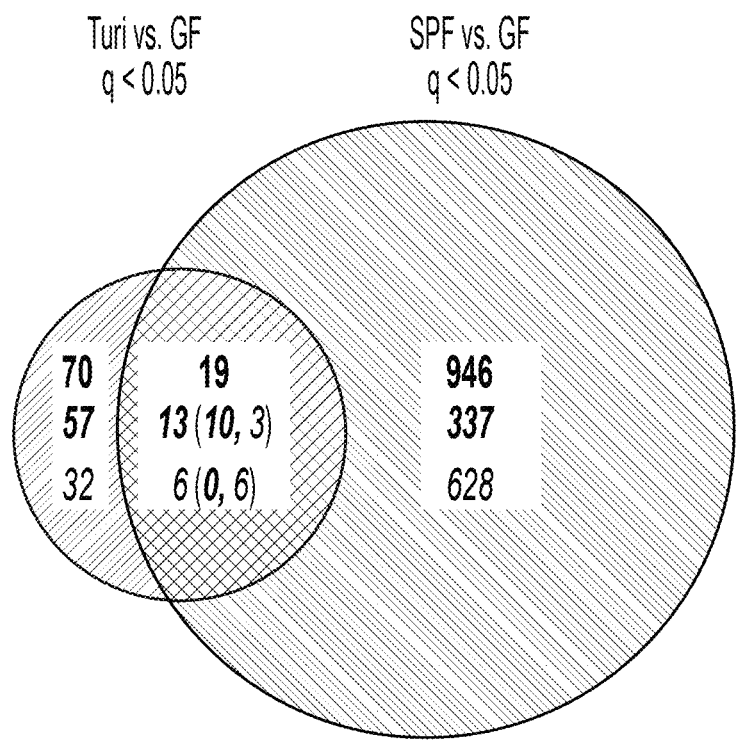
Figure 4B:
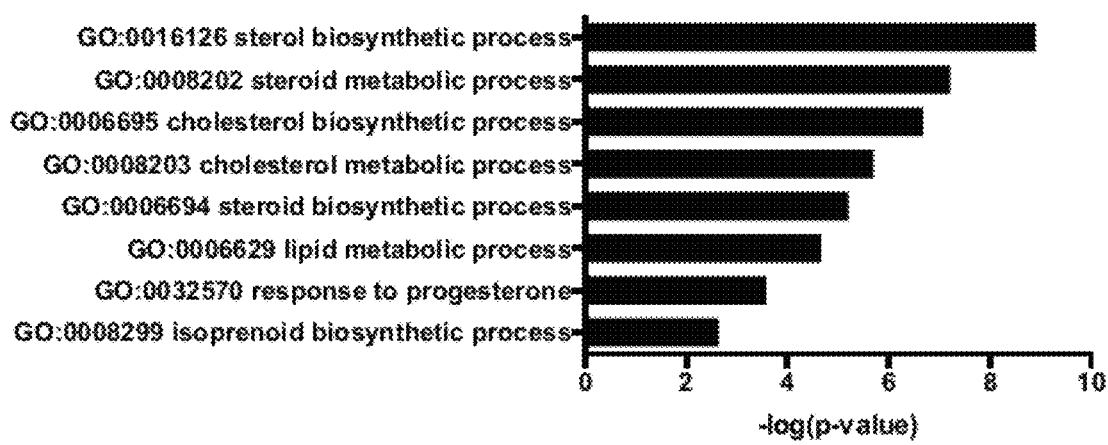
Figure 4C:
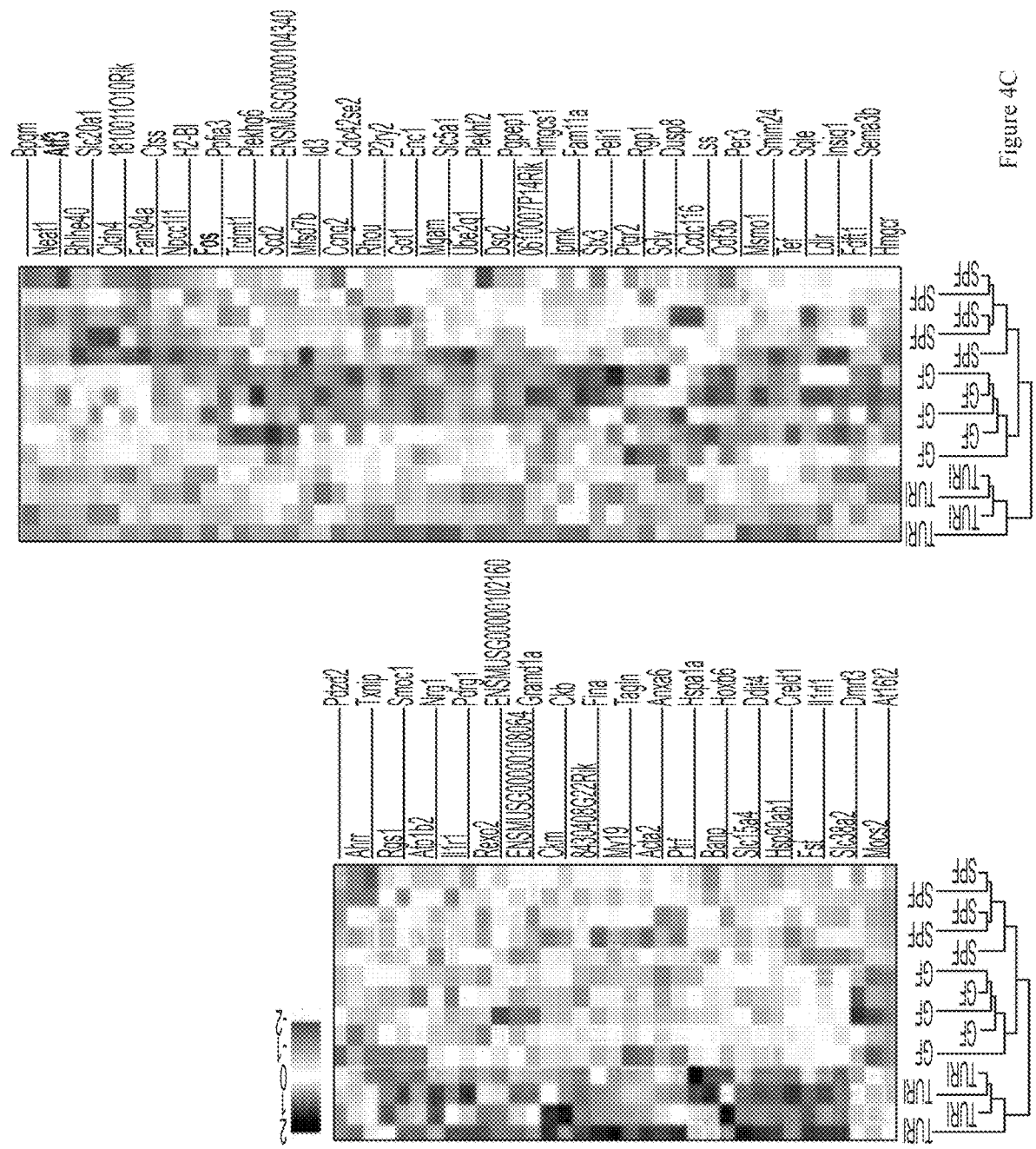
Figure 4D:
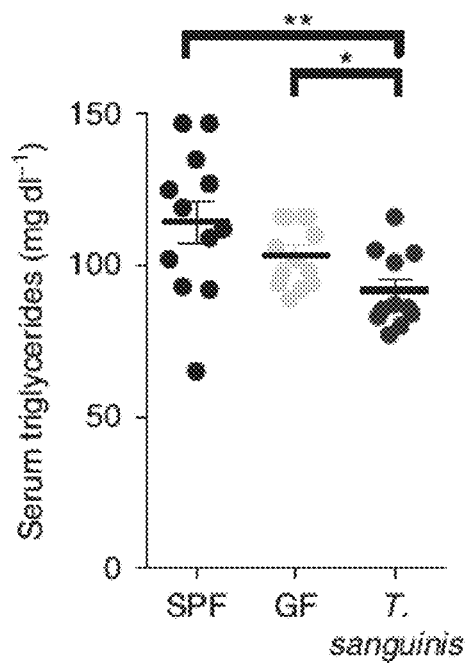
Figure 4E:
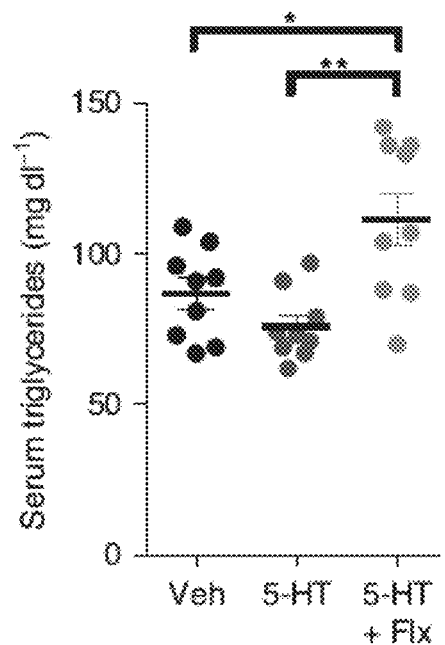
Figure 4F:
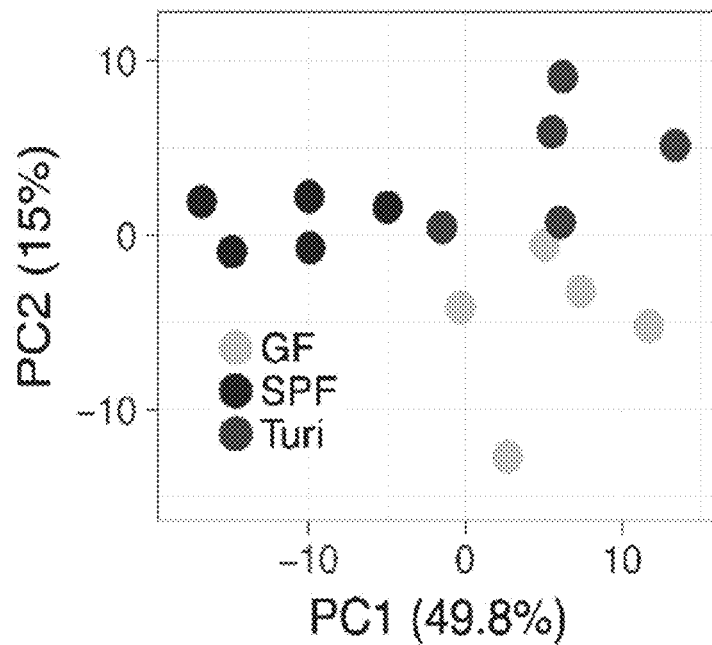
Figure 4G:
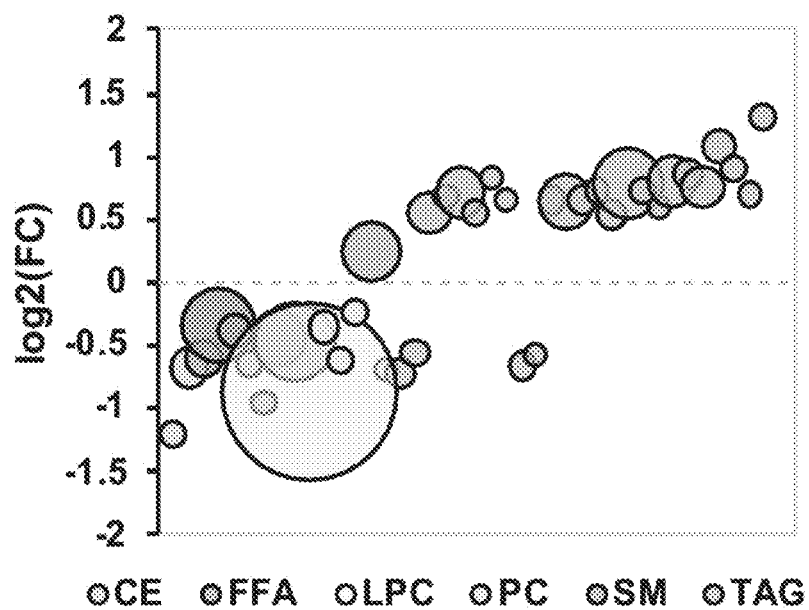
Figure 4H:
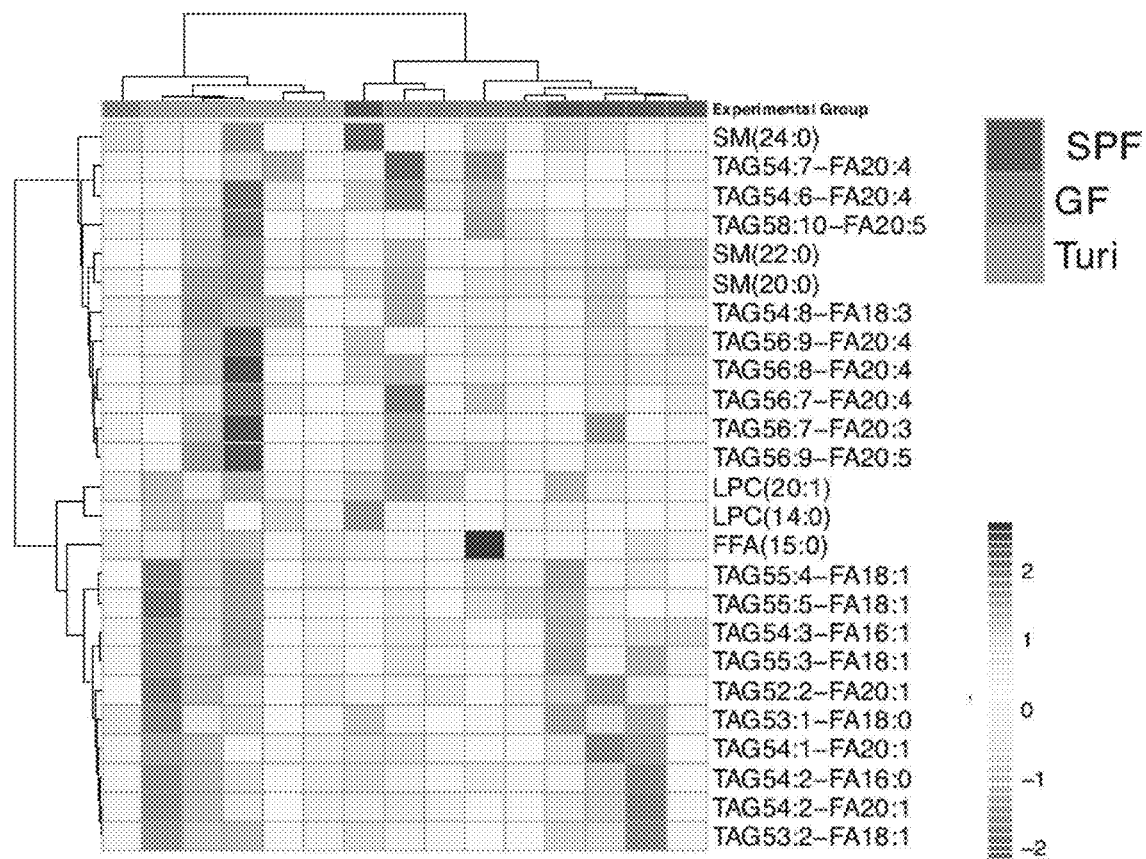
Figure 4I:
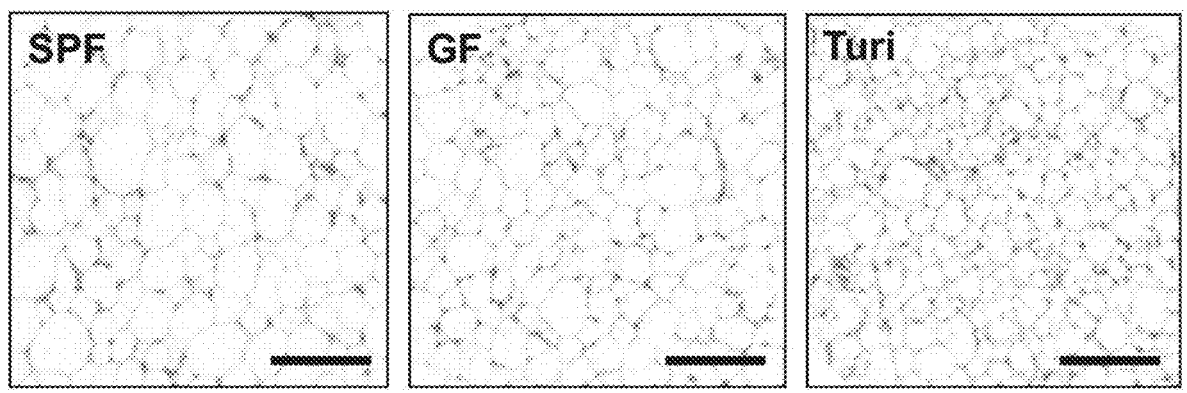

FIGS. 4A-4I show that *Turicibacter sanguinis* colonization regulates host intestinal gene expression. FIG. 4A shows differentially expressed genes (q<0.05) in small intestines from *T. sanguinis*-monocolonized, germ-free (GF) or SPF mice (n=4-5). Bolded numbers represent total differentially expressed genes. Numbers in green denote upregulated genes; numbers in red denote downregulated genes. Numbers in parentheses denote subsets of *T. sanguinis* regulated genes that were further differentially expressed by SPF (n=4-5). FIG. 4B shows GO term enrichment analysis of genes differentially expressed in small intestine in response to *T. sanguinis* relative to GF controls (n=4-5) FIG. 4C shows heatmap of the 89 differentially expressed genes in the small intestine in response to *T. sanguinis* colonization (n=4-5). FIG. 4D shows total serum triglyceride levels in GF, SPF and *T. sanguinis*-monocolonized mice (one-way ANOVA with Bonferroni test; n=12, 13 and 11 mice). FIG. 4E shows total serum triglyceride levels from antibiotic-treated mice gavaged with *T. sanguinis* pretreated for 4 h with vehicle, 200 μM 5-HT or 200 μM 5-HT+Flx (one-way ANOVA with Bonferroni test; n=9 mice). FIG. 4F shows principal components analysis of serum lipidomic data for lipid species with P<0.05 for *T. sanguinis* versus GF and *T. sanguinis* versus SPF mice (two-way ANOVA with Bonferroni test; n=5 mice). FIG. 4G shows average fold change of serum lipid species (P<0.05) differentially regulated by *T. sanguinis* compared with GF controls (largest circle, P<0.001; smallest circle, P<0.05). CE, cholesterol esters; FFA, free fatty acids; LPC, lysophosphatidylcholines; PC, phosphatidylcholines; SM, sphingomyelins; TAG, triacylglycerides (two-way ANOVA plus Bonferroni test; n=5 mice). FIG. 4H shows heatmap of 25 serum lipid species similarly increased (red) or decreased (blue) by *T. sanguinis* colonization relative to both GF and SPF controls (n=5 mice). FIG. 4I shows representative image of inguinal white adipose tissue from GF, SPF and *T. sanguinis*-monocolonized mice. Scale bars: 100 μm (representing n=5 mice). Data are presented as means±s.e.m. *P<0.05; **P<0.01.

Figure 5A:
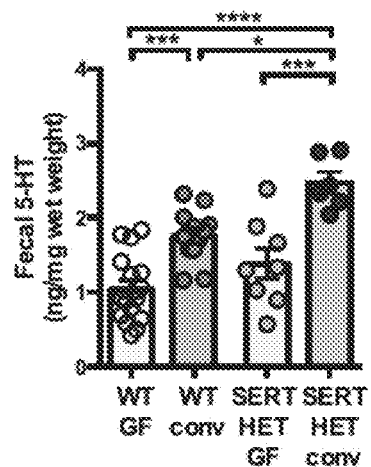
Figure 5B:
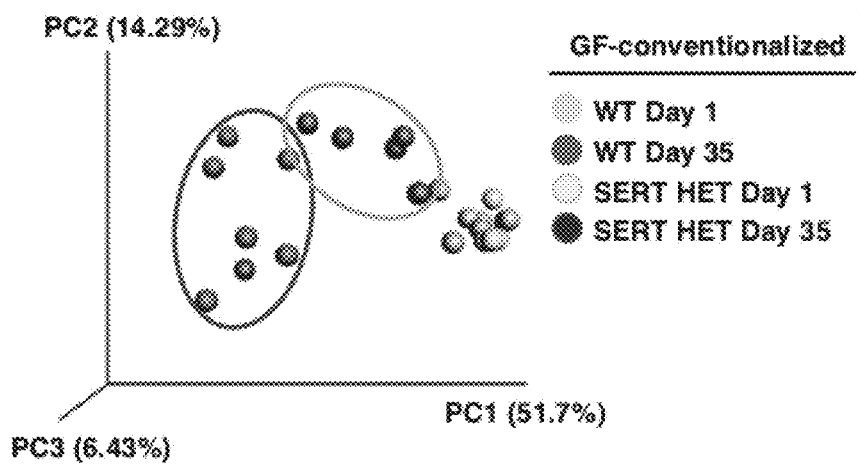
Figure 5C:
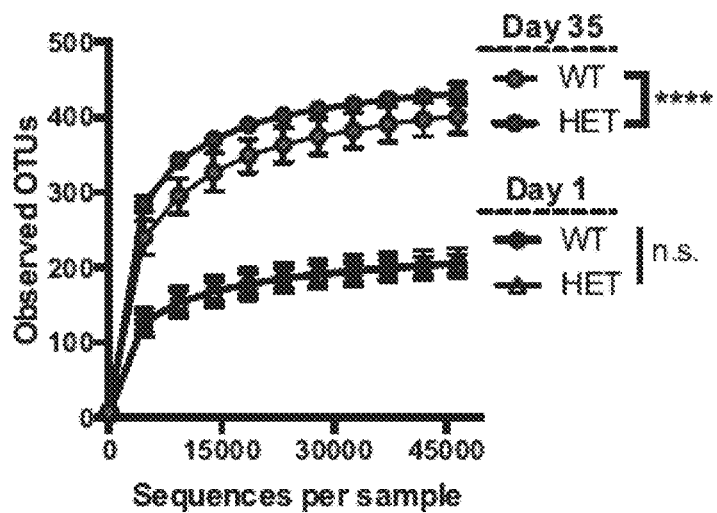
Figure 5D:
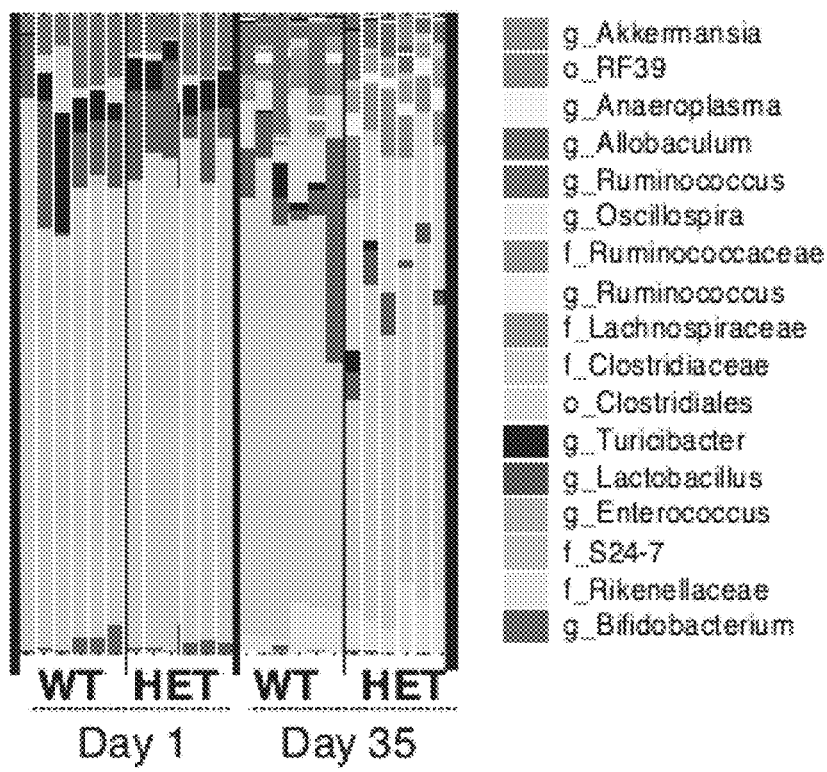
Figure 5E:
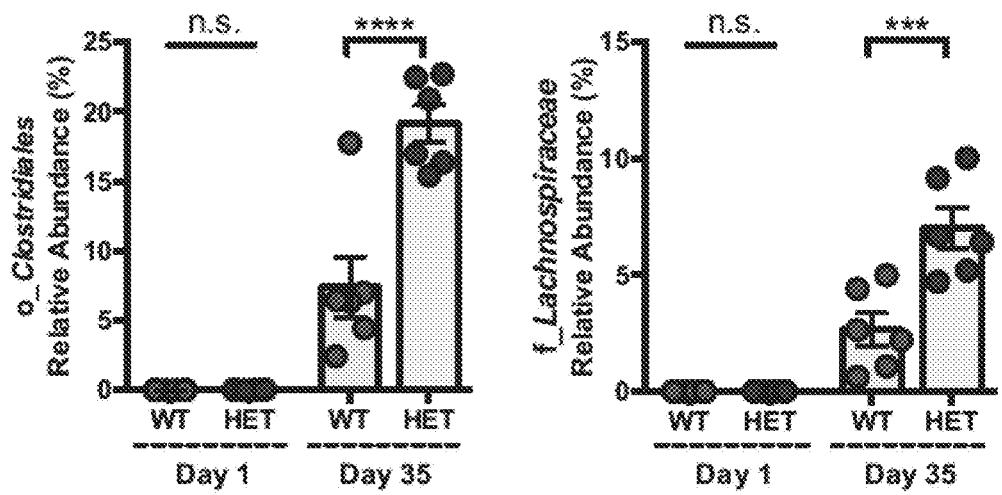
Figure 5F:
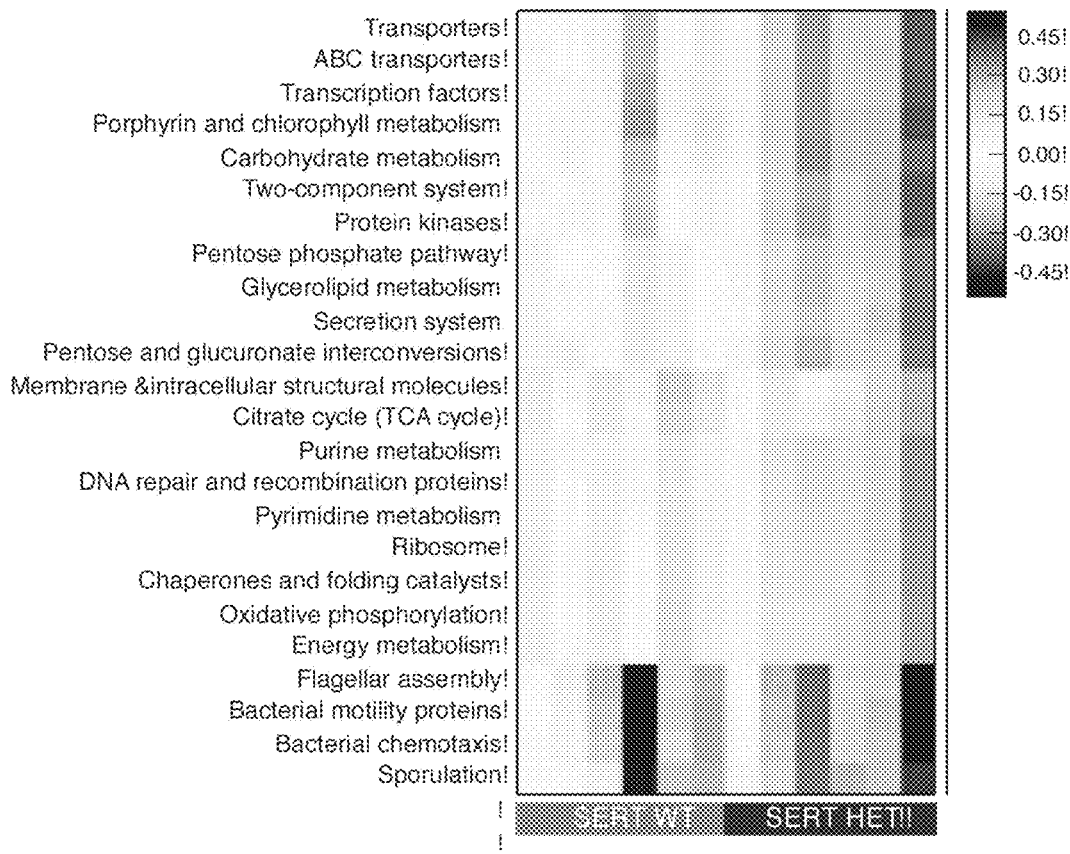
Figure 5G:
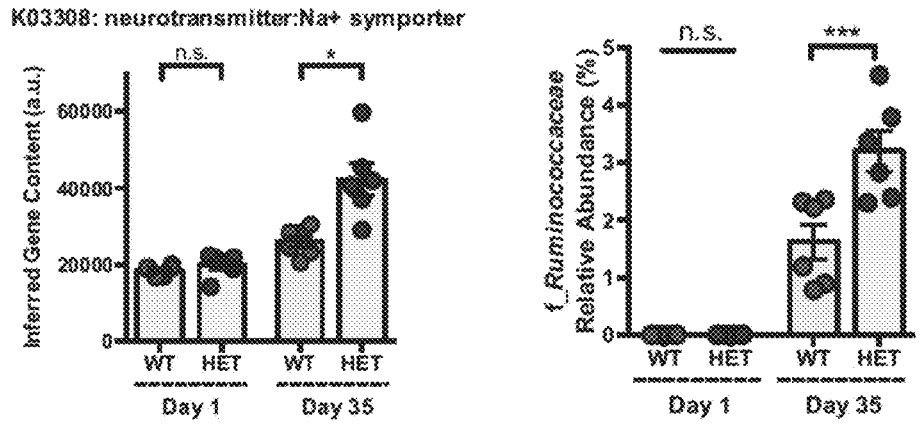

FIGS. 5A-5G show that conventionalization of GF SERT$^{+/-}$ mice results in enrichment of spore-forming bacteria of the gut microbiota. FIG. 5A shows fecal 5-HT levels from conventionalized (conv) WT vs. SERT+/- (HET) mice relative to GF controls (one-way ANOVA with Bonferroni, n=6-16). FIG. 5B shows principal coordinate analysis of 16S rDNA sequencing data of feces from WT vs SERT HET mice at 1 day and 35 days after conventionalization (n=6). FIG. 5C shows alpha-diversity of OTUs from 16S rDNA sequencing of feces from WT vs SERT HET mice at 1 day and 35 days after conventionalization (two-way ANOVA with Bonferroni, n=6) FIG. 5D shows taxonomic diversity of the fecal microbiota from WT vs SERT HET mice at 1 day and 35 days after conventionalization (n=6). FIG. 5E shows relative abundance of bacterial taxa in fecal microbiota from WT vs SERT HET mice at 1 day and 35 days after conventionalization (one-way ANOVA with Kruskal-Wallis, n=6). FIG. 5F shows pathway analysis of inferred metagenomes generated by PICRUSt analysis of 16S rDNA sequencing data from WT vs SERT HET mice at 35 days after conventionalization (n=6). FIG. 5G shows inferred gene content for neurotransmitter sodium symporter (NSS) related proteins calculated by PICRUSt analysis of 16S rDNA sequencing data from WT vs SERT HET mice at 35 days after conventionalization (oneway ANOVA with Kruskal-Wallis, n=6). (*p<0.05, *p<0.001, **p<0.0001, n.s.=not statistically significant).

Figure 6:
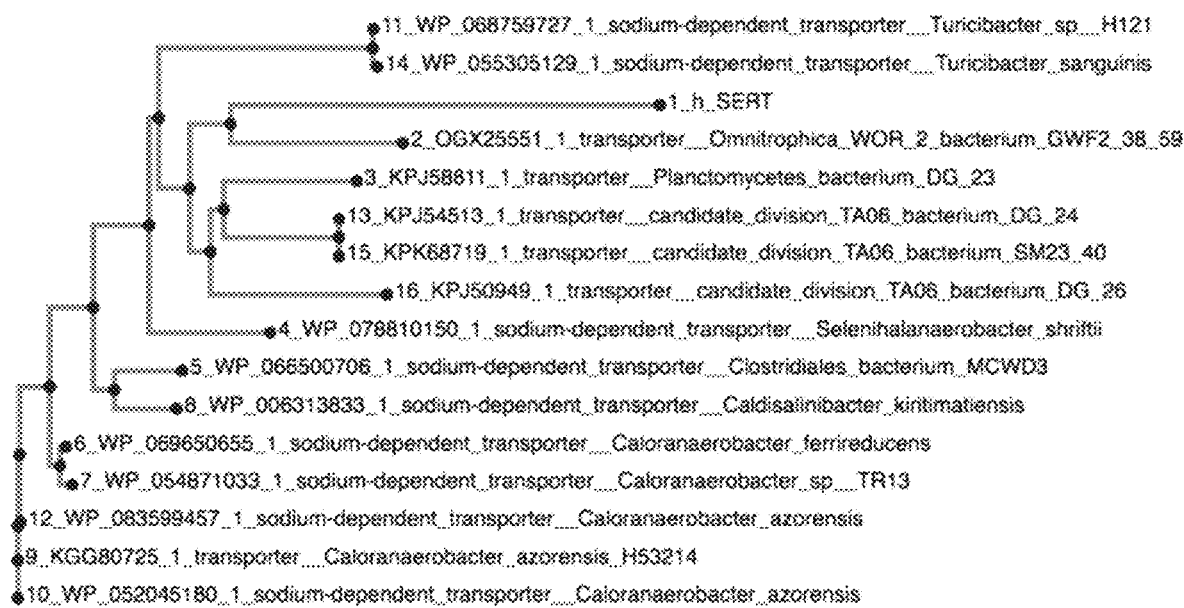

FIG. 6 shows homology of *Turicibacter sanguinis* putative serotonin transporter to mammalian SERT. The figure shows unrooted phylogenetic tree of top 15 bacterial orthologs to hSERT.

Figure 7A:
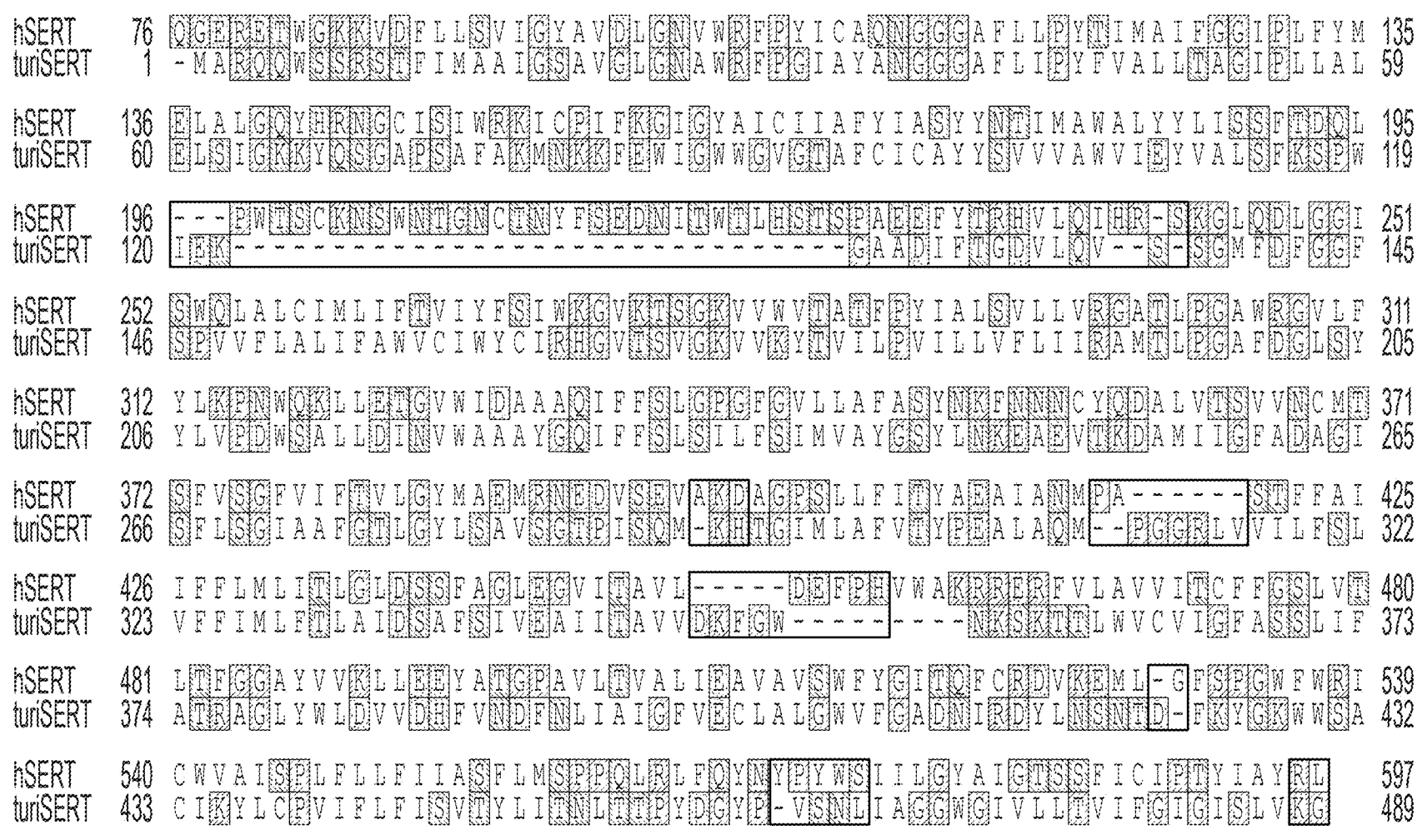
Figure 7B:
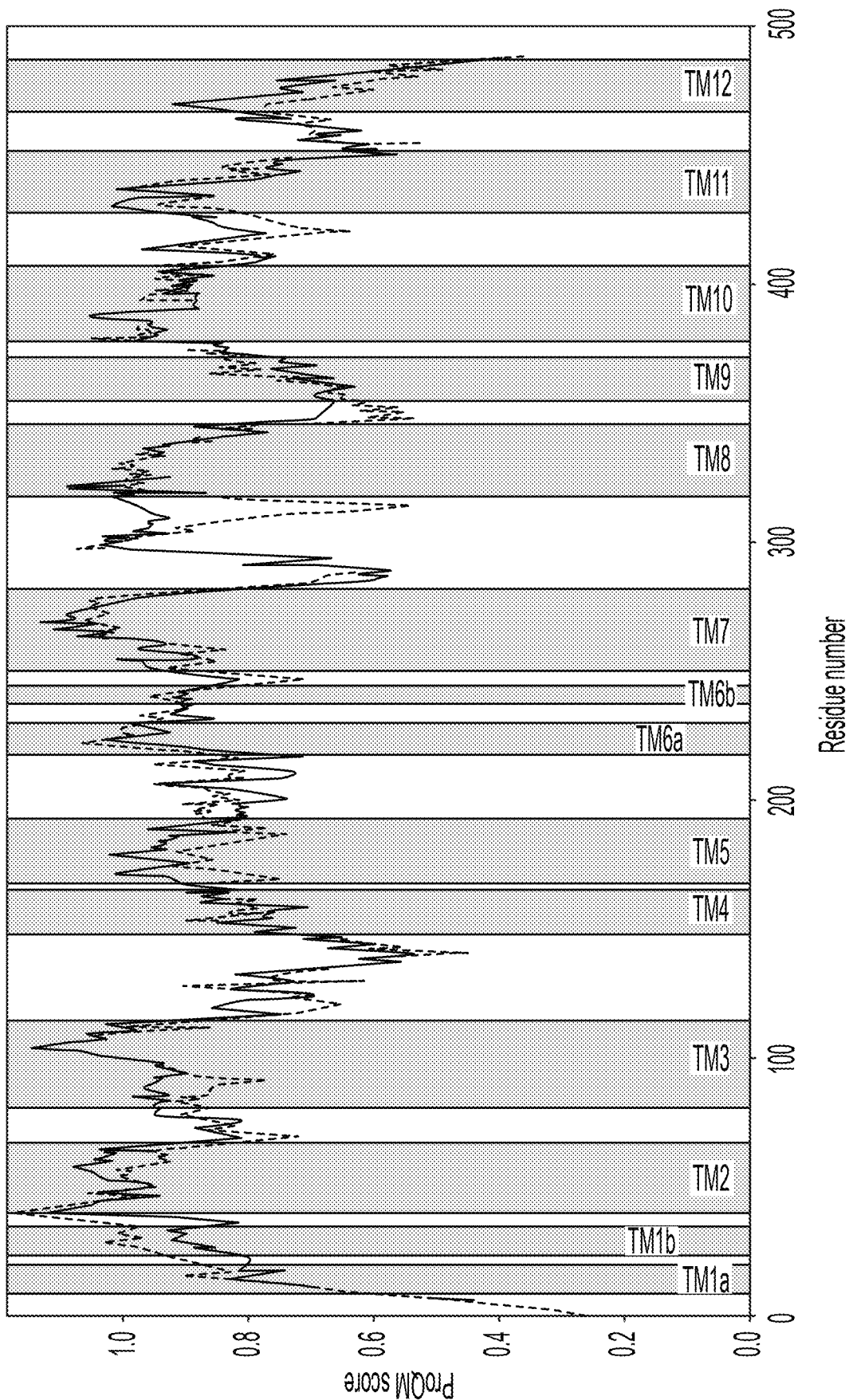
Figure 7C:
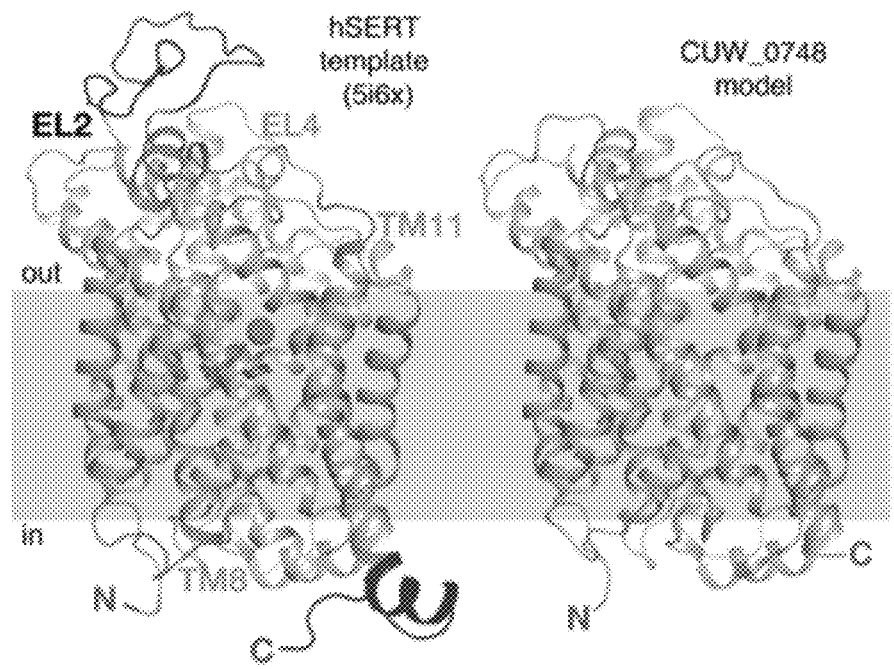
Figure 7D:
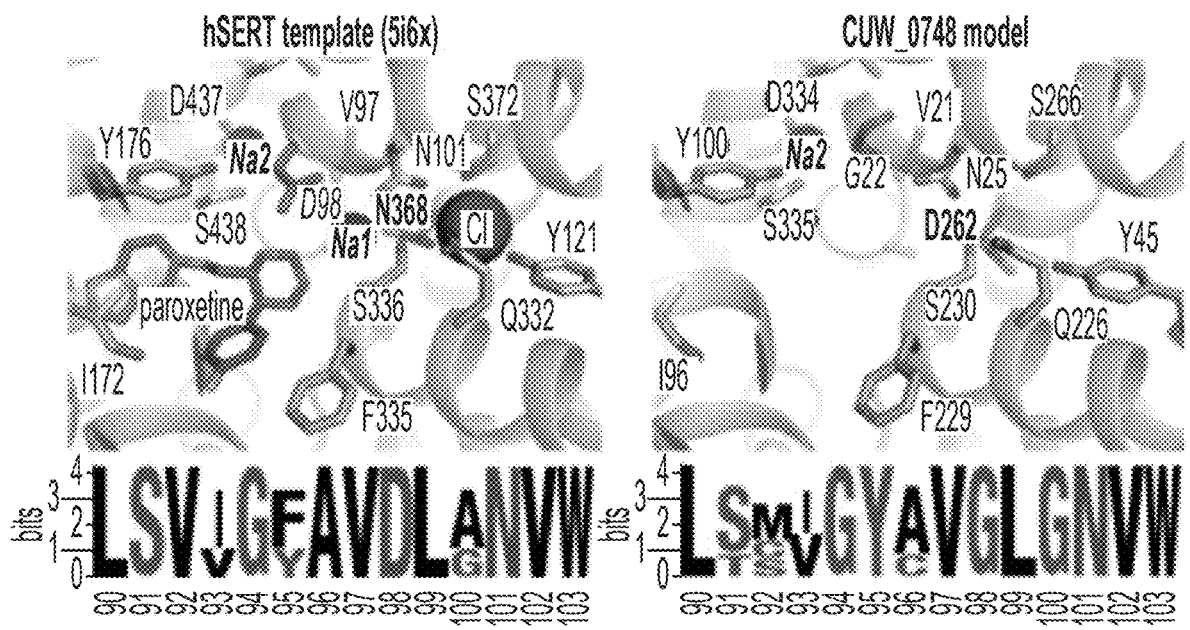
Figure 7E:
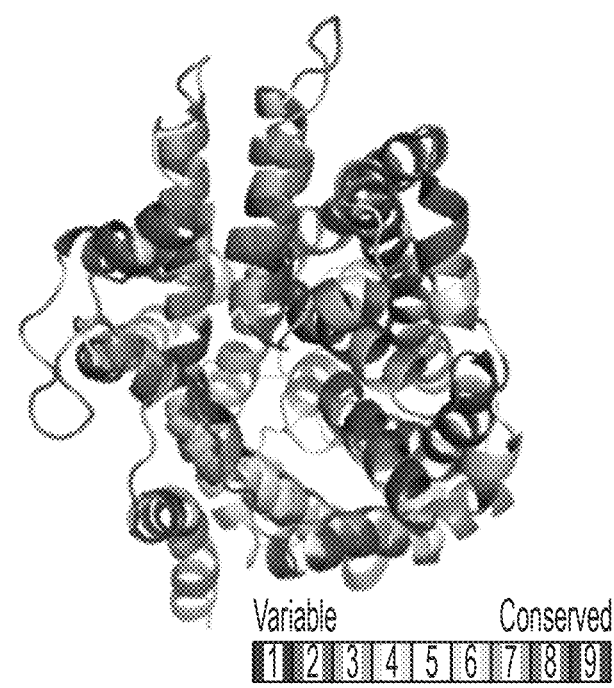

FIGS. 7A-7E show structural modeling of CUW_0748 from *Turicibacter sanguinis* strain MOL361. FIG. 7A shows sequence alignment of CUW_0748 (turiSERT) (SEQ ID NO: 3) and the template, thermostabilized human (h) SERT (PDB code 5i6x) (SEQ ID NO: 2). Black rectangles indicate areas where refinements were made relative to the initial AlignMe PST pair-wise alignment. Background indicate residue type: acidic, basic, polar, hydrophobic or aromatic, glycine and proline, and histidine. FIG. 7B shows average per-residue ProQM scores of 500 models obtained after refining the sequence alignment and their standard deviation. Global ProQM score before refinement: 0.83, after refinement: 0.86; ProQM score of truncated X-ray structure template (5i6x): 0.83 (black line). MolProbity score of final model: 1.45 Å, on par with the score of the template (5i6x chain A; 2.2 Å), and there were no residues in the generously-allowed or disallowed residues of the Ramachandran plot. FIG. 7C shows template and structural model viewed from within plane of the membrane, highlighting segments that are only present in template (dark gray), and segments where alignment was refined. These adjustments were only found to be necessary in loop regions or at the ends of transmembrane helices. Bound ligands include paroxetine (sticks), Na$^+$ and Cl$^-$ ions. The ion at the Na2 site is taken from another structure of hSERT, 5i71, and its position was obtained by superposing the backbone of the Na2-site residues onto the equivalent region in 5i6x. FIG. 7D shows central binding pocket in outward-open hSERT (left) compared to the equivalent region in the refined model of CUW_0748 (right) highlighting the substitution of hSERT residue D98 by G22 in the amine binding region, as well as the substitution of hSERT residue N368 by D262 in the Cl$^-$ binding region. Ligands are shown as in panel c. Weblogos show conservation at position 98 of the SLC6 family of human NSS transporters, i.e. Asp at position 98 in monoamine transporters (left) and Gly in amino-acid transporters (right). FIG. 7E shows ConSurf analysis using the ConSurf server, based on a HMMER search with 1 iteration and E-value cut-off of 0.0001 against the Uniref-90 database on 11 Dec. 2018, illustrating the location of conserved and variable residues in the CUW_0748 model. The protein is viewed down the extracellular pathway.

Figure 8:
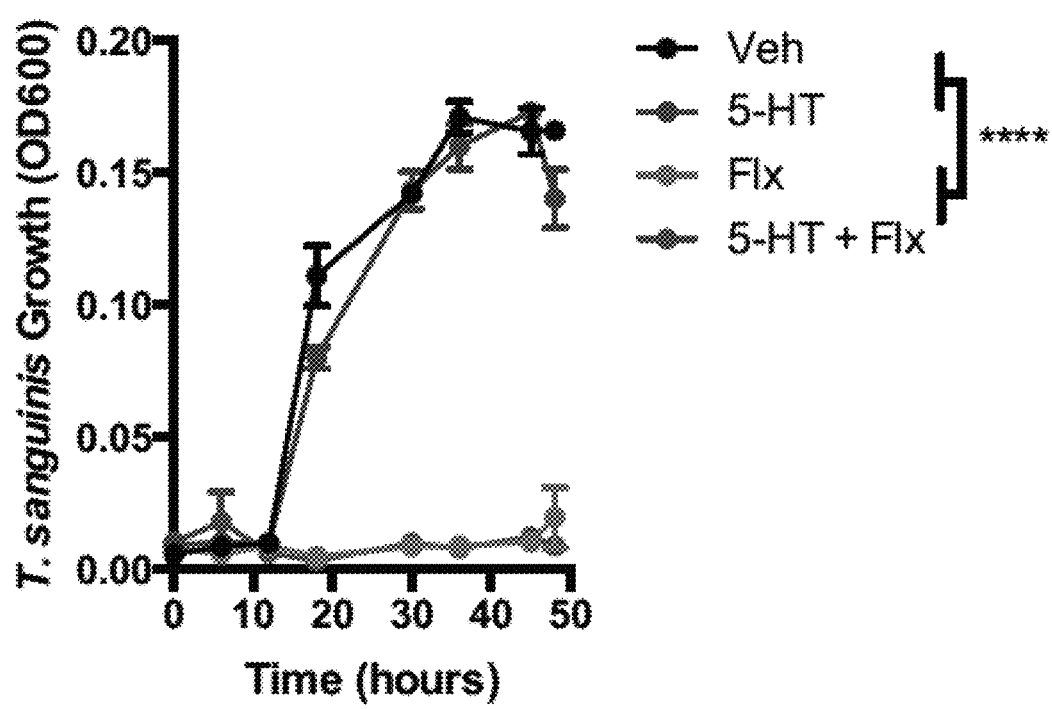

FIG. 8 shows growth curve of *Turicibacter sanguinis* MOL361 in Schaedler broth supplemented with 5-HT and/or fluoxetine. Cell density of *T. sanguinis* at 6, 12, 18, 30, 36, 45 and 48 hours of growth in the presence of 200 uM 5-HT, Flx or both 5-HT and Flx. Treatments were added at the start of culture (e.g. t=0 h). (two-way ANOVA with Bonferroni, n=3) (****p<0.0001).

Figure 9A:
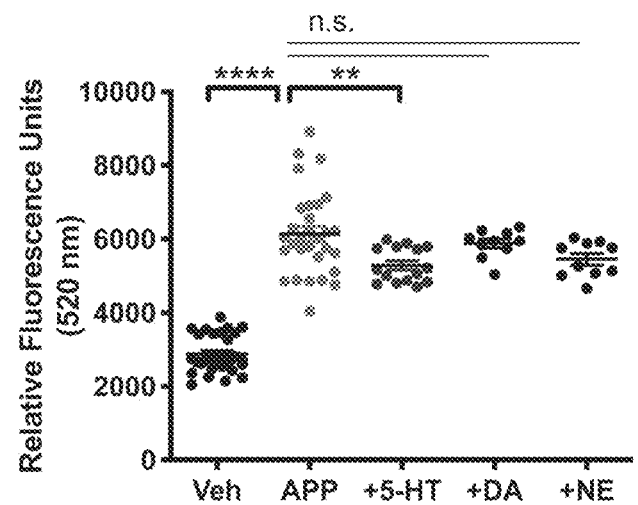
Figure 9B:
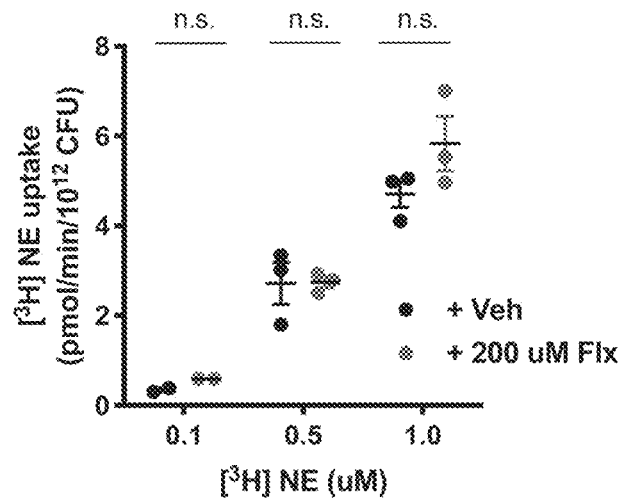
Figure 9C:
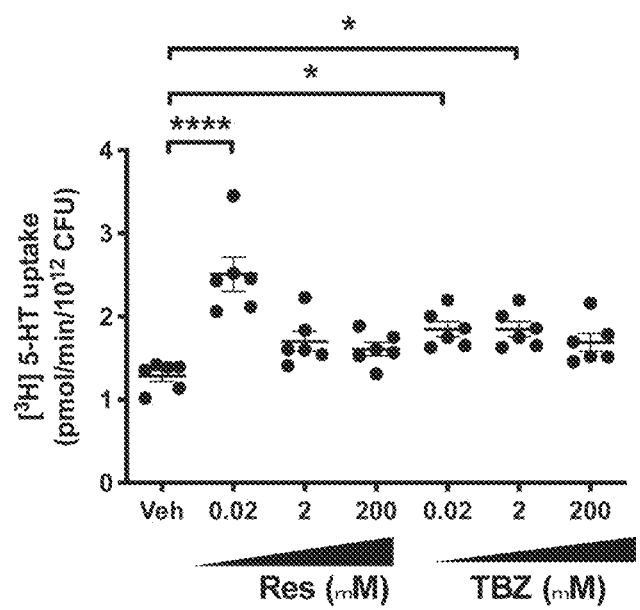

FIGS. 9A-9C show neurotransmitter uptake in *Turicibacter sanguinis* MOL361 in response to biogenic amines and VMAT inhibitors. FIG. 9A shows APP+ uptake by *T. sanguinis* exposed to vehicle (Veh) or APP+, either alone (APP), or with 30 min pre-treatment with 200 uM unlabeled 5-HT (+5-HT), dopamine (+DA) or norepinephrine (+NE) (one-way ANOVA with Bonferroni, n=33, 33, 18, 10, 10 cultures; n.s. (APP vs.+DA): p=>0.9999, n.s. (APP vs+NE): p=0.1525). FIG. 9B shows [$^3$H]NE uptake in counts per min (CPM) by *T. sanguinis* after 30 min pre-treatment with vehicle (Veh) or 200 uM fluoxetine (+Flx) (two-way ANOVA with Bonferroni, n=3 cultures). FIG. 9C shows

[³H]5-HT uptake in counts per min (CPM) by *T. sanguinis* after 30 min pre-treatment with vehicle (Veh), reserpine (+Res) or tetrabenazine (TBZ) (one-way ANOVA with Bonferroni, n=6). (*p<0.05, p<0.01, **p<0.0001, n.s.=not statistically significant).

Figure 10A:
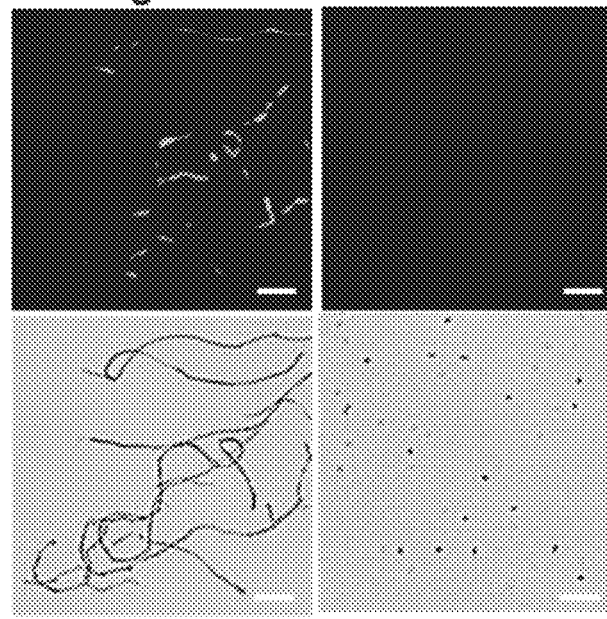
Figure 10B:
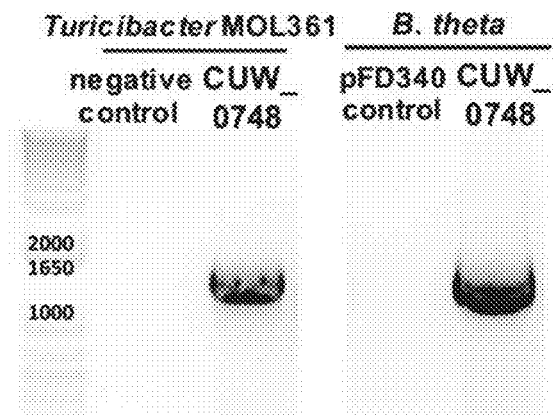
Figure 10C:
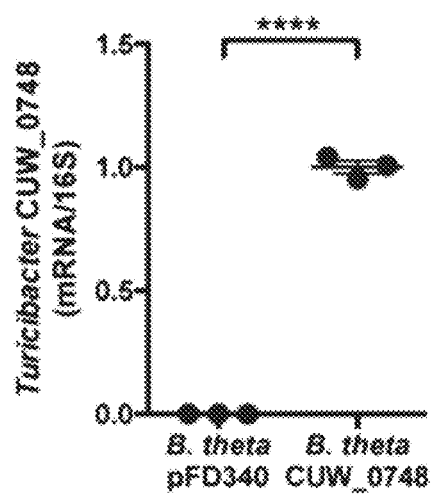
Figure 10D:
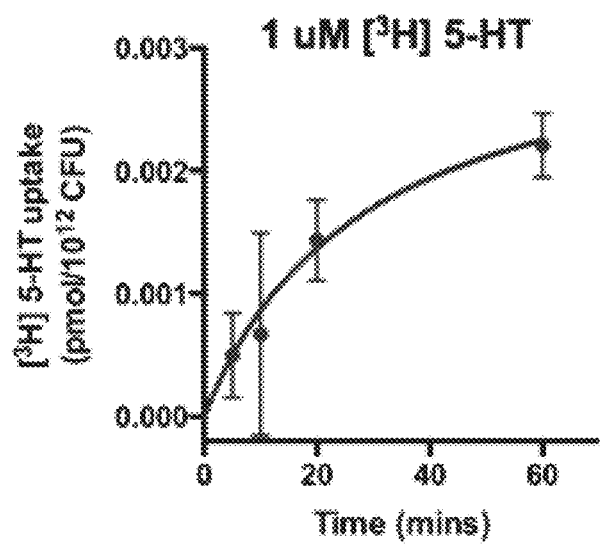
Figure 10E:
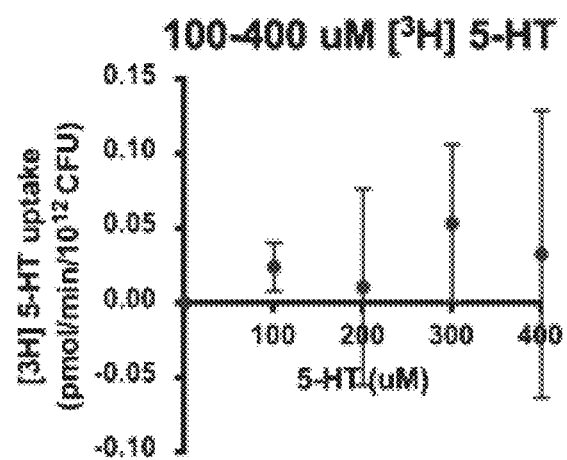
Figure 10F:
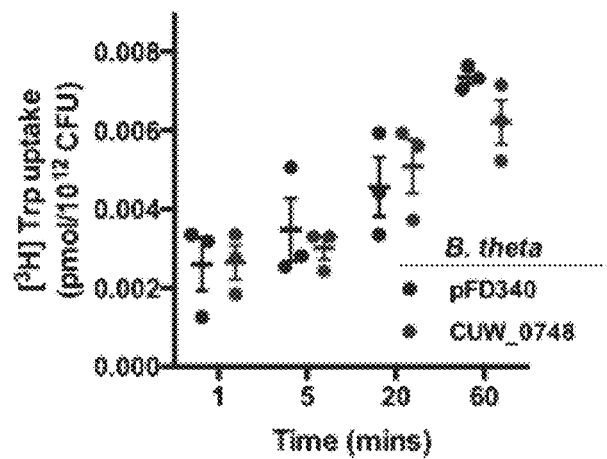

FIGS. 10A-10F show heterologous expression of CUW_0748 from *Turicibacter sanguinis* in *Bacteroides thetaiotaomicron*. FIG. 10A shows representative image of imported APP+ in wildtype *T. sanguinis* versus *B. thetaiotaomicron* (*B. theta*) as measured by the APP+uptake assay. FIG. 10B shows PCR amplification of the CUW_0748 gene in *B. theta* clones harboring the CUW_0748 insert compared to vector control (pFD340). FIG. 10C shows qPCR for CUW_0748 mRNA expression in *B. theta* clones harboring the CUW_0748 insert compared to the vector control (pFD340) (two-tailed unpaired Student's t-test, n=3) (****p<0.0001). FIG. 10D shows kinetics of [³H]5-HT uptake by CUW_0748, as measured as the difference in [³H]5-HT import between *B. theta* expressing CUW_0748 and the vector control (pFD340) at 5, 10, 20 and 60 min of incubation with 1 uM [³H]5-HT. n=4, 10, 7, 13, 3 biologically independent samples per time point. FIG. 10E shows dose-dependent [³H]5-HT uptake by CUW_0748, as measured as the difference in [³H]5-HT import between *B. theta* expressing CUW_0748 and the vector control (pFD340) at 1-400 uM [³H]5-HT. n=8, 9, 9, 9, 9 biologically independent samples per time point. FIG. 10F shows [³H]Trp uptake in counts per min (CPM) by *B. theta* expressing CUW_0748 compared to the vector control (pFD340) after 1, 5, 20 and 60 min of incubation with 1 uM [³H]Trp (two-way ANOVA with Bonferroni, n=3 biologically independent samples per time point). (Mean±SEM, ****p<0.0001, n.s.=not statistically significant).

Figure 11A:
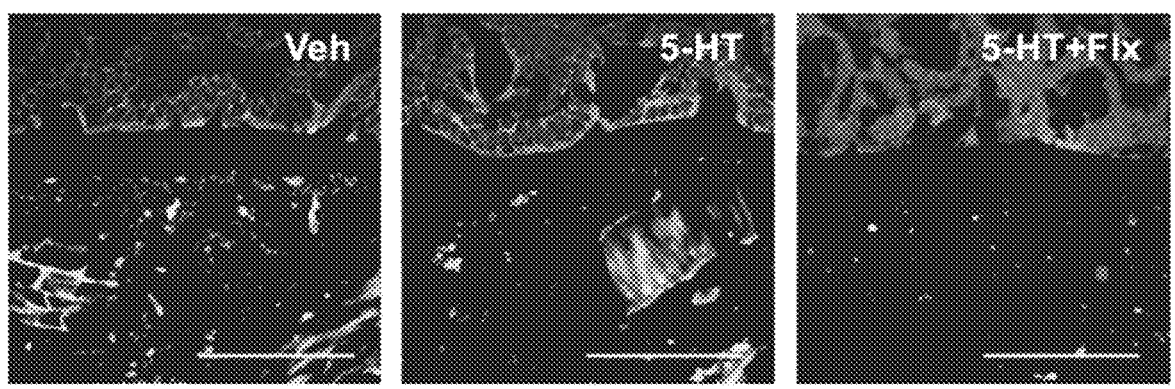
Figure 11B:
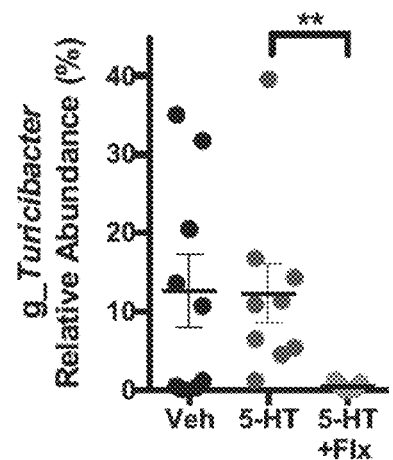

FIGS. 11A-11B show effects of 5-HT and fluoxetine on *T. sanguinis* colonization in the colon from antibiotic-treated mice. FIG. 11A shows representative FISH images of *T. sanguinis* (green), intestinal epithelial cells (DAPI, blue) and bacteria stained with the eubacterial probe EUB338 (red) in colons from antibiotic-treated mice gavaged with *T. sanguinis* pre-treated for 4 hr with vehicle, 200 uM 5-HT, or 200 uM 5-HT with Flx (n=9). Scale bar denotes 100 um. FIG. 11B shows relative abundance of *Turicibacter* measured by 16S rDNA sequencing of colonic lumenal contents harvested from antibiotic-treated mice colonized with *T. sanguinis* pre-treated for 4 hr with vehicle, 200 uM 5-HT, or 200 uM 5-HT with Flx (one-way ANOVA with Bonferroni, n=9). (**p<0.01).

Figure 12A:
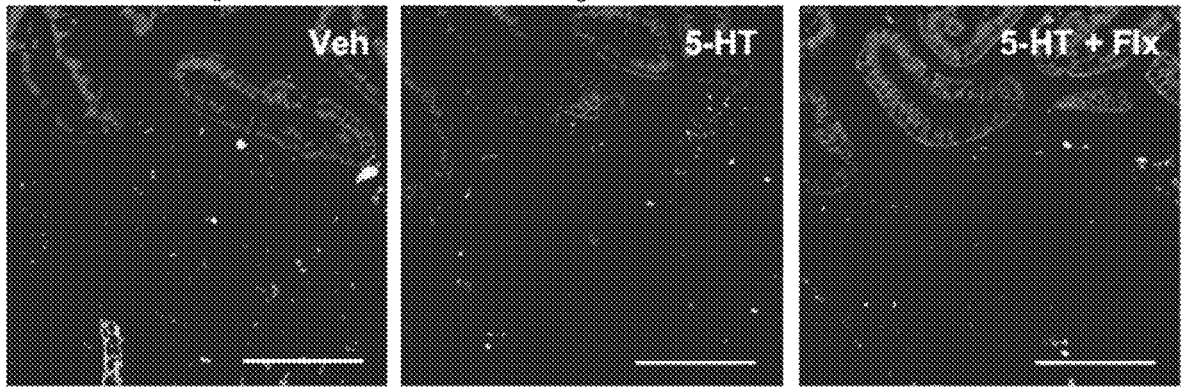
Figure 12B:
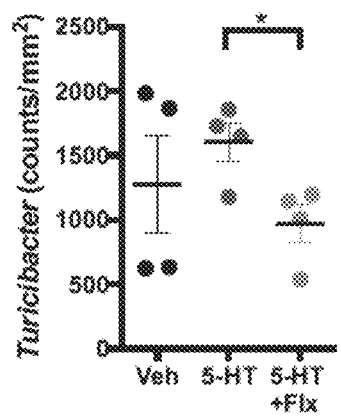
Figure 12C:
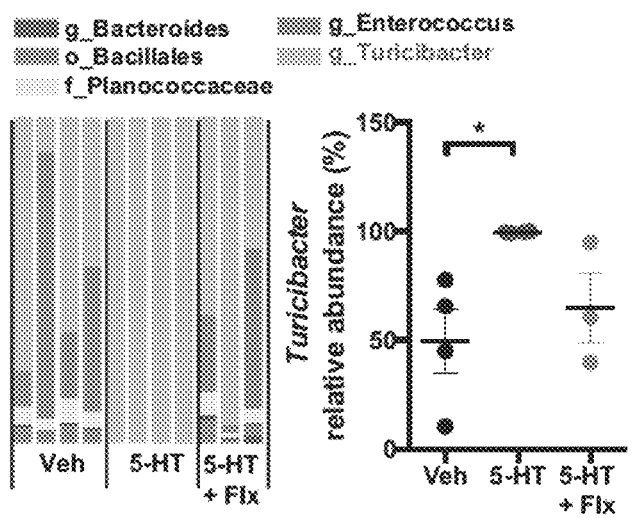
Figure 12D:
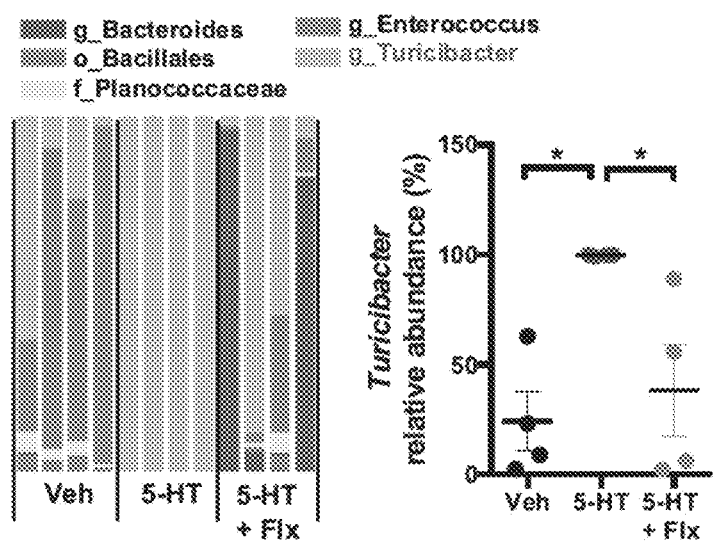

FIGS. 12A-12D show effects of 5-HT and fluoxetine bacterial pre-treatment only on *Turicibacter sanguinis* colonization in the small intestine of antibiotic-treated mice. FIG. 12A shows representative FISH images of *T. sanguinis* (green), intestinal epithelial cells (DAPI, blue) and bacteria stained with the eubacterial probe EUB338 (red) in small intestines from antibiotic-treated mice gavaged with *T. sanguinis* pre-treated for 4 hr with vehicle, 200 uM 5-HT, or 200 uM 5-HT with Flx (n=4). Scale bar denotes 100 um. FIG. 12B shows *T. sanguinis* cell counts from FISH images of small intestines from antibiotic-treated mice gavaged with *T. sanguinis* pre-treated for 4 hr with vehicle, 200 uM 5-HT, or 200 uM 5-HT with Flx (one-way ANOVA with Bonferroni, n=4). FIG. 12C shows *Turicibacter* relative abundances based on 16S rDNA sequencing of small intestinal lumenal contents from antibiotictreated mice gavaged with *T. sanguinis* pre-treated for 4 hr with vehicle, 200 uM 5-HT, or 200 uM 5-HT with Flx (n=3-4). FIG. 12D shows *Turicibacter* relative abundances based on 16S rDNA sequencing of colonic lumenal contents from antibiotic-treated mice gavaged with *T. sanguinis* pre-treated for 4 hr with vehicle, 200 uM 5-HT, or 200 uM 5-HT with Flx (n=4). (*p<0.05).

Figure 13A:
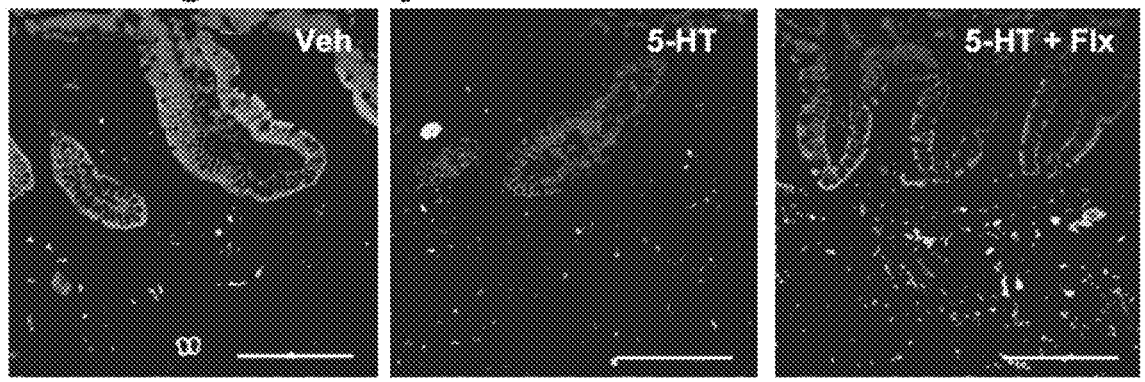
Figure 13B:
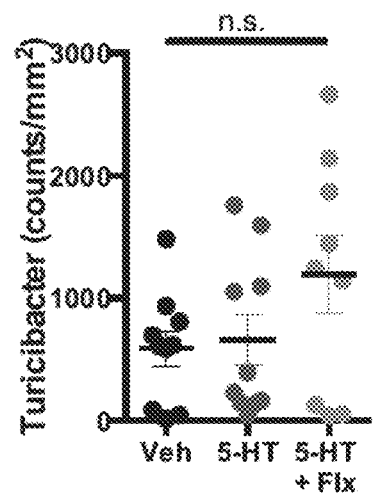

FIGS. 13A-13B show effects of 5-HT and fluoxetine administration in drinking water only on *Turicibacter sanguinis* colonization in the small intestine of antibiotic-treated mice. FIG. 13A shows representative FISH images of *T. sanguinis* (green), intestinal epithelial cells (DAPI, blue) and bacteria stained with the eubacterial probe EUB338 (red) in small intestines from antibiotic-treated mice gavaged with wildtype *T. sanguinis* and treated for 5 days with vehicle, 5-HT (24 µg/ml), or 5-HT (24 µg/ml) and Flx (40 µg/ml) in drinking water (n=9-10). FIG. 13B shows *T. sanguinis* cell counts from FISH images of small intestines of antibiotic-treated mice gavaged with wildtype *T. sanguinis* and exposed to for 5 days with vehicle 5-HT (24 µg/ml), or 5-HT (24 µg/ml) and Flx (40 µg/ml) in drinking water (n=9-10). (n.s.=not statistically significant).

Figure 14A:
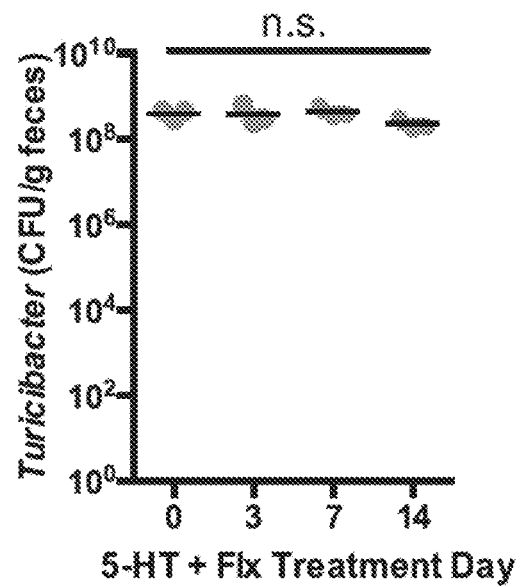
Figure 14B:
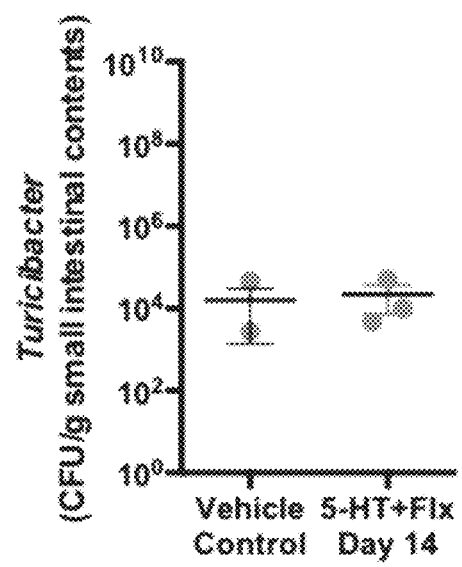

FIGS. 14A-14B show effects of 5-HT and fluoxetine on *Turicibacter sanguinis* loads in monocolonized mice. FIG. 14A shows fecal loads of *T. sanguinis* MOL361 at 0, 3, 7 and 14 days after host treatment with 5-HT (24 µg/ml) and Flx (40 µg/ml) in drinking water (n=3). FIG. 14B shows small intestinal fecal loads of *T. sanguinis* at 14 days after host treatment with 5-HT (24 µg/ml) and Flx (40 µg/ml) in drinking water (n=3). (n.s.=not statistically significant).

Figure 15A:
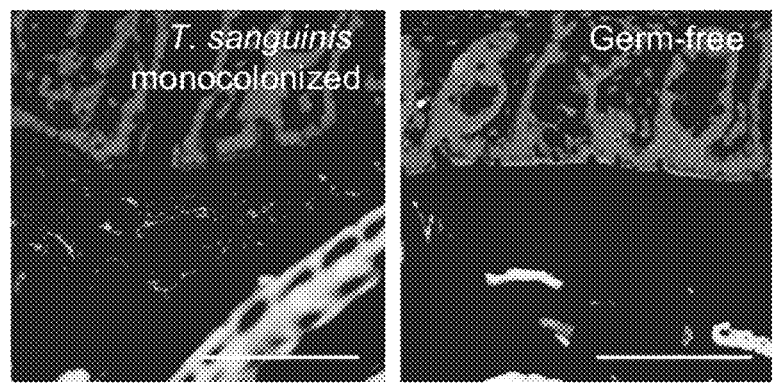
Figure 15B:
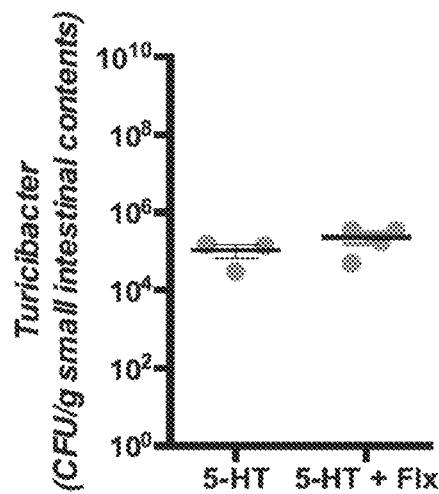

FIGS. 15A-15B show effects of 5-HT and fluoxetine bacterial pre-treatment on *T. sanguinis* colonization of GF-mice. FIG. 15A shows representative images of FISH staining for *T. sanguinis* (green) and intestinal epithelial cells (DAPI, blue) in colons from *T. sanguinis* monocolonized mice versus GF controls. Scale bar denotes 100 um (n=3). FIG. 15B shows fecal loads of *T. sanguinis* at 14 days after gavage with *T. sanguinis* pre-treated for 4 hours with 200 uM 5-HT or 5-HT with Flx (n=4).

Figure 16A:
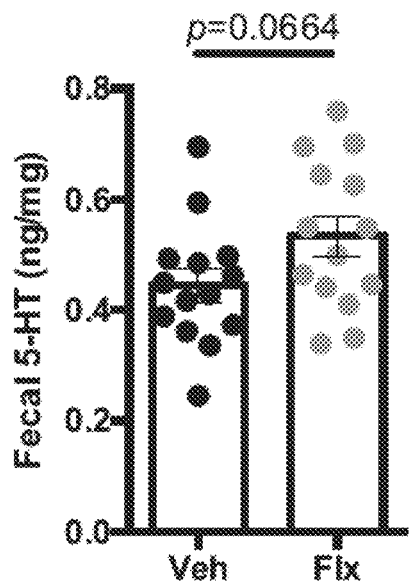
Figure 16B:
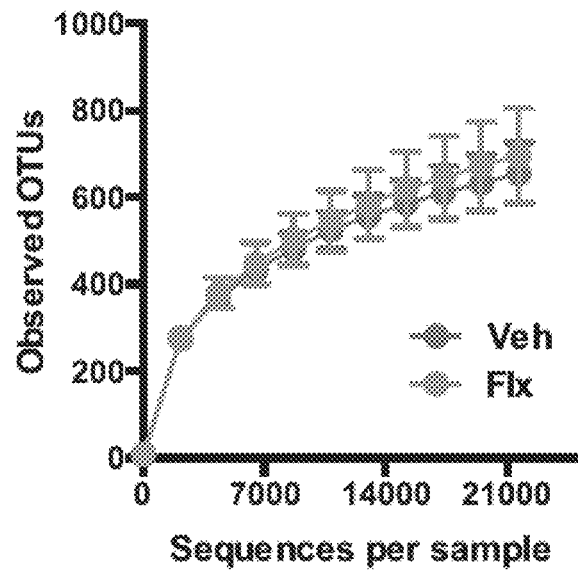
Figure 16C:
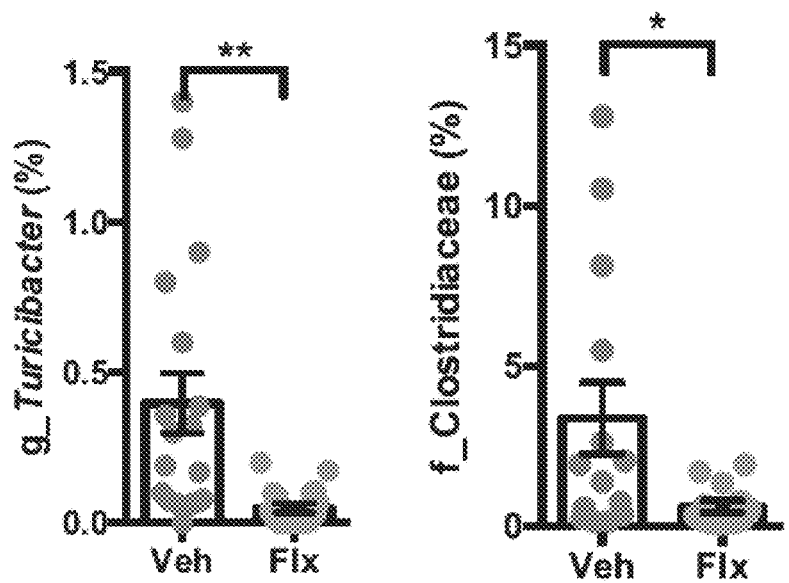

FIGS. 16A-16C show effects of fluoxetine treatment on the fecal microbiota of SPF mice. FIG. 16A shows fecal levels of 5-HT after oral gavage with 10 mg/kg fluoxetine (Flx) daily for 7 days or fluoxetine treatment in drinking water (40 µg/ml) for 2 weeks (two-tailed unpaired Student's t-test, n=14). FIG. 16B shows Alpha-diversity of the fecal microbiota after Flx vs. vehicle (veh) treatment (n=18). (C) Relative abundance of significantly altered bacterial taxa (two-way ANOVA with Kruskal Wallis, n=18). (*p<0.05, **p<0.01).

Figure 17A:
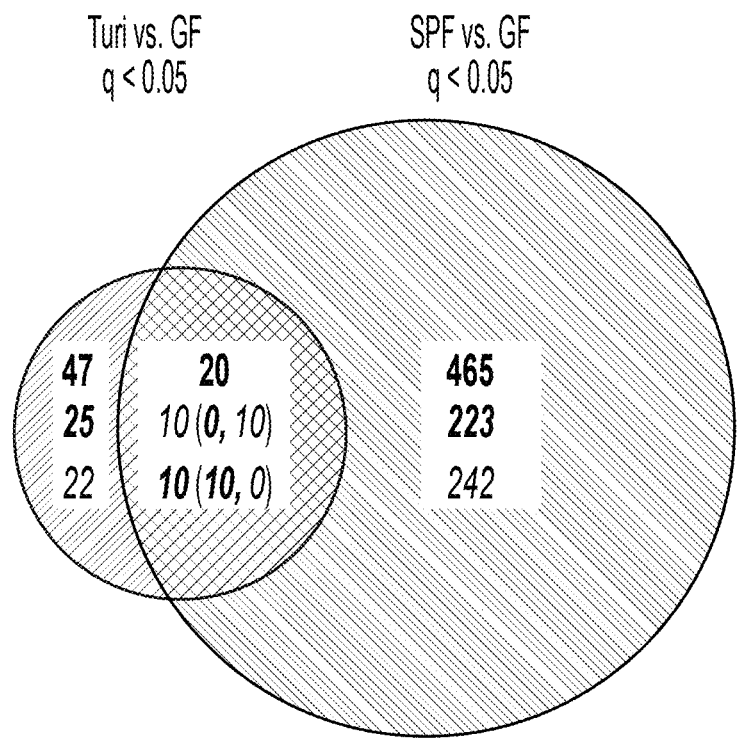
Figure 17B:
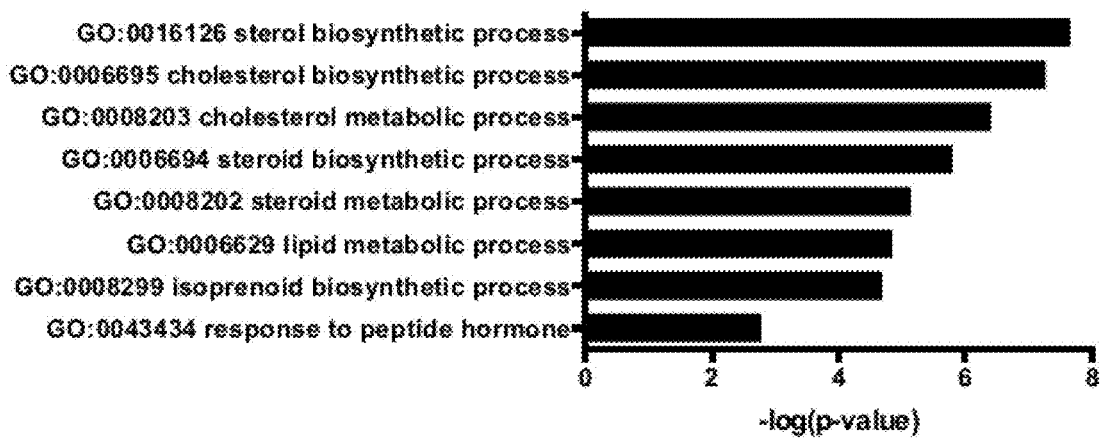
Figure 17C:
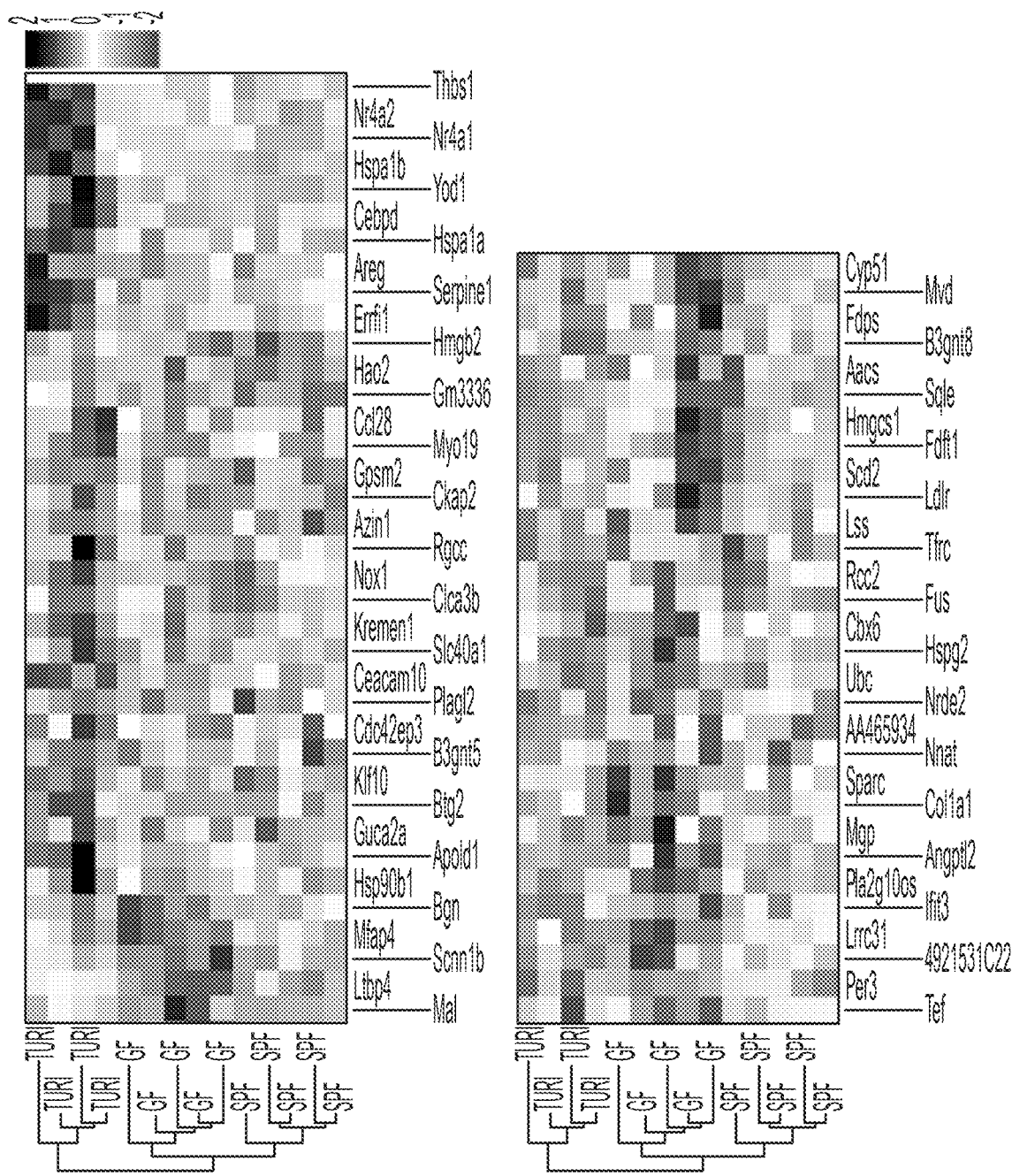

FIGS. 17A-17C show effects of *Turicibacter sanguinis* MOL361 on colon gene expression. FIG. 17A shows differentially expressed genes (q<0.05) in colons from *T. sanguinis* monocolonized, GF or SPF mice (n=4-5). Bolded numbers represent total differentially expressed genes. Numbers in green denote upregulated genes; numbers in red denote downregulated genes. Numbers in parentheses denote subsets of *T. sanguinis*-regulated genes that were further differentially expressed by SPF (n=4-5). FIG. 17B shows GO term enrichment analysis of genes differentially expressed in colon in response to *T. sanguinis* relative to GF vs SPF controls (n=4-5). FIG. 17C shows heatmap of the 87 genes that are differentially expressed genes by colon in response to *T. sanguinis* colonization (n=4-5).

Figure 18A:
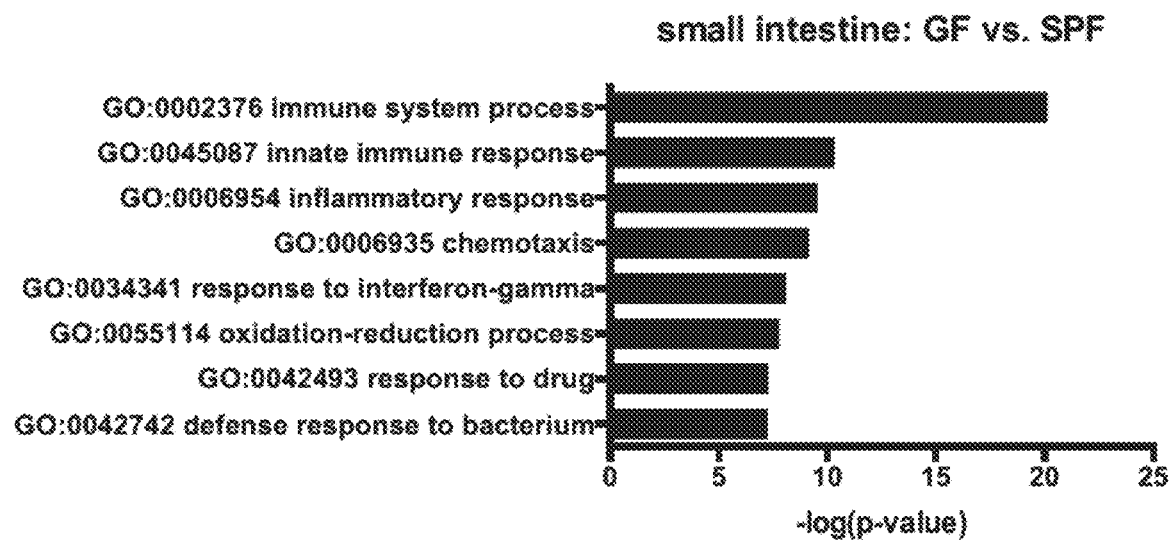
Figure 18B:
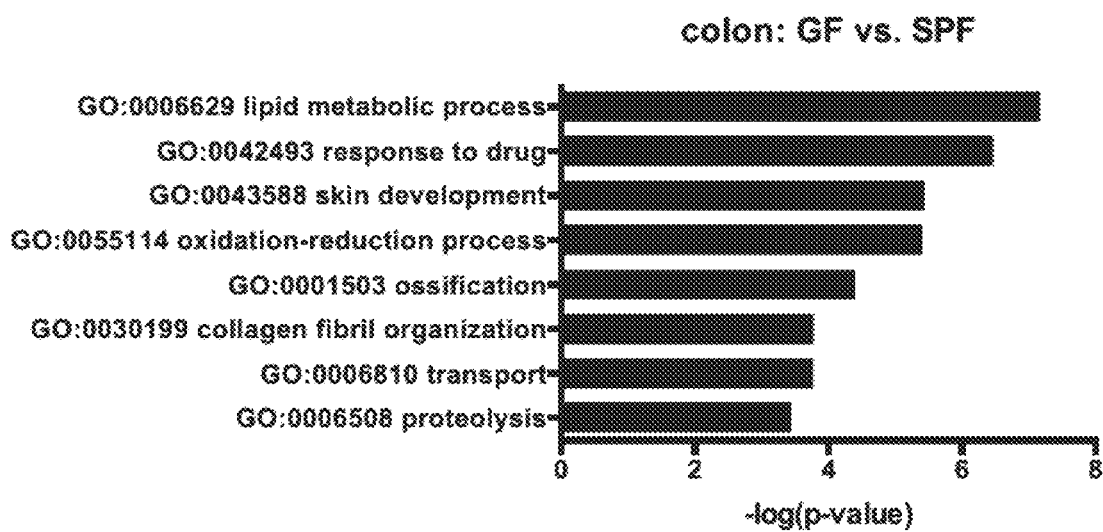
Figure 19A:
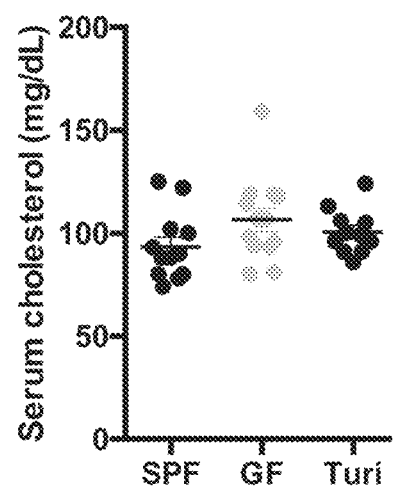
Figure 19B:
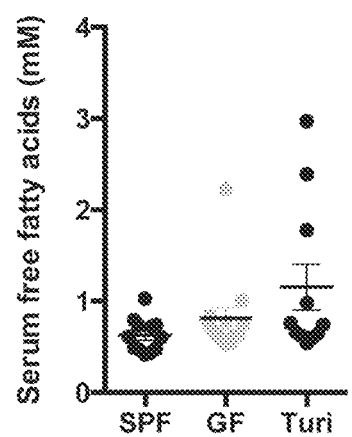
Figure 19C:
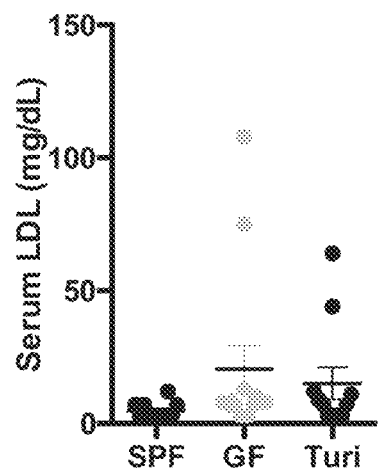
Figure 19D:
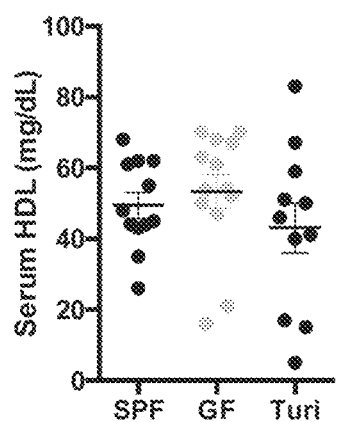
Figure 19E:
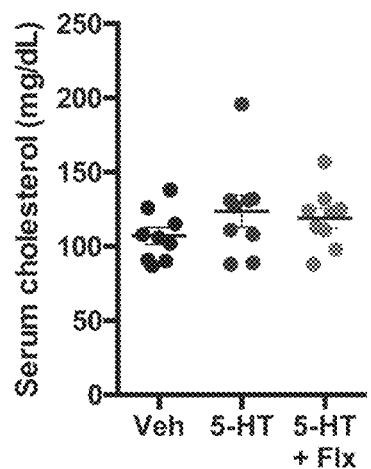
Figure 19F:
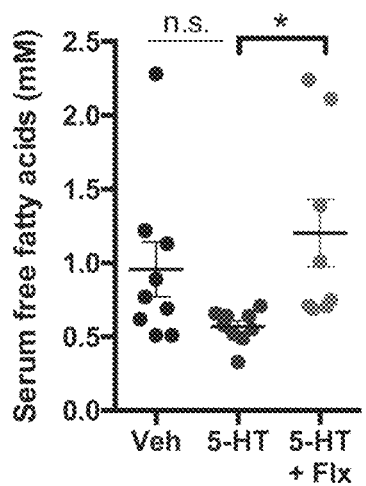
Figure 19G:
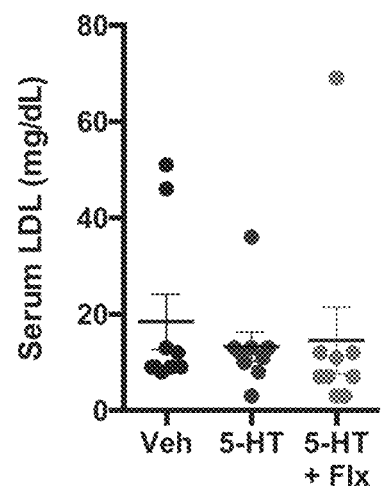
Figure 19H:
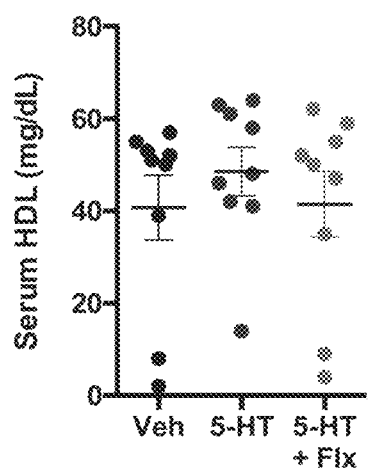

FIGS. 18A-18B show that gene ontology pathway analysis of colon and small intestine genes differentially regulated in GF mice relative to SPF controls. FIG. 18A shows Top 8 pathways from GO-term enrichment analysis of genes differentially regulated in GF vs SPF small intestine (n=5). FIG. 18B shows top 8 pathways from go-term enrichment analysis of genes differentially regulated in GF vs SPF colon (n=5).

FIGS. 19A-19H show that there is no effect of *T. sanguinis* colonization on total serum cholesterol, free fatty acids or lipoprotein levels. FIG. 19A-19D show serum lipid levels in mice reared GF, SPF, or monocolonized with *T. sanguinis*. (one-way ANOVA with Bonferroni, n=12, 13, 11 mice). FIG. 19E-19H show serum lipid levels in antibiotic-treated mice gavaged with *T. sanguinis* pre-treated for 4 hr with vehicle, 200 uM 5-HT, or 200 uM 5-HT with Flx (one-way ANOVA with Bonferroni, n=9 mice; n.s.: p=0.3156) (Mean±SEM, *p<0.05).

Figure 20A:
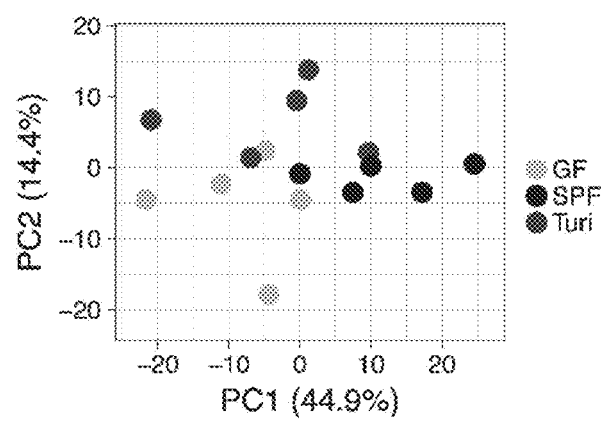
Figure 20B:
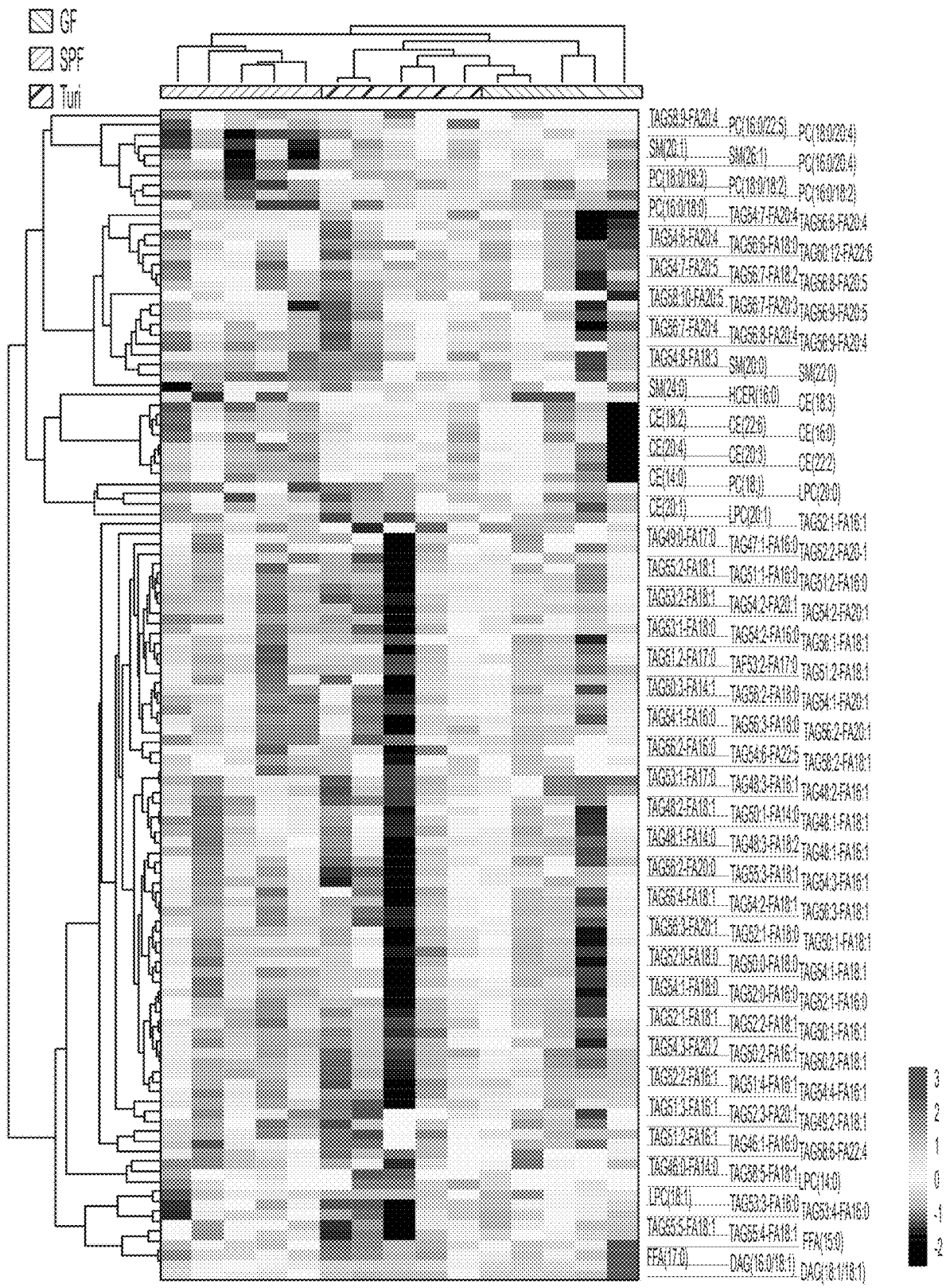
Figure 20C:
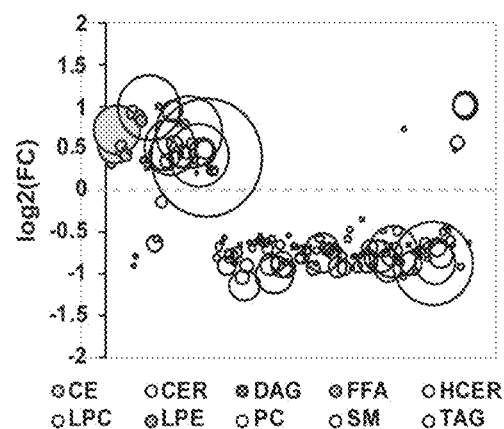

FIGS. 20A-20C show lipidomic analysis of serum from GF, SPF and *T. sanguinis*-monocolonized mice. FIG. 20A shows principal components analysis of lipidomic data for all 1100 lipid species detected in serum from GF, SPF and *T. sanguinis*-monocolonized mice (n=5 mice). FIG. 20 B shows heatmap of all serum lipid species differentially-regulated (p<0.05) by *T. sanguinis* colonization relative to either GF or SPF controls (n=5 mice). FIG. 20C shows average fold change (FC) of serum lipid species (p<0.05) differentially regulated by *T. sanguinis* compared to SPF controls. Largest circle=p<0.001, smallest circle=p<0.05. CE=cholesterol esters, CER=ceramides, DAG=diacylglycerols, FFA=free fatty acids, HCER=hexosyl ceramides, LPC=lysophosphatidylcholines, LPE=lysophosphatidylethanolamine, PC=phosphatidylcholines, SM=sphingomyelins, TAG=triacylglycerides. (n=5 mice).

Figure 21A:
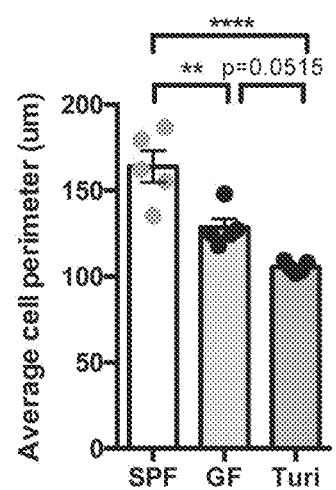
Figure 21B:
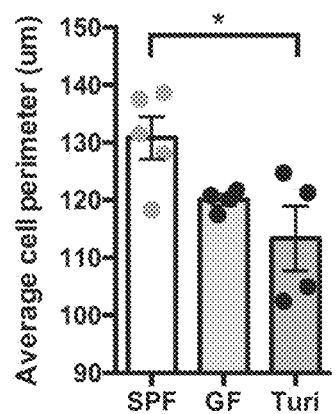

FIGS. 21A-21B show adipocyte perimeter in inguinal white adipose tissue from SPF, GF, or *T. sanguinis*-monocolonized mice. FIG. 21A shows adult female mice after >2 weeks of *T. sanguinis* colonization (one-way ANOVA with Bonferroni, n=5 mice). FIG. 21B shows adult male mice after >2 weeks of *T. sanguinis* colonization (one-way ANOVA with Bonferroni, n=5, 4, 4 mice). (Mean±SEM, *p<0.05, p<0.01, **p<0.0001).

Figure 22A:
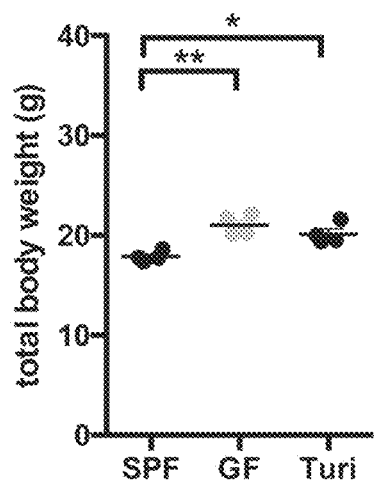
Figure 22B:
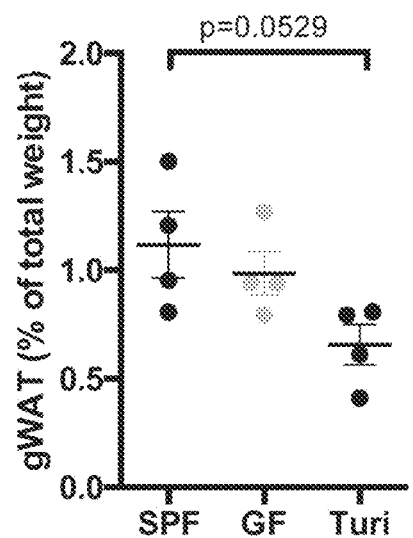
Figure 22C:
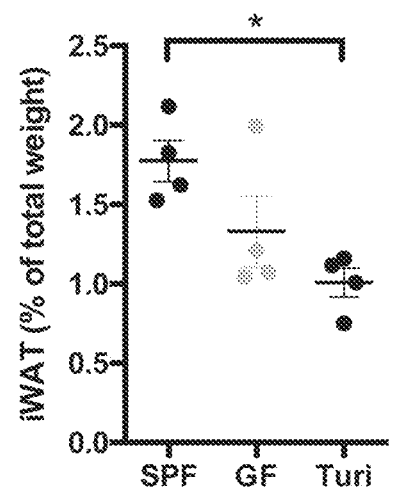
Figure 22D:
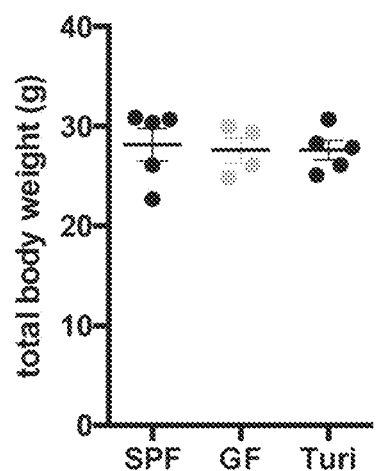
Figure 22E:
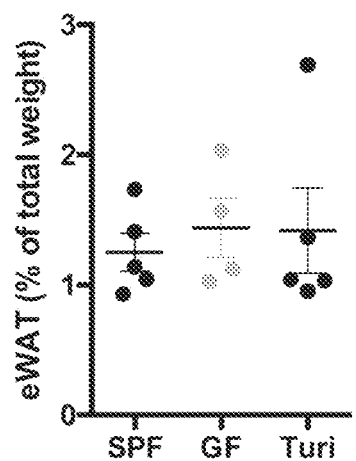
Figure 22F:
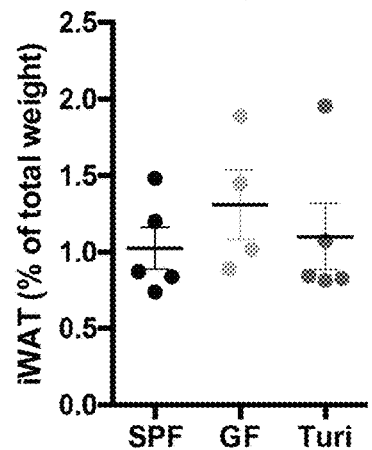

FIGS. 22A-22F show Host body weight, gonadal white adipose tissue (gWAT), inguinal white adipose tissue (iWAT) mass and epidydymal white adipose tissue (eWAT) in SPF, GF, or *T. sanguinis*-monocolonized mice. FIGS. 22A-22C show adult female mice after 2 weeks of *T. sanguinis* colonization (one-way ANOVA with Bonferroni, n=4 mice). FIGS. 22D-22F show adult male mice after 2 weeks of *T. sanguinis* colonization (one-way ANOVA with Bonferroni, n=5, 4, 5 mice). (Mean±SEM, *p<0.05, **p<0.01, n.s.=not statistically significant).

Figure 23:
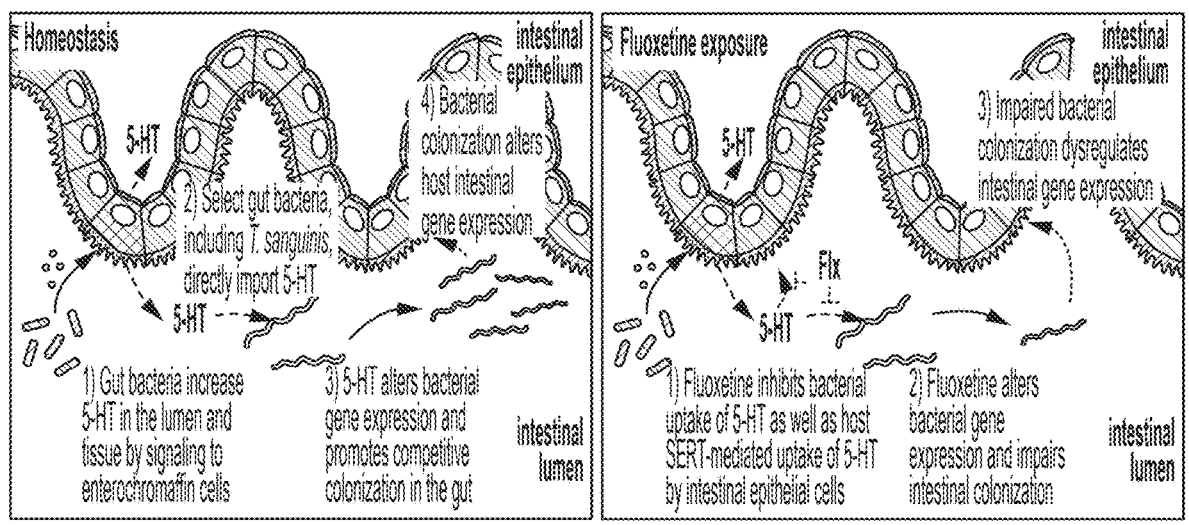

FIG. 23 shows a model of interactions between the gut microbiota, intestinal 5-HT and fluoxetine.

DETAILED DESCRIPTION

Provided herein are methods for regulating colonization of the gut microbiota, e.g., *Turicibacter sanguinis*. Provided herein are methods for modulating lipid and steroid metabolism. Provided herein are methods for treating or inhibiting a cardiovascular disease, an intestinal inflammatory disease, and/or a metabolic disorder.

The gut microbiota regulates levels of serotonin (5-hydroxytryptamine, 5-HT) in the intestinal epithelium and lumen. However, whether 5-HT plays a functional role in bacteria from the gut microbiota remains unknown. Elevating levels of intestinal luminal 5-HT by oral supplementation or genetic deficiency in the host 5-HT transporter (SERT) increases the relative abundance of spore-forming members of the gut microbiota, which were previously reported to promote host 5-HT biosynthesis. Within this microbial community, *Turicibacter sanguinis* was identified as a gut bacterium that expresses a neurotransmitter sodium symporter-related protein with sequence and structural homology to mammalian SERT. *T. sanguinis* imports 5-HT through a mechanism that is inhibited by the selective 5-HT reuptake inhibitor, fluoxetine. 5-HT reduces the expression of sporulation factors and membrane transporters in *T. sanguinis*, which is reversed by fluoxetine exposure. Treating *T. sanguinis* with 5-HT or fluoxetine modulates its competitive colonization in the gastrointestinal tract of antibiotic-treated mice. In addition, fluoxetine reduces the membership of *T. sanguinis* in the gut microbiota of conventionally-colonized mice. Host association with *T. sanguinis* alters intestinal expression of multiple gene pathways, including those important for lipid and steroid metabolism, with corresponding reductions in host systemic triglyceride levels and inguinal adipocyte size. Together, these findings support the notion that select bacteria indigenous to the gut microbiota signal bidirectionally with the host serotonergic system to promote their colonization and fitness in the intestine.

The gut microbiota regulates several host biochemicals with known neuromodulatory properties, including endocannabinoids, neuropeptides and biogenic amines. Of these, the hormone and neurotransmitter serotonin (5-hydroxytryptamine, 5-HT) is expressed highly in the gastrointestinal tract, synthesized by enterochromaffin cells (ECs) to levels that account for over 90% of the body's 5-HT content. Approximately 50% of gut-derived 5-HT is regulated by the gut microbiota, particularly spore-forming bacteria dominated by the class Clostridia, families Clostridiaceae and Turicibacteraceae, with downstream consequences for host intestinal motility, hemostasis and ossification. However, whether microbial regulation of host 5-HT occurs as a side effect of bacterial metabolism, or whether there is a functional role for microbial regulation of host 5-HT on bacterial physiology remains unclear. Interestingly, while the majority of gut 5-HT is secreted basolaterally by ECs into surrounding intestinal tissues, some EC-contained 5-HT is secreted apically into the intestinal lumen suggesting that gut microbes are exposed to host-derived 5-HT. Indeed, microbial influences on host ECs regulate 5-HT levels not only in intestinal tissue and blood, but also in the intestinal lumen and feces, raising the question of whether there are direct effects of host-derived 5-HT on gut bacteria.

A serotonin receptor agonist is an agonist of one or more serotonin receptors. They activate serotonin receptors in a manner similar to that of serotonin (5-hydroxytryptamine; 5-HT), a neurotransmitter and hormone and the endogenous ligand of the serotonin receptors. Non limiting examples of serotonin receptor agonists are 5-HT, psilocybin, psilocin, N,N-Dimethyltryptamine, 5-methoxy-N,N-dimethyltryptamine, bufotenin, lysergic acid diethylamide, ergine (LSA), mescaline, 2,5-dimethoxy-4-bromophenethylamine, 25I-NBOMe, 3,4-Methylenedioxyamphetamine, and 2,5-Dimethoxy-4-methylamphetamine.

Selective Serotonin Reuptake Inhibitors (SSRIs) are a class of drugs that inhibit serotonin reuptake. SSRIs are believed to increase the extracellular level of the neurotransmitter serotonin by limiting its reabsorption (reuptake) into the presynaptic cell, increasing the level of serotonin in the synaptic cleft available to bind to the postsynaptic receptor. Non-limiting examples of SSRIs are citalopram, escitalopram, fluoxetine, fluvoxamine, paroxetine, sertraline, dapoxetine, indalpine, zimelidine, alaproclate, centpropazine, cericlamine, femoxetine, ifoxetine, omiloxetine, panuramine, pirandamine, and seproxetine.

Definitions

As used herein in the specification, "a" or "an" may mean one or more. As used herein in the claim(s), when used in conjunction with the word "comprising", the words "a" or "an" may mean one or more than one. As used herein "another" may mean at least a second or more.

The term "preventing" is art-recognized, and when used in relation to a condition, such as a local recurrence, is well understood in the art, and includes administration of a composition which reduces the frequency of, or delays the onset of, symptoms of a medical condition in a subject relative to a subject which does not receive the composition. Thus, prevention of seizures includes, for example, reducing the number of seizures in a population of patients receiving a prophylactic treatment relative to an untreated control population, and/or delaying the appearance of detectable lesions in a treated population versus an untreated control population, e.g., by a statistically and/or clinically significant amount.

The term "prophylactic" or "therapeutic" treatment is art-recognized and includes administration to the host of one or more of the subject compositions. If it is administered prior to clinical manifestation of the unwanted condition (e.g., disease or other unwanted state of the host animal) then the treatment is prophylactic (i.e., it protects the host against developing the unwanted condition), whereas if it is administered after manifestation of the unwanted condition, the treatment is therapeutic (i.e., it is intended to diminish, ameliorate, or stabilize the existing unwanted condition or side effects thereof).

The term "subject" refers to a mammal, including, but not limited to, a human or non-human mammal, such as a bovine, equine, canine, ovine, or feline.

A "therapeutically effective amount" of a compound with respect to the subject method of treatment refers to an amount of the compound(s) in a preparation which, when administered as part of a desired dosage regimen (to a mammal, preferably a human) alleviates a symptom, ameliorates a condition, or slows the onset of disease conditions according to clinically acceptable standards for the disorder or condition to be treated or the cosmetic purpose, e.g., at a reasonable benefit/risk ratio applicable to any medical treatment.

As used herein, the term "treating" or "treatment" includes reversing, reducing, or arresting the symptoms, clinical signs, and underlying pathology of a condition in a manner to improve or stabilize a subject's condition.

As used herein, the term "administering" means providing a therapeutic agent or composition to a subject, and includes, but is not limited to, administering by a medical professional and self-administering. The means of providing a therapeutic agent are well known to those skilled in the art and include, but are not limited to, oral administration, transdermal administration, administration by inhalation, nasal administration, topical administration, intravaginal administration, intraaural administration, intracerebral administration, rectal administration, and parenteral administration, including injectable such as intravenous administration, intra-arterial administration, intramuscular administration, and subcutaneous administration. Administration can be continuous or intermittent. In various aspects, a preparation can be administered therapeutically; that is, administered to treat an existing disease or condition.

As used herein, the term "treatment" refers to clinical intervention designed to alter the natural course of the individual being treated during the course of clinical pathology. Desirable effects of treatment include decreasing the rate of progression, ameliorating or palliating the pathological state, and remission or improved prognosis of a particular disease, disorder, or condition. An individual is successfully "treated," for example, if one or more symptoms associated with a particular disease, disorder, or condition are mitigated or eliminated.

The term "regulate" has its usual meaning, but also encompasses the meanings of the words enhance (upregulate), inhibit (downregulate), and mimic. In addition, as used herein, the term "expression" when used in connection with a gene such as Npc1l1 or Insig1, has its usual meaning, but also encompasses the transcription of the gene, the longevity of functional mRNA transcribed from the gene, the translation of that mRNA, and the activity of the gene product.

As used herein, the term "cholesterol level" refers to the level of serum cholesterol in a subject or the level of cholesterol forms such as HDL cholesterol, LDL, cholesterol, and VLDL cholesterol, etc.

As used herein, the term "spore-forming bacteria" refers to some bacteria such as the *Turicibacter, Bacillus* and *Clostridium* species that are able to form spores. These spores, also referred to as endospores, are the dormant form of vegetative bacteria and are highly resistant to physical and chemical influences. Disinfection measures for inactivating spores require a special spectrum of activity that covers both the bacterium's vegetative form and spores.

Therapeutic Methods

Provided herein are methods for promoting colonization of spore-forming bacteria in a patient's gut, comprising administering a serotonin receptor agonist. In certain embodiments, the spore-forming bacteria comprises *Turicibacter sanguinis*. In some embodiments, the serotonin receptor agonist is 5-HT, psilocybin, psilocin, N,N-Dimethyltryptamine, 5-methoxy-N,N-dimethyltryptamine, bufotenin, lysergic acid diethylamide, ergine (LSA), mescaline, 2,5-dimethoxy-4-bromophenethylamine, 25I-NBOMe, 3,4-Methylenedioxyamphetamine, or 2,5-Dimethoxy-4-methylamphetamine. In some embodiments, the spore-forming bacteria downregulates the expression of a gene in the patient's gut. In some embodiments, the gene is Bpgm, Neat1, Atf3, Bhlhe40, Slc20a1, Cldn4, 1810011O10Rik, Fam84a, Ctss, Npc1l1, H2-BI, Fos, Ppfia3, Trdmt1, Plekhg6, Scd2, ENSMUSG00000104340, Mfsd7b, Id3, Ccng2, Cdc42se2, Rhou, P2ry2, Got1, Enc1, Mgam, Slc5a1, Ube2q1, Plekhf2, Dsg2, Pgpep1, 0610007P14Rik, Hmgcs1, Ipmk, Fam118a, Stx3, Peli1, Ptgr2, Rgp1, Scly, Dusp8, Ccdc116, Lss, Odf3b, Per3, Msmo1, Smim24, Tef, Sqle, Ldlr, Insig1, Fdft1, Sema3b, or Hmgcr. In some embodiments, the spore-forming bacteria upregulates the expression of a gene in the patient's gut. In some embodiments, the gene is Pdzd2, Ahrr, Txnlp, Rgs1, Smoc1, Atplb2, Nrg1, Il1r1, Pdrg1, Rexo2, ENSMUSG00000102160, ENSMUSG00000108064, Gramdfa, Ckm, Ckb, 8430408G22Rik, Flna, My19, Tagln, Acta2, Anxa6, Ptrf, Hspala, Banp, Hoxb6, Slc15a4, Ddit4, Hsp90ab1, Creld1, Fst, Il1rl1, Slc38a2, Dmrt3, Mocs2, or Atg1612.

Provided herein are methods for reducing colonization of spore-forming bacteria in a patient's gut, comprising administering a selective serotonin reuptake inhibitor. In some embodiments, the spore-forming bacteria comprises *Turicibacter sanguinis*. In some embodiments, the selective serotonin reuptake inhibitor is citalopram, escitalopram, fluoxetine, fluvoxamine, paroxetine, sertraline, dapoxetine, indalpine, zimelidine, alaproclate, centpropazine, cericlamine, femoxetine, ifoxetine, omiloxetine, panuramine, pirandamine, or seproxetine. In some embodiments, the spore-forming bacteria downregulates the expression of a gene in the patient's gut. In some embodiments, the gene is Bpgm, Neat1, Atf3, Bhlhe40, Slc20a1, Cldn4, 1810011O10Rik, Fam84a, Ctss, Npc1l1, H2-BI, Fos, Ppfia3, Trdmt1, Plekhg6, Scd2, ENSMUSG00000104340, Mfsd7b, Id3, Ccng2, Cdc42se2, Rhou, P2ry2, Got1, Enc1, Mgam, Slc5a1, Ube2q1, Plekhf2, Dsg2, Pgpep1, 0610007P14Rik, Hmgcs1, Ipmk, Fam118a, Stx3, Peli1, Ptgr2, Rgp1, Scly, Dusp8, Ccdc116, Lss, Odf3b, Per3, Msmo1, Smim24, Tef, Sqle, Ldlr, Insig1, Fdft1, Sema3b, or Hmgcr. In some embodiments, the spore-forming bacteria upregulates the expression of a gene in the patient's gut. In some embodiments, the gene is Pdzd2, Ahrr, Txnlp, Rgs1, Smoc1, Atp1b2, Nrg1, Il1r1, Pdrg1, Rexo2, ENSMUSG00000102160, ENSMUSG00000108064, Gramdfa, Ckm, Ckb, 8430408G22Rik, Flna, Myl9, Tagln, Acta2, Anxa6, Ptrf, Hspa1a, Banp, Hoxb6, Slc15a4, Ddit4, Hsp90ab1, Creld1, Fst, Il1rl1, Slc38a2, Dmrt3, Mocs2, or Atg1612.

Provided herein are methods for upregulating lipid and steroid metabolism by promoting colonization of spore-forming bacteria in a patient's gut, comprising administering a serotonin receptor agonist. In some embodiments, the spore-forming bacteria is *Turicibacter sanguinis*. In some embodiments, the serotonin receptor agonist is 5-HT, psilocybin, psilocin, N,N-Dimethyltryptamine, 5-methoxy-N,N-dimethyltryptamine, bufotenin, lysergic acid diethylamide, ergine (LSA), mescaline, 2,5-dimethoxy-4-bromophenethylamine, 25I-NBOMe, 3,4-Methylene dioxyamphetamine, or 2,5-Dimethoxy-4-methylamphetamine.

*Turicibacter* downregulates expression of Npc1l1 in the small intestine, which is required for absorption of cholesterol. Increasing *Turicibacter* colonization with 5-HT could reduce intestinal and systemic cholesterol levels, and limit the development of cardiovascular diseases such as atherosclerosis and coronary heart disease. Provided herein are methods for treating or inhibiting cardiovascular disease by promoting colonization of spore-forming bacteria in a patient's gut, comprising administering a serotonin receptor agonist. In some embodiments, the spore-forming bacteria is *Turicibacter sanguinis*. In some embodiments, the serotonin receptor agonist is 5-HT, psilocybin, psilocin, N,N-Dimethyltryptamine, 5-methoxy-N,N-dimethyltryptamine, bufotenin, lysergic acid diethylamide, ergine (LSA), mescaline, 2,5-dimethoxy-4-bromophenethylamine, 25I-NBOMe, 3,4-Methylenedioxyamphetamine, or 2,5-Dimethoxy-4-methylamphetamine. In some embodiments, the spore-forming bacteria downregulates the expression of a gene in the patient's gut. In some embodiments, the gene is Npc1l1. In some embodiments, the cardiovascular disease is arteriosclerosis, atherosclerosis, stroke, ischemia, endothelium dysfunctions, peripheral vascular disease, coronary heart disease, myocardial infarction, cerebral infarction, restenosis, dyslipidemia, dyslipoproteinemia, or hypertension.

*Turicibacter* downregulates expression of Insig1 in the small intestine, which suppresses cholesterol biosynthesis by enterocytes. Therefore, increasing *Turicibacter* colonization with 5-HT could reduce intestinal-derived cholesterol and limit the development of lipid metabolic disorders such as obesity and fatty liver disease. Provided herein are methods for treating or inhibiting a metabolic disorder by promoting colonization of spore-forming bacteria in a patient's gut, comprising administering a serotonin receptor agonist. In some embodiments, the spore-forming bacteria is *Turicibacter Sanguinis*. In some embodiments, wherein the serotonin receptor agonist is 5-HT, psilocybin, psilocin, N,N-Dimethyltryptamine, 5-methoxy-N,N-dimethyltryptamine, bufotenin, lysergic acid diethylamide, ergine (LSA), mescaline, 2,5-dimethoxy-4-bromophenethylamine, 25I-NBOMe, 3,4-Methylenedioxyamphetamine, or 2,5-Dimethoxy-4-methylamphetamine. In some embodiments, the spore-forming bacteria downregulates the expression of a gene in the patient's gut. In some embodiments, the gene is Insig1. In some embodiments, the metabolic disorder is type II diabetes, impaired glucose tolerance, insulin resistance, obesity, fatty liver, non-alcoholic steatohepatitis, or dyslipidemia.

*Turicibacter* upregulates expression of Il1r1 and Il1rl1, which are members of the IL-1 receptor family and promote inflammatory cytokine production by the innate and adaptive immune systems. Reducing *Turicibacter* colonization with fluoxetine could limit intestinal diseases involving anti-microbial (Il1r1) and type 2 (Il1rl1) immune responses. Provided herein are methods for treating or inhibiting an intestinal inflammatory disease by promoting colonization of spore-forming bacteria in a patient's gut, comprising administering a serotonin receptor agonist. In some embodiments, the spore-forming bacteria is *Turicibacter sanguinis*. In some embodiments, the serotonin receptor agonist is 5-HT, psilocybin, psilocin, N,N-Dimethyltryptamine, 5-methoxy-N,N-dimethyltryptamine, bufotenin, lysergic acid diethylamide, ergine (LSA), mescaline, 2,5-dimethoxy-4-bromophenethylamine, 25I-NBOMe, 3,4-Methylene dioxyamphetamine, or 2,5-Dimethoxy-4-methylamphetamine. In some embodiments, the spore-forming bacteria upregulates the expression of a gene in the patient's gut. In some embodiments, the gene is Il1r1 or Il1rl1. In some embodiments, the intestinal inflammatory disease is irritable bowel syndrome (IBS), Crohn's disease, inflammatory bowel disease (IBD), peptic ulcer disease, diarrhea, ileus, post-operative bowel dysmotility, collagenous lymphocytic colitis, vomiting, cyclic vomiting syndrome, chemotherapy-induced nausea and vomiting, radiation-induced nausea and vomiting, postoperative nausea and vomiting, or ulcerative colitis.

Other disease indications (neurological, skeletal muscle) associated with *Turicibacter* colonization such as neurological and skeletal muscle diseases could be treated with the methods provided herein.

In some embodiments, the methods comprise further administering a composition comprising *Turicibacter sanguinis*. In other embodiments, the methods alter neurotransmitter biosynthesis in a subject. In certain embodiments, the methods alter serum ketogenic amino acids in a subject. In other embodiments, the methods decrease gamma-glutamyltranspeptidase activity in a subject. In certain embodiments, the methods decrease glutamine synthase activity in a subject. In other embodiments, the methods decrease gamma-glutamyl amino acids in a subject. In certain embodiments, the methods increase GABA/glutamate ratio levels in a subject. In other embodiments, the methods increase glutamine levels in a subject. In other embodiments, the methods provided herein comprise depleting the gut microbiota of the subject and administering a composition comprising *Turicibacter sanguinis* to the subject. In some embodiments, the subject has epilepsy (e.g., refractory or non-refractory epilepsy). In some embodiments, the subject has a neurodevelopmental disorder. Representative neurodevelopmental disorders include autism spectrum disorder, Rett syndrome, fragile X, attention deficit disorder, and attention-deficit/hyperactivity disorder. In some embodiments, the neurodevelopmental disorder is a disorder known to be comorbid with seizures.

In some embodiments, the bacterial DNA in subject's gut microbiota is sequenced. The subject's gut bacterial DNA may be sequenced prior to administration of the composition. For example, a sample comprising bacterial DNA may be obtained from the subject, and the bacterial DNA is then sequenced for *Turicibacter* DNA, therefore measuring the presence or level of *Turicibacter* in the subject's gut microbiota. The serotonin receptor agonist disclosed herein may then be administered to the subject if the level of *Turicibacter* is low. In some embodiments, the subject is deemed to have low levels of *Turicibacter* if less than 0.0001%, less than 0.001%, less than 0.01%, less than 0.02%, less than 0.03%, less than 0.04%, less than 0.05%, less than 0.06% less than 0.07%, less than 0.08%, less than 0.09%, less than 0.1%, less than 0.2%, less than 0.3% less than 0.4%, less than 0.5%, less than 0.6%, less than 0.7%, less than 0.8%, less than 0.9%, less than 1%, less than 2%, less than 3%, less than 5%, less than 7%, less than 10%, less than 20%, less than 30%, less than 40%, or less than 50% of the bacteria in the sample is DNA. The selective serotonin reuptake inhibitor disclosed herein may then be administered to the subject if the level of *Turicibacter* is high. In some embodiments, the subject is deemed to have high levels of *Turicibacter* if more than 0.0001%, more than 0.001%, more than 0.01%, more than 0.02%, more than 0.03%, more than 0.04%, more than 0.05%, more than 0.06% more than 0.07%, more than 0.08%, more than 0.09%, more than 0.1%, more than 0.2%, more than 0.3% more than 0.4%, more than 0.5%, more than 0.6%, more than 0.7%, more than 0.8%, more than 0.9%, more than 1%, more than 2%, more than 3%, more than 5%, more than 7%, more than 10%, more than 20%, more than 30%, more than 40%, or levss than 50% of the bacteria in the sample is DNA. Bacterial DNA to be sequenced may be obtained through any means known in the art, including, but not limited to, obtaining a fecal sample from the subject and isolating the bacterial DNA. Bacterial DNA sequencing by any known technique in the art, including, but not limited to, Maxam Gilbert sequencing, Sanger sequencing, shotgun sequencing, bridge PCR, or next generation sequencing methods, such as massively parallel signature sequencing (MPSS), polony sequencing, 454 pyrosequencing, Illumina (Solexa) sequencing, SOLiD sequencing, Ion torrent semiconductor sequencing, DNA nanoball sequencing, heliscope single molecule sequencing, single molecule real time (SMRT) sequencing, or nanopore DNA sequencing.

Bacterial Compositions

In certain aspects, provided herein are bacterial compositions comprising a spore-forming bacteria (such as, preferably, *Turicibacter sanguinis*) and optionally a serotonin receptor modulator. In some embodiments, the serotonin receptor modulator is a serotonin receptor agonist, such as, 5-HT, psilocybin, psilocin, N,N-Dimethyltryptamine, 5-methoxy-N,N-dimethyltryptamine, bufotenin, lysergic acid diethylamide, ergine (LSA), mescaline, 2,5-dimethoxy-4-bromophenethylamine, 25I-NBOMe, 3,4-Methylenedioxyamphetamine, or 2,5-Dimethoxy-4-methylamphetamine. In other embodiments, the serotonin receptor modulator is a selective serotonin reuptake inhibitor, such as citalopram, escitalopram, fluoxetine, fluvoxamine, paroxetine, sertraline, dapoxetine, indalpine, zimelidine, alaproclate, centpropazine, cericlamine, femoxetine, ifoxetine, omiloxetine, panuramine, pirandamine, or seproxetine. In some embodiments, the bacterial formulation comprises a bacterium and/or a combination of bacteria described herein and a pharmaceutically acceptable carrier.

In certain embodiments, at least 50%, 55%, 60%, 65%, 70%, 75%, 80%, 85%, 90%, 91%, 92%, 93%, 94%, 95%, 96%, 97%, 98% or 99% of the bacteria in the bacterial composition are *Turicibacter sanguinis*. In certain embodiments, substantially all of the bacteria in the bacterial composition are *Turicibacter sanguinis*. In certain embodiments, the bacterial composition comprises at least $1\times10^3$ colony forming units (CFUs), $1\times10^4$ colony forming units (CFUs), $1\times10^5$ colony forming units (CFUs), $5\times10^5$ colony forming units (CFUs), $1\times10^6$ colony forming units (CFUs), $2\times10^6$ colony forming units (CFUs), $3\times10^6$ colony forming units (CFUs), $4\times10^6$ colony forming units (CFUs), $5\times10^6$ colony forming units (CFUs), $6\times10^6$ colony forming units (CFUs), $7\times10^6$ colony forming units (CFUs), $8\times10^6$ colony forming units (CFUs), $9\times10^6$ colony forming units (CFUs), $1\times10^7$ colony forming units (CFUs), $2\times10^7$ colony forming units (CFUs), $3\times10^7$ colony forming units (CFUs), $4\times10^7$ colony forming units (CFUs), $5\times10^7$ colony forming units (CFUs), $6\times10^7$ colony forming units (CFUs), $7\times10^7$ colony forming units (CFUs), $8\times10^7$ colony forming units (CFUs), $9\times10^7$ colony forming units (CFUs), $1\times10^8$ colony forming units (CFUs), $2\times10^8$ colony forming units (CFUs), $3\times10^8$ colony forming units (CFUs), $4\times10^8$ colony forming units (CFUs), $5\times10^8$ colony forming units (CFUs), $6\times10^8$ colony forming units (CFUs), $7\times10^8$ colony forming units (CFUs), $8\times10^8$ colony forming units (CFUs), $9\times10^8$ colony forming units (CFUs), $1\times10^9$ colony forming units (CFUs), $5\times10^9$ colony forming units (CFUs), $1\times10^{10}$ colony forming units (CFUs) $5\times10^{10}$ colony forming units (CFUs), $1\times1011$ colony forming units (CFUs) $5\times1011$ colony forming units (CFUs), $1\times10^{12}$ colony forming units (CFUs) $5\times10^{12}$ colony forming units (CFUs), $1\times10^{13}$ colony forming units (CFUs) of *Turicibacter sanguinis*.

The selected dosage level will depend upon a variety of factors including the subject's diet, the route of administration, the time of administration, the residence time of the particular microorganism being employed, the duration of the treatment, other drugs, compounds and/or materials used in combination with the particular composition employed, the age, sex, weight, condition, general health and prior medical history of the patient being treated, and like factors well known in the medical arts.

A physician or veterinarian having ordinary skill in the art can readily determine and prescribe the effective amount of the pharmaceutical composition required. For example, the physician or veterinarian could prescribe and/or administer doses of the bacteria employed in the pharmaceutical composition at levels lower than that required in order to achieve the desired therapeutic effect and gradually increase the dosage until the desired effect is achieved.

In some embodiments, probiotic formulations containing *Turicibacter sanguinis* are provided as encapsulated, enteric coated, or powder forms, with doses ranging up to $10^{11}$ cfu (e.g., up to $10^{10}$ cfu). In some embodiments, the composition comprises $5\times10^{11}$ cfu of *Turicibacter sanguinis* and 10% (w/w) corn starch in a capsule. In some embodiments, the capsule is enteric coated, e.g., for duodenal release at pH 5.5. In some embodiments, the composition comprises a powder of freeze-dried *Turicibacter Sanguinis* which is deemed to have "Qualified Presumption of Safety" (QPS) status. In some embodiments, the composition is storage-stable at frozen or refrigerated temperature. As used herein, "stably stored" or "storage-stable" refer to a composition in which cells are able to withstand storage for extended periods of time (e.g., at least one month, or two, three, four, six, or twelve months or more) with a less than 95%, 90%, 80%, 70%, 60%, 50%, 40%, 30%, 20%, 15%, 10%, 5%, or 1% decrease in cell viability.

Methods for producing microbial compositions may include three main processing steps. The steps are: organism banking, organism production, and preservation. In certain embodiments, a sample that contains an abundance of *Turicibacter sanguinis* may be cultured by avoiding an isolation step.

For banking, *Turicibacter sanguinis* included in the microbial composition may be (1) isolated directly from a specimen or taken from a banked stock, (2) optionally cultured on a nutrient agar or broth that supports growth to generate viable biomass, and (3) the biomass optionally preserved in multiple aliquots in long-term storage.

In some embodiments using a culturing step, the agar or broth may contain nutrients that provide essential elements and specific factors that enable growth. An example would be a medium composed of 20 g/L glucose, 10 g/L yeast extract, 10 g/L soy peptone, 2 g/L citric acid, 1.5 g/L sodium phosphate monobasic, 100 mg/L ferric ammonium citrate, 80 mg/L magnesium sulfate, 10 mg/L hemin chloride, 2 mg/L calcium chloride, 1 mg/L menadione. Another example would be a medium composed of 10 g/L beef extract, 10 g/L peptone, 5 g/L sodium chloride, 5 g/L dextrose, 3 g/L yeast extract, 3 g/L sodium acetate, 1 g/L soluble starch, and 0.5 g/L L-cysteine HCl, at pH 6.8. A variety of microbiological media and variations are well known in the art (e.g., R. M. Atlas, Handbook of Microbiological Media (2010) CRC Press). Culture media can be added to the culture at the start, may be added during the culture, or may be intermittently/continuously flowed through the culture. The strains in the bacterial composition may be cultivated alone, as a subset of the microbial composition, or as an entire collection comprising the microbial composition. As an example, a first strain may be cultivated together with a second strain in a mixed continuous culture, at a dilution rate lower than the maximum growth rate of either cell to prevent the culture from washing out of the cultivation.

The inoculated culture is incubated under favorable conditions for a time sufficient to build biomass. For microbial compositions for human use this is often at 37° C. temperature, pH, and other parameter with values similar to the normal human niche. The environment may be actively controlled, passively controlled (e.g., via buffers), or allowed to drift. For example, for anaerobic bacterial compositions, an anoxic/reducing environment may be employed. This can be accomplished by addition of reducing agents such as cysteine to the broth, and/or stripping it of oxygen. As an example, a culture of a bacterial composition may be grown at 37° C., pH 7, in the medium above, pre-reduced with 1 g/L cysteine-HCl.

When the culture has generated sufficient biomass, it may be preserved for banking. The organisms may be placed into a chemical milieu that protects from freezing (adding 'cryoprotectants'), drying ('lyoprotectants'), and/or osmotic shock ('osmoprotectants'), dispensing into multiple (optionally identical) containers to create a uniform bank, and then treating the culture for preservation. Containers are generally impermeable and have closures that assure isolation from the environment. Cryopreservation treatment is accomplished by freezing a liquid at ultra-low temperatures (e.g., at or below −80° C.). Dried preservation removes water from the culture by evaporation (in the case of spray drying or 'cool drying') or by sublimation (e.g., for freeze drying, spray freeze drying). Removal of water improves long-term microbial composition storage stability at temperatures elevated above cryogenic conditions. Microbial composition banking may be done by culturing and preserving the strains individually, or by mixing the strains together to create a combined bank. As an example of cryopreservation, a microbial composition culture may be harvested by centrifugation to pellet the cells from the culture medium, the supernatant decanted and replaced with fresh culture broth containing 15% glycerol. The culture can then be aliquoted into 1 mL cryotubes, sealed, and placed at −80° C. for long-term viability retention. This procedure achieves acceptable viability upon recovery from frozen storage.

Microbial production may be conducted using similar culture steps to banking, including medium composition and culture conditions described above. It may be conducted at larger scales of operation, especially for clinical development or commercial production. At larger scales, there may be several subcultivations of the microbial composition prior to the final cultivation. At the end of cultivation, the culture is harvested to enable further formulation into a dosage form for administration. This can involve concentration, removal of undesirable medium components, and/or introduction into a chemical milieu that preserves the microbial composition and renders it acceptable for administration via the chosen route. For example, a microbial composition may be cultivated to a concentration of $10^{10}$ CFU/mL, then concentrated 20-fold by tangential flow microfiltration; the spent medium may be exchanged by diafiltering with a preservative medium consisting of 2% gelatin, 100 mM trehalose, and 10 mM sodium phosphate buffer. The suspension can then be freeze-dried to a powder and titrated.

After drying, the powder may be blended to an appropriate potency, and mixed with other cultures and/or a filler such as microcrystalline cellulose for consistency and ease of handling, and the bacterial composition formulated as provided herein.

In certain aspects, provided are bacterial compositions for administration in subjects. In some embodiments, the bacterial compositions are combined with additional active and/or inactive materials in order to produce a final product, which may be in single dosage unit or in a multi-dose format.

In some embodiments, the composition comprises at least one carbohydrate. A "carbohydrate" refers to a sugar or polymer of sugars. The terms "saccharide," "polysaccharide," "carbohydrate," and "oligosaccharide" may be used interchangeably. Most carbohydrates are aldehydes or ketones with many hydroxyl groups, usually one on each carbon atom of the molecule. Carbohydrates generally have the molecular formula $C_nH_{2n}O_n$. A carbohydrate may be a monosaccharide, a disaccharide, trisaccharide, oligosaccharide, or polysaccharide. The most basic carbohydrate is a monosaccharide, such as glucose, sucrose, galactose, mannose, ribose, arabinose, xylose, and fructose. Disaccharides are two joined monosaccharides. Exemplary disaccharides include sucrose, maltose, cellobiose, and lactose. Typically, an oligosaccharide includes between three and six monosaccharide units (e.g., raffinose, stachyose), and polysaccharides include six or more monosaccharide units. Exemplary polysaccharides include starch, glycogen, and cellulose. Carbohydrates may contain modified saccharide units such as 2'-deoxyribose wherein a hydroxyl group is removed, 2'-fluororibose wherein a hydroxyl group is replaced with a fluorine, or N-acetylglucosamine, a nitrogen-containing form of glucose (e.g., 2'-fluororibose, deoxyribose, and hexose). Carbohydrates may exist in many different forms, for example, conformers, cyclic forms, acyclic forms, stereoisomers, tautomers, anomers, and isomers.

In some embodiments, the composition comprises at least one lipid. As used herein, a "lipid" includes fats, oils, triglycerides, cholesterol, phospholipids, fatty acids in any form including free fatty acids. Fats, oils and fatty acids can be saturated, unsaturated (cis or trans) or partially unsaturated (cis or trans). In some embodiments the lipid comprises at least one fatty acid selected from lauric acid (12:0), myristic acid (14:0), palmitic acid (16:0), palmitoleic acid (16:1), margaric acid (17:0), heptadecenoic acid (17:1), stearic acid (18:0), oleic acid (18:1), linoleic acid (18:2), linolenic acid (18:3), octadecatetraenoic acid (18:4), arachidic acid (20:0), eicosenoic acid (20:1), eicosadienoic acid (20:2), eicosatetraenoic acid (20:4), eicosapentaenoic acid (20:5) (EPA), docosanoic acid (22:0), docosenoic acid (22:1), docosapentaenoic acid (22:5), docosahexaenoic acid (22:6) (DHA), and tetracosanoic acid (24:0). In some embodiments the composition comprises at least one modified lipid, for example a lipid that has been modified by cooking.

In some embodiments, the composition comprises at least one supplemental mineral or mineral source. Examples of minerals include, without limitation: chloride, sodium, calcium, iron, chromium, copper, iodine, zinc, magnesium, manganese, molybdenum, phosphorus, potassium, and selenium. Suitable forms of any of the foregoing minerals include soluble mineral salts, slightly soluble mineral salts, insoluble mineral salts, chelated minerals, mineral complexes, non-reactive minerals such as carbonyl minerals, and reduced minerals, and combinations thereof.

In some embodiments, the composition comprises at least one supplemental vitamin. The at least one vitamin can be fat-soluble or water soluble vitamins. Suitable vitamins include but are not limited to vitamin C, vitamin A, vitamin E, vitamin B12, vitamin K, riboflavin, niacin, vitamin D, vitamin B6, folic acid, pyridoxine, thiamine, pantothenic acid, and biotin. Suitable forms of any of the foregoing are salts of the vitamin, derivatives of the vitamin, compounds having the same or similar activity of the vitamin, and metabolites of the vitamin.

In some embodiments, the composition comprises an excipient. Non-limiting examples of suitable excipients include a buffering agent, a preservative, a stabilizer, a binder, a compaction agent, a lubricant, a dispersion enhancer, a disintegration agent, a flavoring agent, a sweetener, and a coloring agent.

In some embodiments, the excipient is a buffering agent. Non-limiting examples of suitable buffering agents include sodium citrate, magnesium carbonate, magnesium bicarbonate, calcium carbonate, and calcium bicarbonate.

In some embodiments, the excipient comprises a preservative. Non-limiting examples of suitable preservatives include antioxidants, such as alpha-tocopherol and ascorbate, and antimicrobials, such as parabens, chlorobutanol, and phenol.

In some embodiments, the composition comprises a binder as an excipient. Non-limiting examples of suitable binders include starches, pregelatinized starches, gelatin, polyvinylpyrolidone, cellulose, methylcellulose, sodium carboxymethylcellulose, ethylcellulose, polyacrylamides, polyvinyloxoazolidone, polyvinylalcohols, C12-C18 fatty acid alcohol, polyethylene glycol, polyols, saccharides, oligosaccharides, and combinations thereof.

In some embodiments, the composition comprises a lubricant as an excipient. Non-limiting examples of suitable lubricants include magnesium stearate, calcium stearate, zinc stearate, hydrogenated vegetable oils, sterotex, polyoxyethylene monostearate, talc, polyethyleneglycol, sodium benzoate, sodium lauryl sulfate, magnesium lauryl sulfate, and light mineral oil.

In some embodiments, the composition comprises a dispersion enhancer as an excipient. Non-limiting examples of suitable dispersants include starch, alginic acid, polyvinylpyrrolidones, guar gum, kaolin, bentonite, purified wood cellulose, sodium starch glycolate, isoamorphous silicate, and microcrystalline cellulose as high HLB emulsifier surfactants.

In some embodiments, the compositions of the present invention are combined with a carrier (e.g., a pharmaceutically acceptable carrier) which is physiologically compatible with the gastrointestinal tissue of the subject(s) to which it is administered. Carriers can be comprised of solid-based, dry materials for formulation into tablet, capsule or powdered form; or the carrier can be comprised of liquid or gel-based materials for formulations into liquid or gel forms. The specific type of carrier, as well as the final formulation depends, in part, upon the selected route(s) of administration. The therapeutic composition of the present invention may also include a variety of carriers and/or binders. In some embodiments, the carrier is micro-crystalline cellulose (MCC) added in an amount sufficient to complete the one gram dosage total weight. Carriers can be solid-based dry materials for formulations in tablet, capsule or powdered form, and can be liquid or gel-based materials for formulations in liquid or gel forms, which forms depend, in part, upon the routes of administration. Typical carriers for dry formulations include, but are not limited to: trehalose, malto-dextrin, rice flour, microcrystalline cellulose (MCC) magnesium sterate, inositol, FOS, GOS, dextrose, sucrose, and like carriers. Suitable liquid or gel-based carriers include but are not limited to: water and physiological salt solutions; urea; alcohols and derivatives (e.g., methanol, ethanol, propanol, butanol); glycols (e.g., ethylene glycol, propylene glycol, and the like). Preferably, water-based carriers possess a neutral pH value (i.e., pH 7.0). Other carriers or agents for administering the compositions described herein are known in the art, e.g., in U.S. Pat. No. 6,461,607.

In some embodiments, the composition comprises a disintegrant as an excipient. In some embodiments, the disintegrant is a non-effervescent disintegrant. Non-limiting examples of suitable non-effervescent disintegrants include starches such as corn starch, potato starch, pregelatinized and modified starches thereof, sweeteners, clays, such as bentonite, micro-crystalline cellulose, alginates, sodium starch glycolate, gums such as agar, guar, locust bean, karaya, pectin, and tragacanth. In some embodiments the disintegrant is an effervescent disintegrant. Non-limiting examples of suitable effervescent disintegrants include sodium bicarbonate in combination with citric acid, and sodium bicarbonate in combination with tartaric acid.

In some embodiments, the bacterial formulation comprises an enteric coating or micro encapsulation. In certain embodiments, the enteric coating or micro encapsulation improves targeting to a desired region of the gastrointestinal tract. For example, in certain embodiments, the bacterial composition comprises an enteric coating and/or microcapsules that dissolves at a pH associated with a particular region of the gastrointestinal tract. In some embodiments, the enteric coating and/or microcapsules dissolve at a pH of about 5.5-6.2 to release in the duodenum, at a pH value of about 7.2-7.5 to release in the ileum, and/or at a pH value of about 5.6-6.2 to release in the colon. Exemplary enteric coatings and microcapsules are described, for example, in U.S. Pat. Pub. No. 2016/0022592, which is hereby incorporated by reference in its entirety.

In some embodiments, the composition is a food product (e.g., a food or beverage) such as a health food or beverage, a food or beverage for infants, a food or beverage for pregnant women, athletes, senior citizens or other specified group, a functional food, a beverage, a food or beverage for specified health use, a dietary supplement, a food or beverage for patients, or an animal feed. Specific examples of the foods and beverages include various beverages such as juices, refreshing beverages, tea beverages, drink preparations, jelly beverages, and functional beverages; alcoholic beverages such as beers; carbohydrate-containing foods such as rice food products, noodles, breads, and pastas; paste products such as fish hams, sausages, paste products of seafood; retort pouch products such as curries, food dressed with a thick starchy sauces, and Chinese soups; soups; dairy products such as milk, dairy beverages, ice creams, cheeses, and yogurts; fermented products such as fermented soybean pastes, yogurts, fermented beverages, and pickles; bean products; various confectionery products, including biscuits, cookies, and the like, candies, chewing gums, gummies, cold desserts including jellies, cream caramels, and frozen desserts; instant foods such as instant soups and instant soy-bean soups; microwavable foods; and the like. Further, the examples also include health foods and beverages prepared in the forms of powders, granules, tablets, capsules, liquids, pastes, and jellies. The composition may be a fermented food product, such as, but not limited to, a fermented milk product. Non-limiting examples of fermented food products include kombucha, sauerkraut, pickles, miso, tempeh, natto, kimchi, raw cheese, and yogurt. The composition may also be a food additive, such as, but not limited to, an acidulent (e.g., vinegar). Food additives can be divided into several groups based on their effects. Non-limiting examples of food additives include acidulents (e.g., vinegar, citric acid, tartaric acid, malic acid, fumaric acid, and lactic acid), acidity regulators, anticaking agents, antifoaming agents, foaming agents, antioxidants (e.g., vitamin C), bulking agents (e.g., starch), food coloring, fortifying agents, color retention agents, emulsifiers, flavors and flavor enhancers (e.g., monosodium glutamate), flour treatment agents, glazing agents, humectants, tracer gas, preservatives, stabilizers, sweeteners, and thickeners.

In certain embodiments, the bacteria disclosed herein are administered in conjunction with a prebiotic to the subject. Prebiotics are carbohydrates which are generally indigestible by a host animal and are selectively fermented or metabolized by bacteria. Prebiotics may be short-chain carbohydrates (e.g., oligosaccharides) and/or simple sugars (e.g., mono- and di-saccharides) and/or mucins (heavily glycosylated proteins) that alter the composition or metabolism of a microbiome in the host. The short chain carbohydrates are also referred to as oligosaccharides, and usually contain from 2 or 3 and up to 8, 9, 10, 15 or more sugar moieties. When prebiotics are introduced to a host, the prebiotics affect the bacteria within the host and do not directly affect the host. In certain aspects, a prebiotic composition can selectively stimulate the growth and/or activity of one of a limited number of bacteria in a host. Prebiotics include oligosaccharides such as fructooligosaccharides (FOS) (including inulin), galactooligosaccharides (GOS), trans-galactooligosaccharides, xylooligosaccharides (XOS), chitooligosaccharides (COS), soy oligosaccharides (e.g., stachyose and raffinose) gentiooligosaccharides, iso-maltooligosaccharides, mannooligosaccharides, maltooligosaccharides and mannanoligosaccharides. Oligosaccharides are not necessarily single components, and can be mixtures containing oligosaccharides with different degrees of oligomerization, sometimes including the parent disaccharide and the monomeric sugars. Various types of oligosaccharides are found as natural components in many common foods, including fruits, vegetables, milk, and honey. Specific examples of oligosaccharides are lactulose, lactosucrose, palatinose, glycosyl sucrose, guar gum, gum Arabic, tagalose, amylose, amylopectin, pectin, xylan, and cyclodextrins. Prebiotics may also be purified or chemically or enzymatically synthesized.

The invention now being generally described, it will be more readily understood by reference to the following examples, which are included merely for purposes of illustration of certain aspects and embodiments of the present invention, and are not intended to limit the invention.

EXEMPLIFICATION

Example 1: Materials and Methods

Mice

C57Bl/6 and SERT$^{-/-}$ mice were purchased from Jackson Laboratories, reared as SPF or C-section rederived as GF and bred in flexible film isolators at the UCLA Center for Health Sciences barrier facility. Breeding animals were fed "breeder" chow (Lab Diets 5K52). Experimental animals were fed standard chow (Lab Diets 5010). Colonization status was monitored weekly by aerobic and anaerobic bacterial cfu plating and by 16S rDNA qPCR from fecal DNA extracted and amplified using the MoBio PowerSoil kit, SYBR green master mix (ThermoFisher) and QuantStudio 5 thermocycler (ThermoFisher). 6-12 week old mice were randomly assigned to experimental groups, which included age- and sex-matched cohorts of males and females. Sample sizes for the animal experiments were determined based on previous experience with the experimental paradigm, existing literature utilizing the experimental paradigm, or power calculation. Samples derived from animals were blinded to the experimenter for imaging- and sequencing-based analyses. All experiments were performed in accordance with the NIH Guide for the Care and Use of Laboratory Animals using protocols approved by the Institutional Animal Care and Use Committee at UCLA.

5-HT Supplementation in Mice for Microbiota Profiling

Water was supplemented with 5-HT (Sigma Aldrich) at 1.5 mg/ml provided ad libitum to mice for 2 weeks. The amount of water consumed and mouse weight were measured on days 3, 7, 10 and 14 of treatment. Mice were sacrificed one day after treatment for 5-HT assays and fecal 16S rDNA profiling was conducted as described below.

5-HT Measurements

Blood samples were collected by cardiac puncture and spun through SST vacutainers (Becton Dickinson) for serum separation. The entire length of the colon or 1 cm regions of the distal, medial and proximal small intestine was washed in PBS to remove the luminal contents, and sonicated on ice in 10 s intervals at 20 mV in ELISA standard buffer supplemented with ascorbic acid (Eagle Biosciences). Fecal pellets and intestinal contents were weighed and homogenized at 50 mg/ml in ELISA standard buffer supplemented with ascorbic acid. Serotonin levels were detected by ELISA according to the manufacturer's instructions (Eagle Biosciences). Readings from tissue samples were normalized to total protein content as detected by BCA assay or the 660 nm Protein Assay (Thermo Pierce).

16S rDNA Sequencing

Bacterial genomic DNA was extracted from mouse fecal samples using the MoBio PowerSoil Kit. The library was generated according to methods adapted from Capraso J. G., et al., PNAS 108 Suppl 1, 4516-4522 (2011). The V4 regions of the 16S rDNA gene were PCR amplified using individually barcoded universal primers and 30 ng of the extracted genomic DNA. The PCR reaction was set up in triplicate, and the PCR product was purified using the Qiaquick PCR purification kit (Qiagen). In total, 250 ng of purified PCR product from each sample was pooled and sequenced by Laragen, Inc. using the Illumina MiSeq platform and 2×250 bp reagent kit for paired-end sequencing. Operational taxonomic units (OTUs) were chosen by open reference OTU picking based on 97% sequence similarity to the Greengenes 13_5 database. Taxonomy assignment and rarefaction were performed using QIIME1.8.0. Metagenomes were inferred from closed reference OTU tables using PICRUSt.

Sequence Alignment and Structural Modeling

The Joint Genome Institute Integrated Microbial Genomes and Microbiomes and NCBI microbial genomes databases were searched for proteins with sequence similarity to human SERT. Phylogenetic trees were generated for the 15 bacterial candidates with the highest alignment scores using MAFFT and Phylo.io. Primer sets were generated against the SERT homologue ZP_06621923.1 from *T. sanguinis* PC909 and used to sequence the homologous gene encoding CUW_0748 in *T. sanguinis* MOL361. Protein structural models were created in Phyre2 and with MODELLER 9v15, based on the highest-resolution available structure of human SERT—namely, Protein Data Bank entry 5i6x chain A, an outward-open conformation bound to paroxetine at 3.14-Å resolution. After initially aligning their sequences using AlignMe v1.1 in PST mode, and inspection of the Ramachandran plot of the initial model, the alignment was refined at positions with strained backbone dihedral angles (see FIG. 7A for final alignment), and the model was rebuilt. Based on analysis of the binding site conservation in the initial model, an $Na^+$ ion was included at the Na2 site, using the position observed in a related hSERT template structure (Protein Data Bank entry 5i71 chain A). A total of 500 models were built using different seeds, and a single model was selected, specifically that with the highest ProQM score and fewest Ramachandran outliers, according to ProCheck. To remove local clashes and optimize geometry, this model was energy minimized using the CHARMM36 force field with NAMD version 2.9, while constraining the backbone atoms and ion at Na2. Further quality assessment was carried out using MolProbity, and ConSurf (FIG. 7B, E). Structural models were visualized in Chimera and PyMol v1.7 [Schrödinger, LLC]. Residues involved in 5-HT, $Cl^{1-}$ and $Na^+$ binding in mammalian SERT were assessed.

Bacterial Isolation and Cultivation

*Turicibacter sanguinis* MOL361 (DSM-14220, DSMZ) was grown in Schaedler's Broth (BD Biosciences) in an anaerobic chamber of 10% carbon dioxide, 5% hydrogen, and balanced nitrogen. *Bacteroides thetaiotaomicron* (ATCC 29148) was grown in Brain Heart Infusion media (BD Biosciences) supplemented with 5 ug/ml hemin (Frontier Scientific) and 0.5 ug/ml vitamin K1 (Sigma Aldrich) under the same anaerobic conditions. Mouse- and human-derived spore-forming bacterial consortia were isolated by chloroform treatment and propagated in mice.

Heterologous Expression in *B. Theta*

CUW_0748 from *T. sanguinis* MOL361 was PCR amplified and cloned into the expression vector pFD340 using one-step sequence- and ligation-independent cloning (SLIC) protocols described in (46). The vector was transformed into *E. coli* with selection using 100 ug/ml ampicillin and conjugated into *B. theta* using the *E. coli* helper plasmid RK231 with 50 ug/ml kanamycin selection. *E. coli* was killed using 200 ug/ml gentamicin and transconjugant strains were selected using 5 ug/ml erythromycin. Successful conjugation and gene expression were confirmed by PCR and qPCR for CUW_0748 in DNA and RNA extracted from *B. theta* clones.

*Turicibacter* Colonization of Germ-Free Mice

*T. sanguinis* MOL361 was anaerobically cultured as described above, washed, pelleted and re-suspended at $10^6$ cfu/ml in pre-reduced PBS. GF mice were gavaged with 200 ul bacterial suspension and maintained under sterile conditions for at least 2 weeks.

App+ Uptake Assay

*T. sanguinis* and *B. theta* were cultured anaerobically as described above and subcultured for 15-17 h to reach the stationaryphase. Bacterial APP+ transport activity was measured according to the manufacturer's instructions using the Neurotransmitter Transporter Uptake Assay Kit (Molecular Devices). Briefly, cells were pre-treated with vehicle, 20 nM to 200 uM unlabeled 5-HT (Sigma Aldrich), fluoxetine (Tocris), dopamine (Sigma Aldrich) or norepinephrine (Sigma Aldrich) for 30 min at 37° C. Dosages were determined based on physiologically- and pharmacologically relevant concentrations of ~170 uM 5-HT in mouse colon and ~130 uM fluoxetine scaled from human clinical treatments, respectively. Then cells were treated with APP+ for 4 hours at 37° C. Intracellular fluorescence signal was measured at 520 nm using a multimodal plate reader (Biotek Synergy H1). Bacterial suspensions were mounted on slides and imaged using an epifluorescence microscope (EVOS). Images of *B. theta* were brightened by 90% to resolve fluorescence signal.

[$^3$H]5-HT, [$^3$H] NE and [$^3$H] Trp Uptake Assay

*T. sanguinis* or *B. theta* were cultured anaerobically as described above and subcultured for 15-17 h to reach the stationary phase. Cells were washed and resuspended in Kreb-Ringer's buffer, then left untreated or pretreated with vehicle, unlabeled 5-HT (Sigma Aldrich), fluoxetine (Santa Cruz), reserpine (Sigma Aldrich) or tetrabenazine (Sigma Aldrich) for 30 min at 37° C. Cells were then incubated with 1 μM tritiated 5-HT (plus 0-500 μM unlabelled 5-HT for dose-dependent assays), NE or Trp (PerkinElmer). For *T. sanguinis*, all uptake reactions were performed at room temperature. For *B. theta*, uptake reactions were performed at either room temperature or 37° C. Uptake reactions were terminated by washing in ice cold Kreb-Ringer's buffer. Washed *T. sanguinis* was trapped through 0.45 um PVDF filters on MultiScreenHTS plates connected to a vacuum manifold (EMD Millipore). For *B. theta*, washed cells were either trapped through 0.45-μm PVDF filters or lysed by incubating in TE buffer plus triton and lysozyme. Extracted filters or lysed cells were incubated in 4 ml Filter Count scintillation fluid (Perkin Elmer) for 1 hour at room temp, and radioactivity was measured using a liquid scintillation counter (Beckman LS6500).

Bacterial Transcriptomic Analysis

*T. sanguinis* was cultured anaerobically as described above and subcultured to mid-log-phase. Cells were incubated in culture media supplemented with vehicle, 200 uM 5-HT (Sigma Aldrich), fluoxetine (Tocris) or 5-HT with fluoxetine for 4 hours at 37° C. Bacteria were washed with PBS and lysed in TE buffer containing 1.2% Triton X-100 and 15 mg/ml lysozyme. RNA was extracted using the RNAeasy Mini kit with on-column genomic DNA-digest (Qiagen). cDNA synthesis was performed using the qScript cDNA synthesis kit (Quantabio). RNA quality of RIN>8.0 was confirmed using the 4200 Tapestation system (Agilent). rRNA were removed with the Ribo-Zero Bacterial kit (Illumina), RNA was prepared using the TruSeq Stranded RNA kit (Illumina) and 2×75 bp paired end reads were sequenced using the Illumina HiSeq platform by the UCLA Neuroscience Genomics Core. The bacterial RNAseq analysis package Rockhopper was used for quality filtering, mapping against the T. sanguinis PC909 genome and differential expression analysis. Over 23.79 million reads were obtained for each sample, with 86-88% aligning to protein-coding genes. Heatmaps containing differentially expressed genes with adjusted $p<0.05$ and coefficient of variation (standard deviation/mean)<3 were generated using the pheatmap package for R. GO term enrichment analysis of differentially expressed genes with adjusted $p<0.05$ was conducted using DAVID. Functional protein networks were generated with differentially expressed genes with adjusted $p<0.05$ using STRING. Bacterial FM 4-64 staining and imaging. Overnight cultures of T. sanguinis MOL361 were pooled and treated with vehicle, 5-HT (200 μM), fluoxetine (200 μM) or 5-HT and fluoxetine (both 200 μM) for 24 h at 37° C. Cells were washed with PBS, fixed in 4% paraformaldehyde, and stained with FM4-64 (5 μg ml−1) and 4′,6-diamidino-2-phenylindole (DAPI; 0.2 μg ml−1) according to the manufacturer's instructions. Cells were wet-mounted on glass slides and cover slips. Images were acquired at 63× using the Zeiss LSM 780 confocal microscope. Images were analysed using Fiji software51 by a researcher blinded to the experimental group. FM 4-64 puncta were counted manually based on circularity and fluorescence intensity. Counts were normalized to cell area, as determined by thresholding of DAPI staining.

*Turicibacter* Colonization of Antibiotic-Treated Mice

SPF mice were treated with ampicillin, gentamicin, neomycin and vancomycin (AGNV) in their drinking water at 0.5 g/L for 4 days. Fecal samples were collected and plated anaerobically to confirm bacterial clearance. After an additional day on sterile water, antibiotic-treated mice were orally gavaged once daily for 5 days with $10^6$ cfu/mouse T. sanguinis MOL361 that was pre-treated with 200 uM 5-HT, fluoxetine or vehicle for 4 hours at 37° C. Mice were also maintained on regular water, 5-HT (24 μg/ml) or 5-HT (24 μg/ml) with fluoxetine (40 μg/ml) in the drinking water over the same 5 days of *Turicibacter* oral gavage. Fluoxetine drinking water concentration was determined so each mouse would receive an effective dose of 10 mg/kg/day. 5-HT drinking water concentration was determined by calculating the same molar concentration as Flx in drinking water. This dose of 5-HT elevated fecal levels by approximately 6-fold over vehicle. Three days after the final gavage, mice were euthanized by $CO_2$ and the small and large intestines were collected for fluorescence in situ hybridization (FISH) as described below and lumenal contents from the small and large intestines were harvested for 16S rDNA sequencing. In the "drinking water only" experimental approach, mice were gavaged with untreated T. sanguinis once daily for 5 d and maintained on regular water, 5-HT or 5-HT with fluoxetine in the drinking water. Tissues were collected and analysed 3 d after the final gavage. In the "bacterial pre-treatment only" experimental approach, mice were gavaged with one or three doses of vehicle, 5-HT, or 5-HT with fluoxetine-pretreated T. sanguinis and sacrificed 12-24 hours later.

Bacterial Fluorescence In Situ Hybridization (FISH)

Mouse intestines were fixed in Carnoys fixative overnight at 4° C., washed and transferred to 70% ethanol. Intestinal samples were then paraffin-embedded and cut into 5 μm longitudinal sections by IDEXX Bioresearch. Slides were deparaffinized with xylene, rehydrated in ethanol and incubated in 1 μM FISH probe (Sigma Aldrich) in hybridization buffer (0.9 M NaCl, 20 mM Tris HCl, pH 7.2, 0.1% SDS) for 4 hours at 50° C. in a humidified chamber. *Turicibacter* probe TUR176 was used: 5′ [6FAM]-GCAYCTT-TAAACTTTCGTCCTATCCG (SEQ ID NO: 1). Slides were then washed 3 times in pre-heated wash buffer (0.9 M NaCl, 20 mM Tris-HCl, pH 7.2) and mounted with ProLong Gold Antifade Mountant with DAPI (Invitrogen). Images were acquired on a Zeiss LSM 780 confocal microscope at 20× magnification. Image analyses were performed using ImageJ.

Fluoxetine Treatment for 16S rDNA Sequencing

SPF mice were orally gavaged daily for 7 days with 10 mg/kg fluoxetine (Santa Cruz) or treated with fluoxetine (40 μg/ml) in the drinking water for 14 days as indicated in figure legends. Fecal samples were harvested on day 0, 1, 4, 7 or 14 of treatment as indicated in figure legends and processed for 16S rDNA sequencing as described above.

Intestinal Transcriptomic Analysis 1 cm sections of the terminal ileum and distal colon were harvested from SPF, GF or *Turicibacter* monocolonized mice, washed with PBS to remove lumenal contents and homogenized using 5 mm stainless steel beads (Qiagen) for 1 min in a Mini-Beadbeater-16 (Biospec Products). RNA was extracted using the RNAeasy Mini kit with on-column genomic DNA-digest (Qiagen), and cDNA synthesis was performed using the qScript cDNA synthesis kit (Quantabio). RNA quality of RIN>8.9 was confirmed using the 4200 Tapestation system (Agilent). RNA was prepared using the QuantSeq mRNA-Seq Library Prep kit (Lexogen) and 1×65 bp 3′ reads were sequenced using the Illumina HiSeq platform by the UCLA Neuroscience Genomics Core. The Bluebee analysis platform (Lexogen) was used for quality filtering and mapping. Differential expression analysis was conducted using DESeq2. At least 8.47 million aligned reads were obtained for each sample. Heatmaps containing differentially expressed genes with $q<0.05$ were generated using the pheatmap package for R. GO term enrichment analysis of differentially expressed genes with $q<0.05$ was conducted using DAVID.

Lipid Clinical Chemistry Analysis.

Serum samples were collected from SPF, germfree, *Turicibacter*-monocolonized or *Turicibacter*-enriched mice and submitted to Charles River Clinical Pathology for analysis of the lipid species, including total cholesterol, free fatty acids, high-density lipoprotein, low-density lipoprotein and total triglycerides.

Serum Lipidomic Analysis.

Lipids from 25 μl of plasma were extracted using a modified Bligh and Dyer extraction method by the UCLA lipidomics core facility. Before biphasic extraction, a 13-lipid class Lipidyzer Internal Standard Mix was added to each sample (5040156; AB Sciex). Following two successive extractions, pooled organic layers were dried down in a Genevac EZ-2 Elite evaporator. Lipid samples were resuspended in 1:1 methanol/dichloromethane with 10 mM ammonium acetate and transferred to robovials (10800107; Thermo Fisher Scientific) for analysis.

Samples were analysed on the Sciex Lipidyzer Platform for targeted quantitative measurement of 1,100 lipid species across 13 classes. The Differential Mobility Device on Lipidyzer was tuned with a SelexION Tuning Kit (5040141; Sciex).

Adipocyte Histology and Imaging.

Epididymal, gonadal and inguinal white adipose tissues were collected from SPF, germ-free and Turicibactermonocolonized mice. Tissues were weighed, fixed in 4% paraformaldehyde for 48 h, transferred to 70% ethanol and submitted to IDEXX Pathology Services for paraffin sectioning and embedding. Sections of 5 μm were stained with haematoxylin and eosin and imaged at 20× magnification. Adipocyte cell morphologies and numbers were quantified using ImageJ.

Statistical Methods Statistical analysis was performed using Prism software (GraphPad). Data were plotted in the figures as mean±SEM. For each figure, n=the number of independent biological replicates. Differences between two treatment groups were assessed using two-tailed, unpaired Student t test with Welch's correction. Differences among >2 groups with only one variable were assessed using one-way ANOVA with Bonferroni post hoc test. Taxonomic comparisons from 16S rDNA sequencing analysis were analyzed by Kruskal-Wallis test with Bonferroni post hoc test. Two-way ANOVA with Bonferroni post-hoc test was used for >2 groups with two variables. Significant differences emerging from the above tests are indicated in the figures by *$p<0.05$, $p<0.01$, *$p<0.001$, ****$p<0.0001$ Notable near-significant differences ($0.5<p<0.1$) are indicated in the figures. Notable non-significant (and non-near significant) differences are indicated in the figures by "n.s.".

Example 2: Elevating Intestinal 5-HT Enriches Spore-Forming Bacteria in the Gut

Figure 1A:
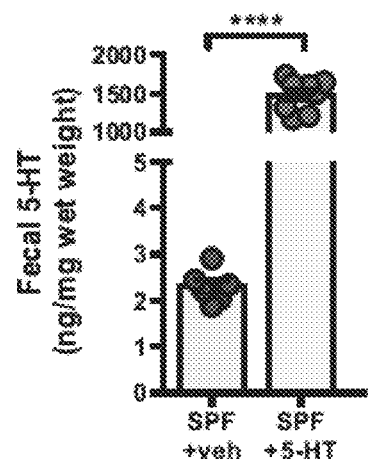
FIGS. 1A-1I show that elevating intestinal 5-HT enriches for spore-forming bacteria in the gut.
Figure 1B:
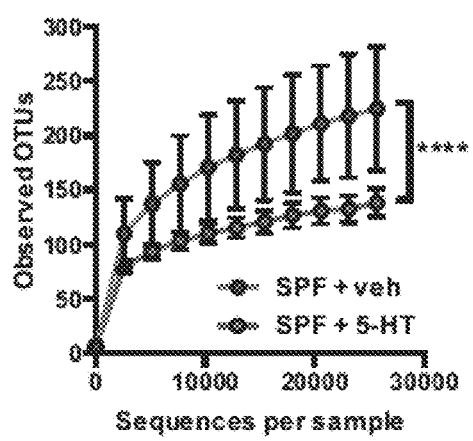
Figure 1C:
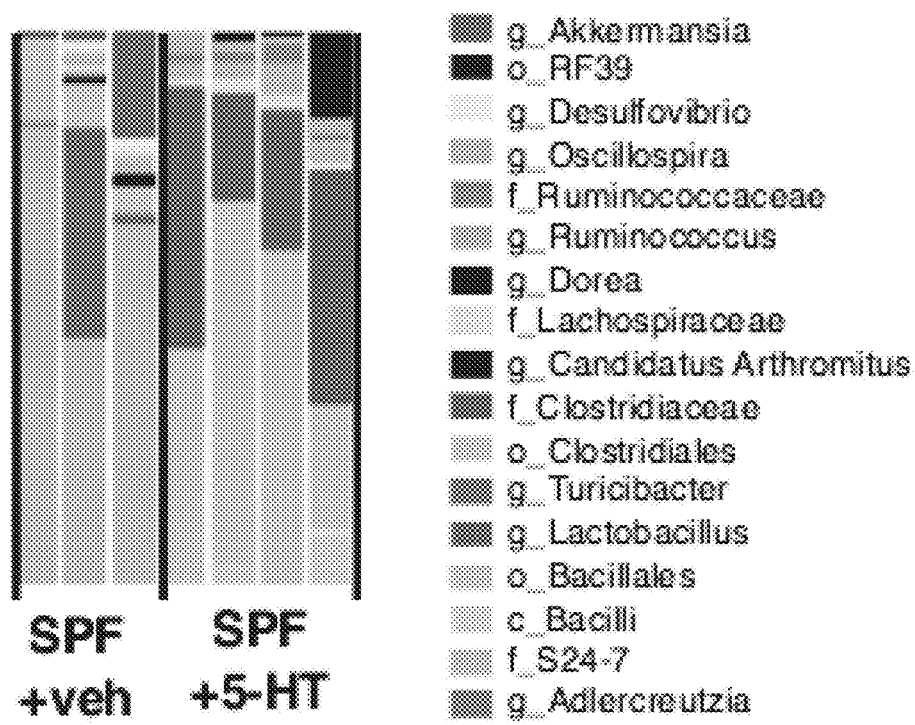
Figure 1D:
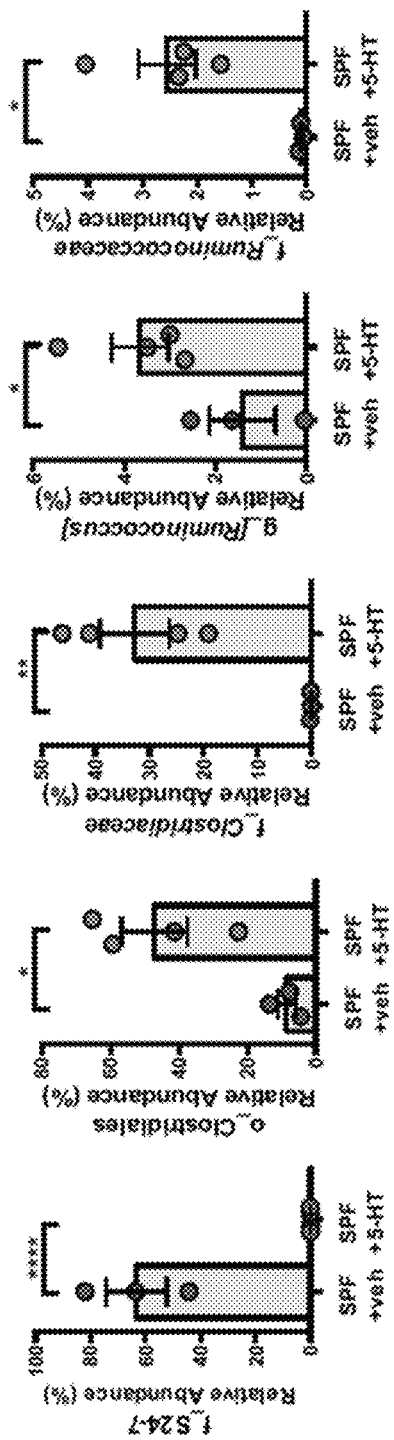
Figure 1E:
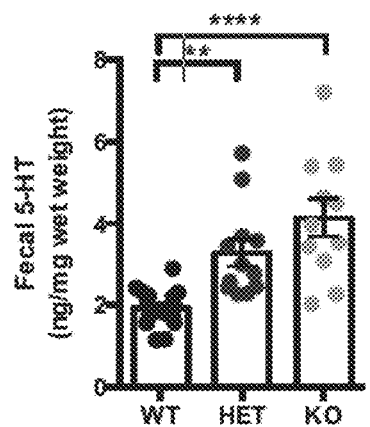
Figure 1F:
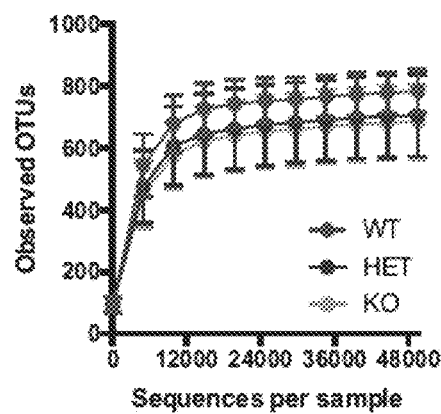

To determine whether the microbiota responds to intestinal 5-HT, three approaches to elevate lumenal 5-HT levels and measure their effects on microbiota composition were used. As a first proof-of-concept, specific pathogen-free (SPF) mice were supplemented with 1.5 mg/ml 5-HT in the drinking water for 2 weeks to increase fecal 5-HT levels by 642-fold relative to vehicle-treated controls (FIG. 1A). Oral 5-HT supplementation substantially enriched species of Clostridia. In particular, Clostridiales, Clostridiaceae, Ruminococcus and Ruminococcaceae increased by 8.4-fold from a combined relative abundance of 10.3±1.9% (mean±S.E.M.) in SPF mice to 86.2±5.8% in 5-HT-supplemented mice (FIG. 1B-D). To determine whether physiological increases in host-derived 5-HT similarly alter the gut microbiota, we utilized serotonin transporter (SERT)-deficient mice which exhibit modest elevations in 5-HT along the intestine. SERT deficiency increased fecal 5-HT by 1.7-fold in SERT+/− mice (FIG. 1E) and enriched Clostridiaceae and genus Turicibacter from a combined 0.9±0.3% in wildtype mice to 13.7±5.5% in SERT+/− mice (FIG. 1F-I). Notably, these changes were more pronounced in SERT+/− mice, which lack confounding abnormalities in gastrointestinal motility and behavior compared with SERT−/− mice. To further determine whether genetic predisposition to elevated intestinal 5-HT shapes the gut microbiota, the SERT mouse line was re-derived as germ-free (GF) and SERT+/− GF mice and wildtype GF controls were inoculated with the same SPF fecal microbiota (FIG. 5A). At 1 day after inoculation, no overt taxonomic differences were observed; however, at 35 days after conventionalization, SERT+/− mice exhibited significantly increased levels of Clostridia, including Clostridiales, Lachnospiraceae and Ruminococcaceae (FIG. 5B-E). Overall, these findings reveal that increasing intestinal 5-HT enriches for spore-forming bacteria. This supports the notion that induction of host 5-HT by spore-forming bacteria promotes their own community membership in the gut microbiota.

Figure 1G:
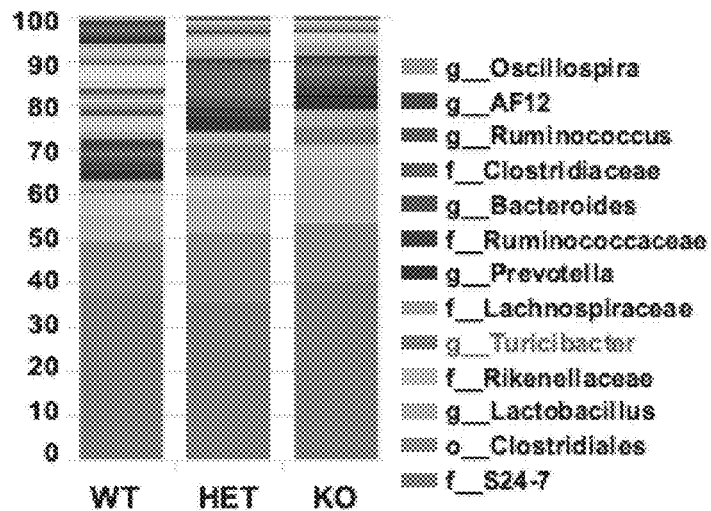
Figure 1H:
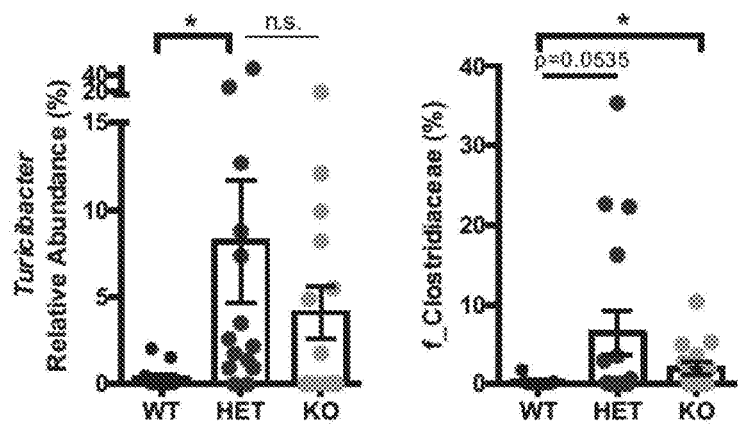
Figure 1I:
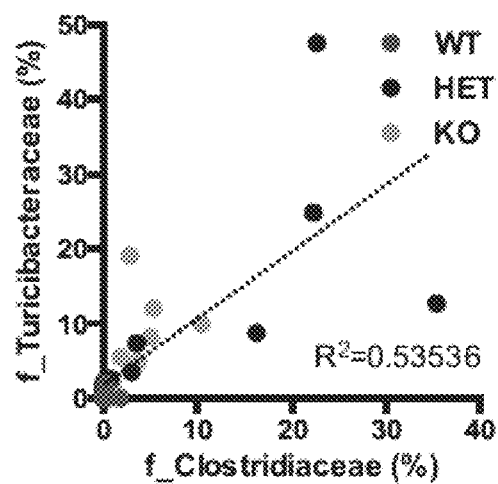
Figure 2A:
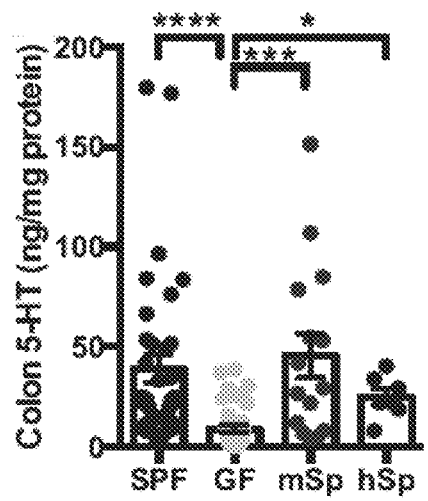
FIGS. 2A-2L show *Turicibacter sanguinis* takes up serotonin, which is inhibited by the selective serotonin reuptake inhibitor, fluoxetine.
Figure 2B:
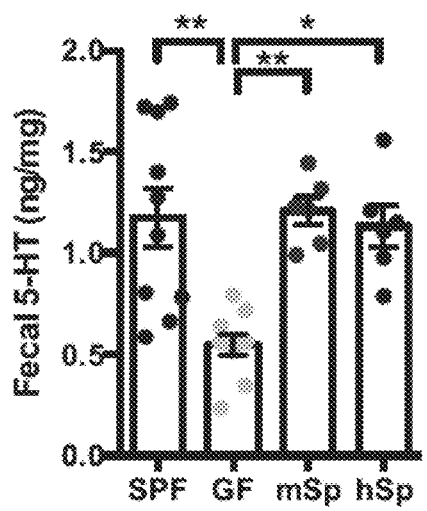
Figure 2C:
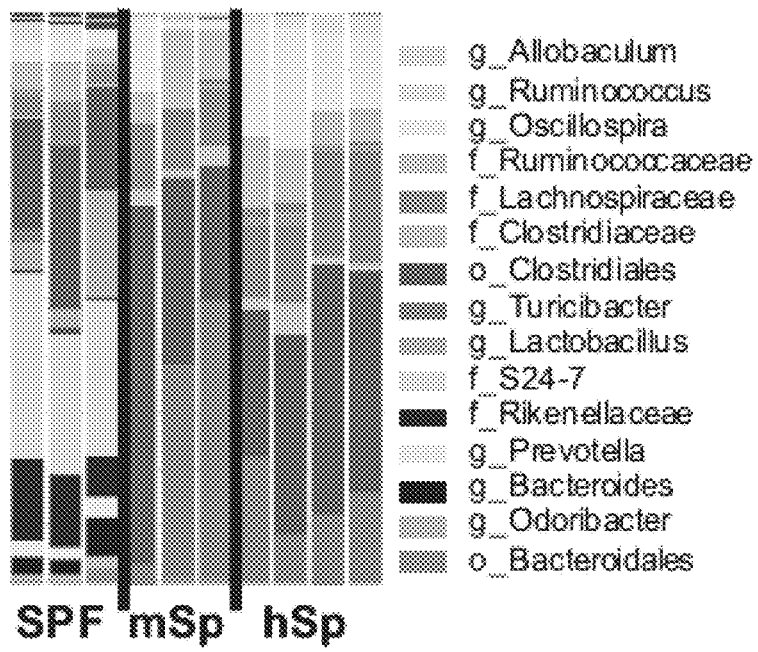
Figure 2D:
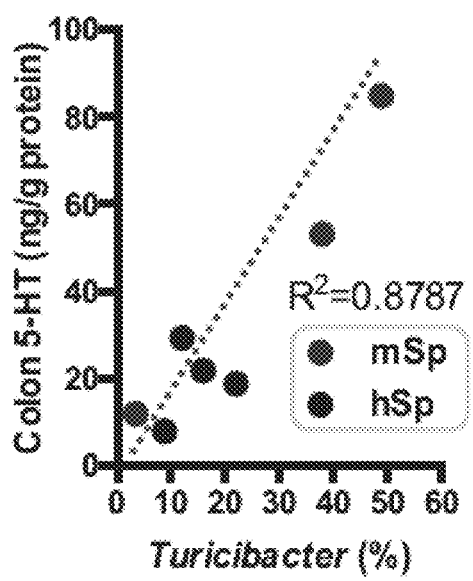
Figure 2E:
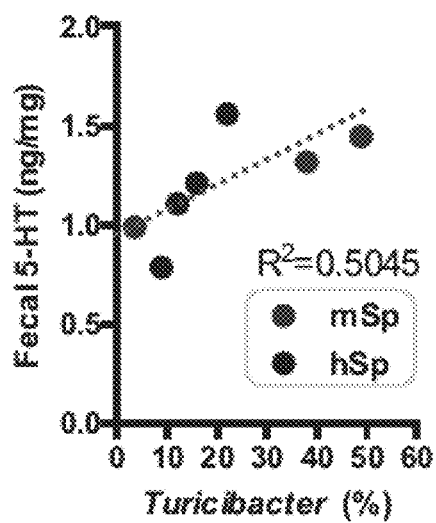

Example 3: Turicibacter Sanguinis Uptakes Serotonin, which is Inhibited by the Selective Serotonin Reuptake Inhibitor, Fluoxetine The ability of the microbiota to respond to elevations in host 5-HT suggests that select gut bacteria may encode elements for sensing 5-HT. To evaluate this possibility, we mined bacterial genomes for orthologues of mammalian (human or mouse) SERT. A bacterial orthologue with 34% amino acid sequence identity was identified as the top candidate (FIG. 6 and Table 1) and structural homology was predicted to mammalian SERT (FIG. 2J), which is encoded by all four sequenced strains of the filamentous gut bacterium Turicibacter sanguinis and other Turicibacter species. The gene is annotated for T. sanguinis hepatocyte growth factor 1 as a "putative sodium-dependent 5-HT transporter," and has greater homology to SERT than to LeuT, a promiscuous bacterial amino acid transporter used to model eukaryotic neurotransmitter sodium symporter (NSS) proteins (Table 1). Interestingly, Turicibacter was enriched particularly in SERT+/− mice, which exhibited increased lumenal bioavailability of 5-HT (FIG. 1G-H). Moreover, Turicibacter was the most abundant member of the spore-forming bacterial consortium previously shown to induce host 5-HT biosynthesis (FIG. 2A-C). A strong correlation between Turicibacter relative abundance and intestinal 5-HT levels was further observed (FIG. 2D-E). A model of the Turicibacter protein based on available structures of human SERT was generated. Given the level of amino acid sequence identity (>30%) between the template and the target sequence, the expected accuracy of this model is 0.7-2.0 Å for the backbone of the transmembrane regions. Indeed, the model scores very highly, consistent with the Turicibacter protein being globally similar to human SERT (hSERT). Residues contributing to 5-HT and SSRIs binding sites in mammalian SERT are strongly conserved (~50% identical and ~70% similar), and the residues required to bind an $Na^+$ ion at the so-called Na2 site are identical. However, there were differences in key residues that mediate Cl-dependence (N368, replaced by D262) and neutralization of charged amines (D98, replaced by G22) in mammalian SERT (FIG. 7A-E). The latter, in particular, raises the question of whether the bacterial orthologue is capable of transporting 5-HT. However, the concurrent substitution of N368 in hSERT by an acidic side chain (D262) just 7 Å away raises the possibility that D262 can play a similar role to D98, allowing for a slightly altered arrangement for 5-HT or inhibitors in a similar binding region.

TABLE 1 show BLASTP alignment scores between human (h) SERT with other mammalian biogenic amine transporters, *Turicibacter* orthologs and bacterial amino acid transporter, LeuT.

| Accession | Organism | Protein | Identity (%) | Coverage | Max Score | Length (bp) | E-value |
|---|---|---|---|---|---|---|---|
| AAW80933 | *Homo sapiens* | Serotonin transporter (SERT) | | | | 630 | |
| NP 034614.2 | *Mus musculus* | Serotonin transporter (SERT) | 93 | 100 | 1204 | 630 | 0.E+00 |
| CAA62566.1 | *Homo sapiens* | Norepinephrine transporter (NET) | 53 | 86 | 607 | 617 | 0.E+00 |
| AAC50179.2 | *Homo sapiens* | Dopamine transporter (DAT) | 50 | 90 | 598 | 620 | 0.E+00 |
| N/A | *Turicibacter sanguinis* MOL361 | Putative serotonin transporter | 34 | 76 | 264 | 498 | 2.E−85 |
| ZP 08167800.1 | *Turicibacter sp.* HGF1 | Putative sodium-dependent serotonin transporter | 34 | 76 | 264 | 498 | 2.E−85 |
| ZP 06621923.1 | *Turicibacter sanguinis* PC909 | Sodium: neurotransmitter symporter family protein | 34 | 76 | 268 | 498 | 9.E−87 |
| WP 068759727.1 | *Turicibacter* H121 | Sodium-dependent transporter | 35 | 76 | 279 | 503 | 2.E−83 |
| WP 055305129.1 | *Turicibacter sanguinis* | Sodium-dependent transporter | 35 | 76 | 278 | 503 | 8.E−83 |
| 2A65_A | *Aquifex aeolicus* VF5 | Leucine transporter (LeuT) | 26 | 71 | 106 | 519 | 2.E−28 |

Figure 2F:
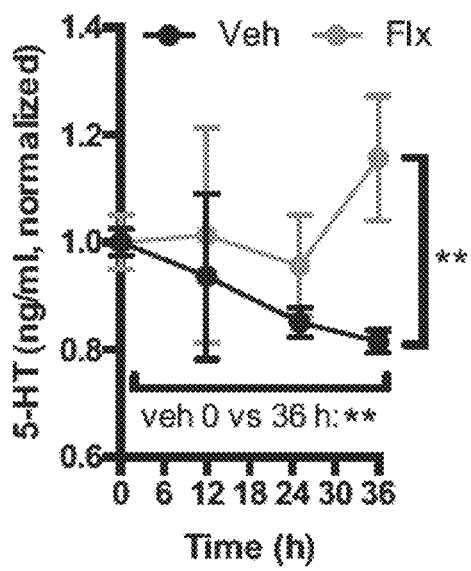
Figure 2G:
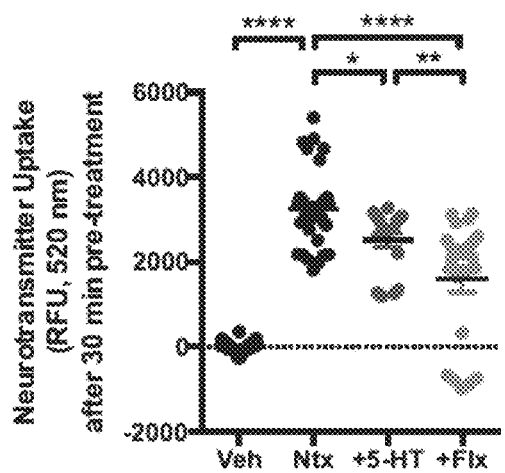
Figure 2H:
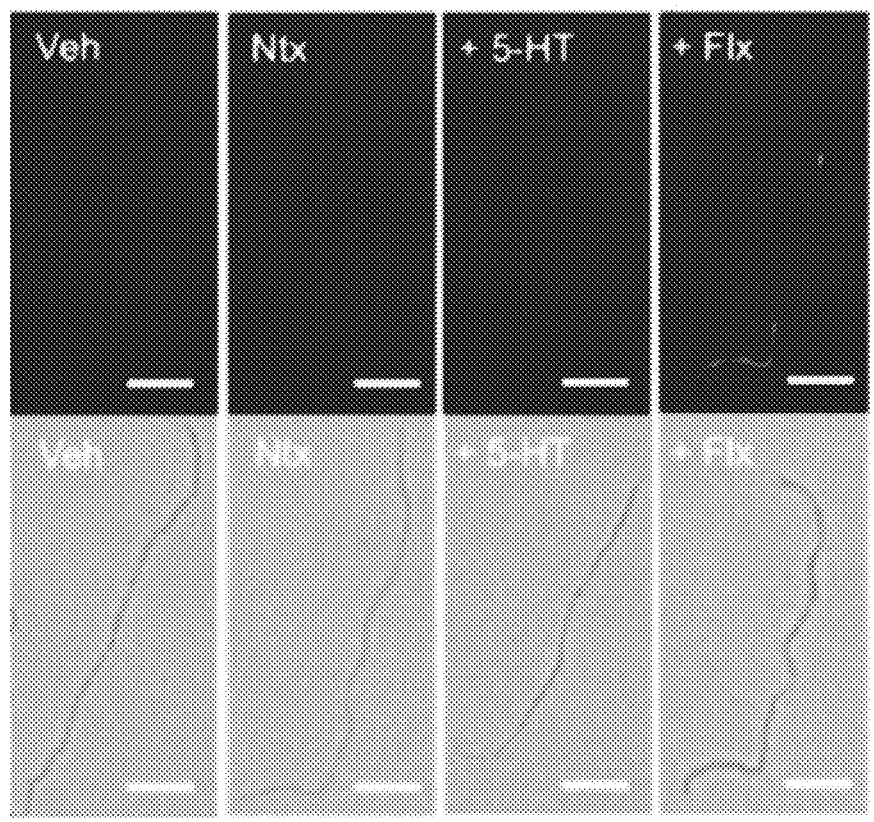
Figure 2I:
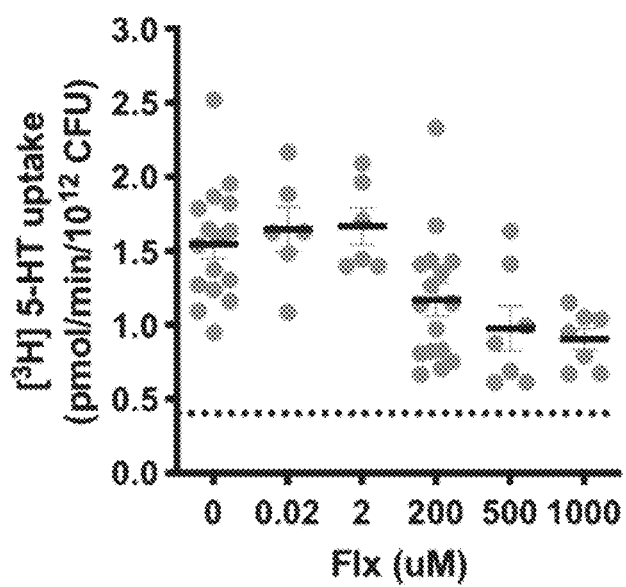
Figure 2J:
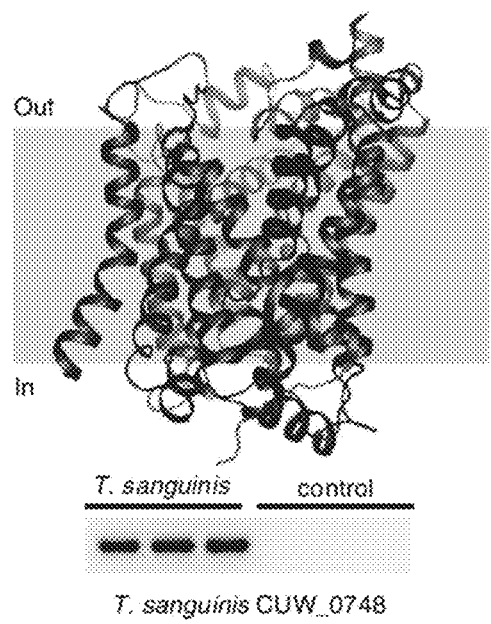
Figure 3A:
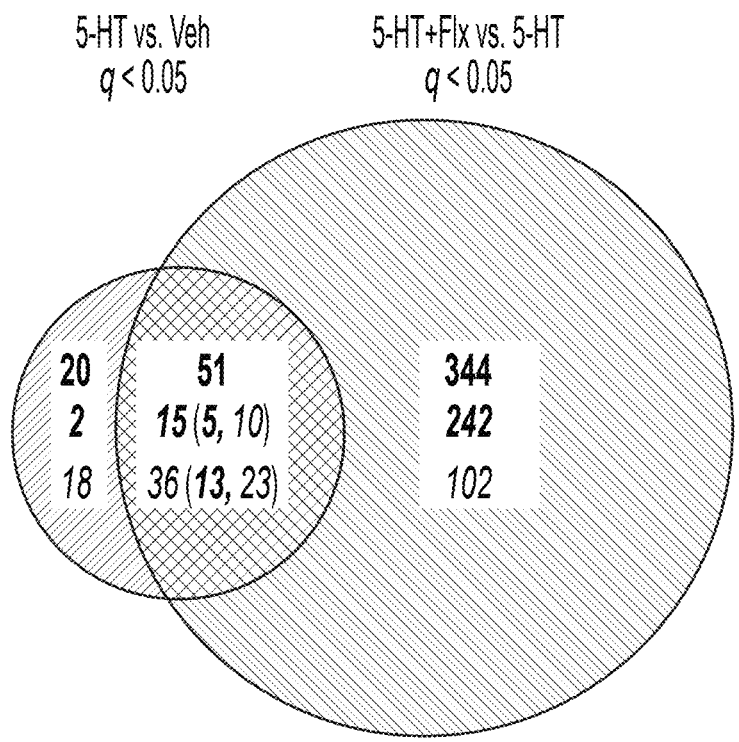
FIGS. 3A-3M show that 5-HT and the selective serotonin reuptake inhibitor, fluoxetine, regulate gene expression and intestinal colonization of *Turicibacter sanguinis*.
Figure 3B:
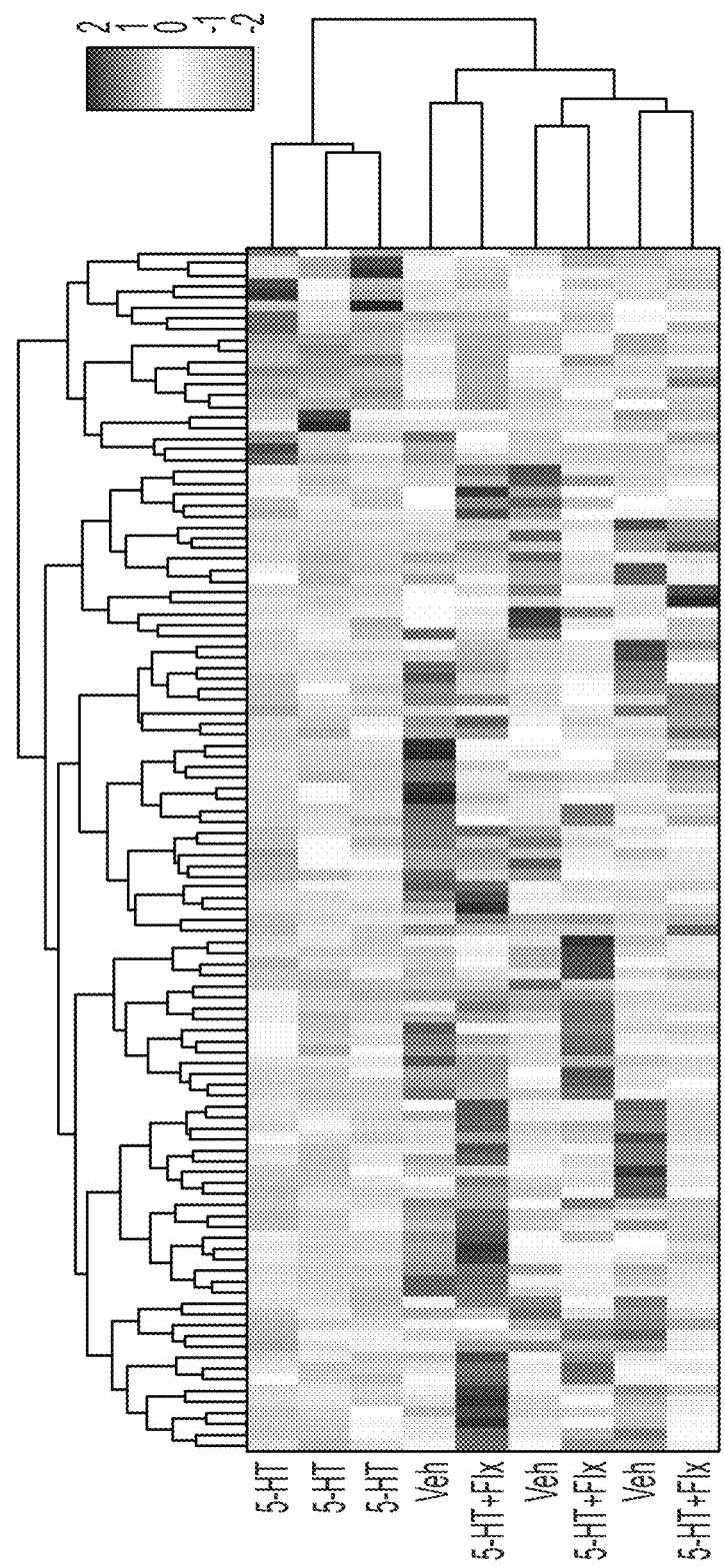
Figure 3C:
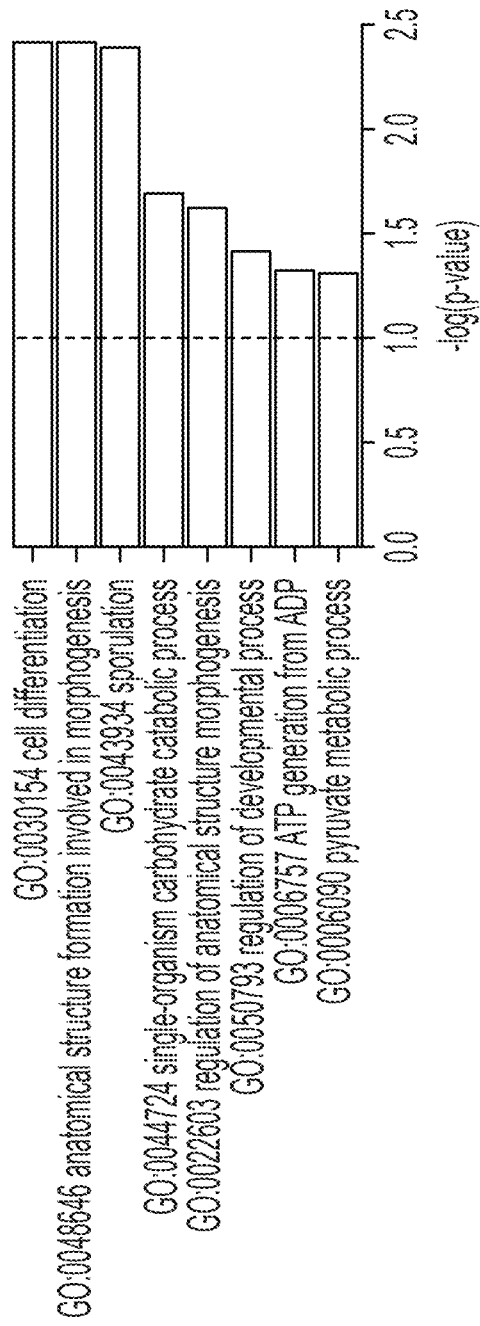
Figure 3D:
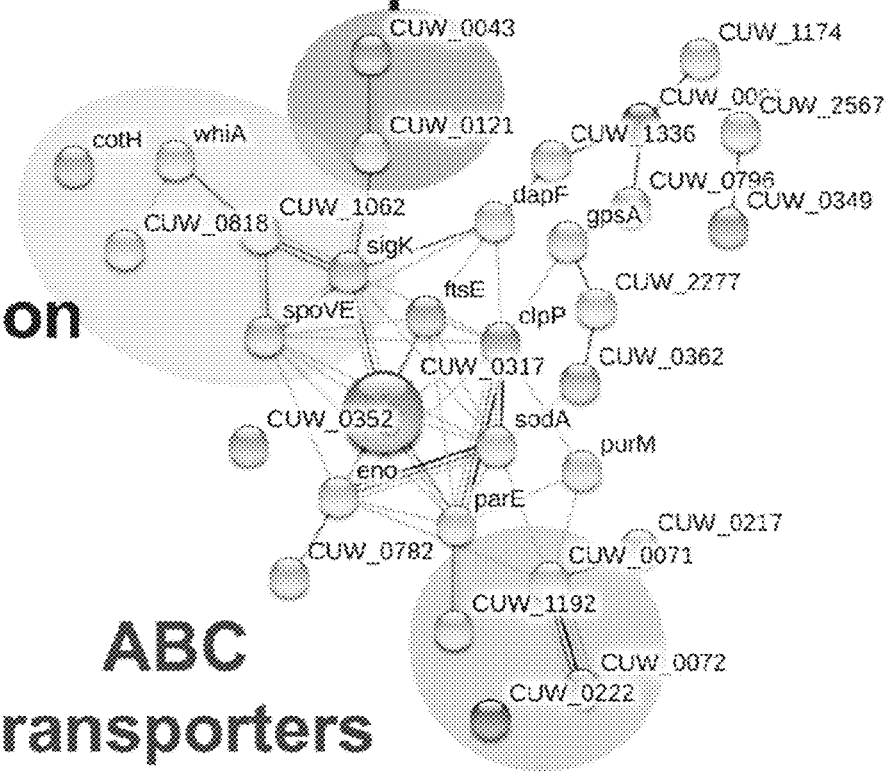
Figure 3E:
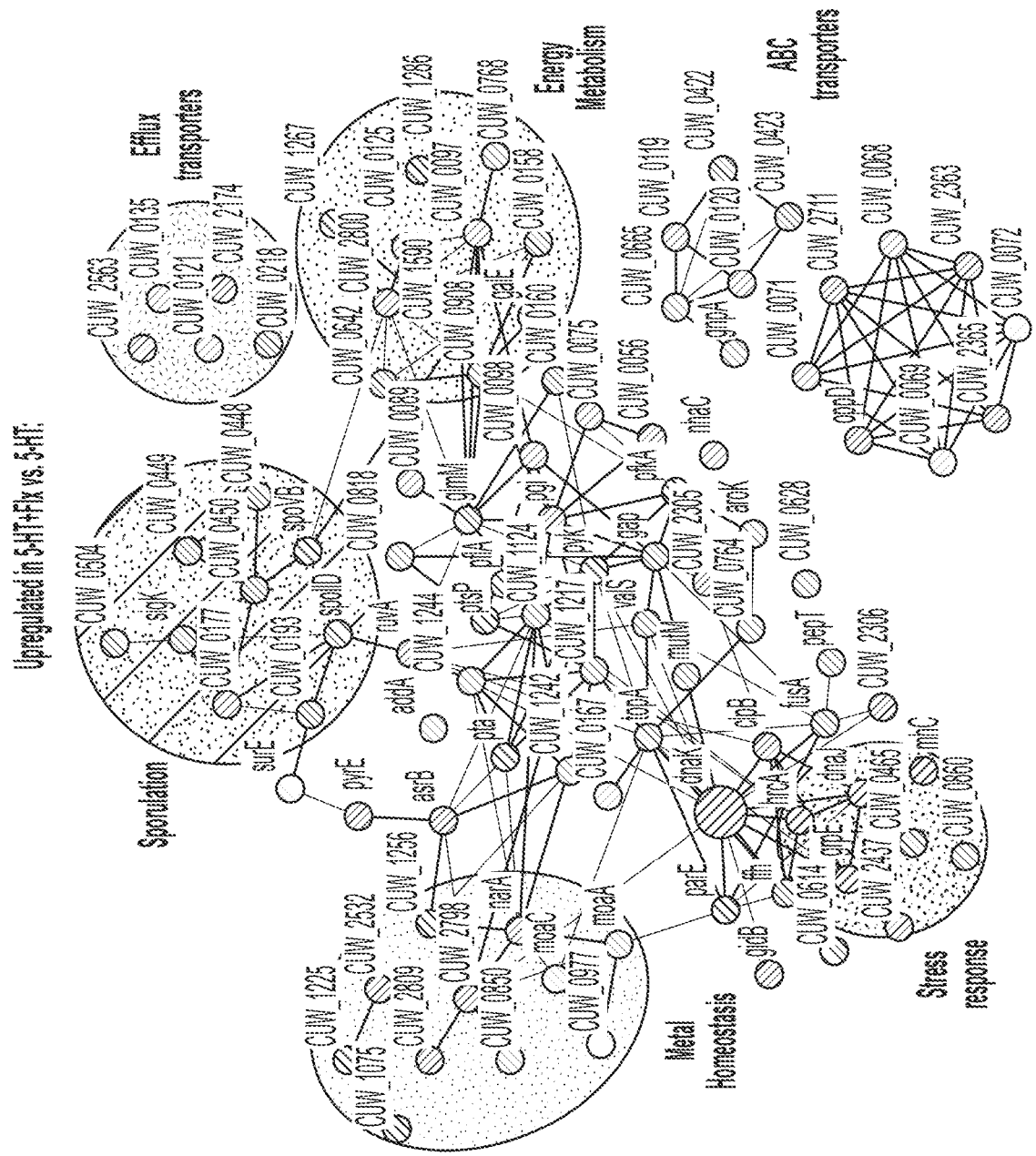
Figure 3F:
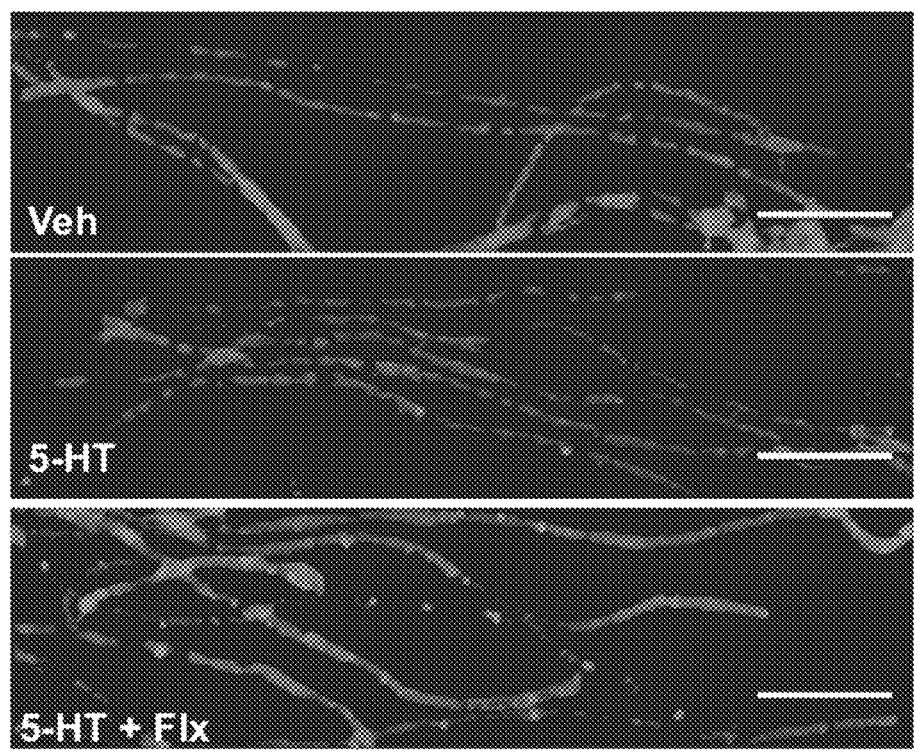
Figure 3G:
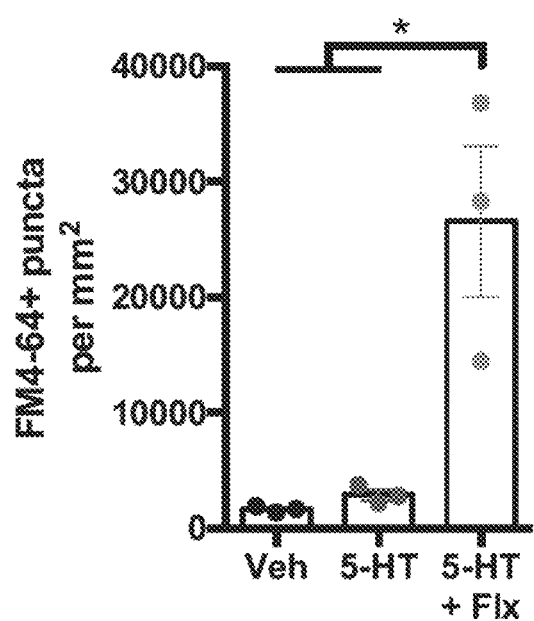
Figure 3H:
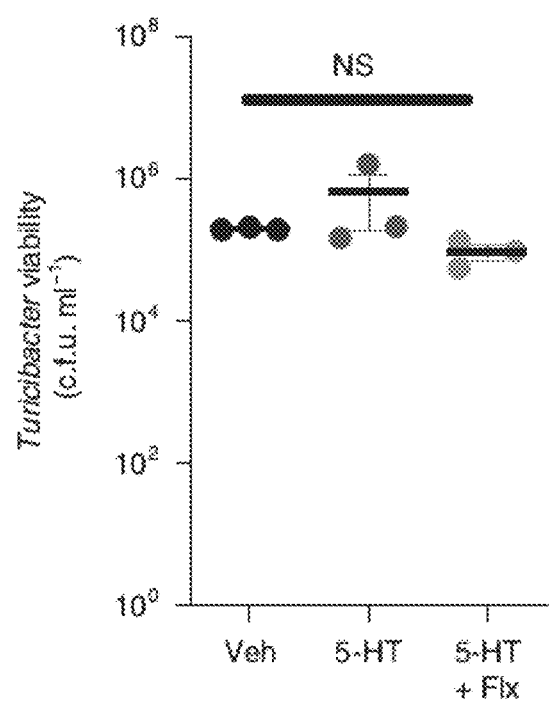

To determine whether *Turicibacter* is able to detect, import or metabolize 5-HT, we examined the ability of *T. sanguinis* MOL361 to: (1) consume 5-HT in culture; (2) import 4-(4-(dimethylamino) phenyl)-1-methylpyridinium (APP+), a molecular substrate for SERT15; (3) take up radiolabelled 5-HT; and (4) respond transcriptionally to 5-HT. Culturing *T. sanguinis* in nutrient-rich broth decreased 5-HT levels in the media over time (FIG. 2F). This was prevented by supplementation with the selective 5-HT reuptake inhibitor (SSRI) fluoxetine (FIG. 2F), a reversible competitive inhibitor of SERT, which exhibited cytostatic effects over long-term culture also inhibited *T. sanguinis* growth (FIG. 8) but not short-term exposure (FIG. 3H). Moreover, exposing *T. sanguinis* to APP+ resulted in import, which was partially decreased by bacterial pre-treatment with unlabeled 5-HT or fluoxetine (FIG. 2G-H). There was also a modest, but not statistically significant, effect of norepinephrine, but not dopamine, on decreasing APP+ uptake in the assay (FIG. 9A), suggesting that *T. sanguinis* may be able to uptake norepinephrine in addition to 5-HT. Moreover, *T. sanguinis* imported tritiated 5-HT($[_3H]$5-HT), which was inhibited by fluoxetine (FIG. 2I). Notably, fluoxetine had no effect on bacterial uptake of norepinephrine (FIG. 9B), suggesting some selectivity to the inhibition of 5-HT import. Inhibition of 5-HT uptake was not observed by treatment with reserpine or tetrabenazine, inhibitors of mammalian vesicular monoamine transporter (VMAT) (FIG. 9C), suggesting that import of 5-HT by *T. sanguinis* is mediated by an NSS-like protein such as the SERT orthologue (FIG. 2J) rather than a protein in the major facilitator superfamily (MFS), such as vesicular monoamine transporter (VMAT).

Figure 2K:
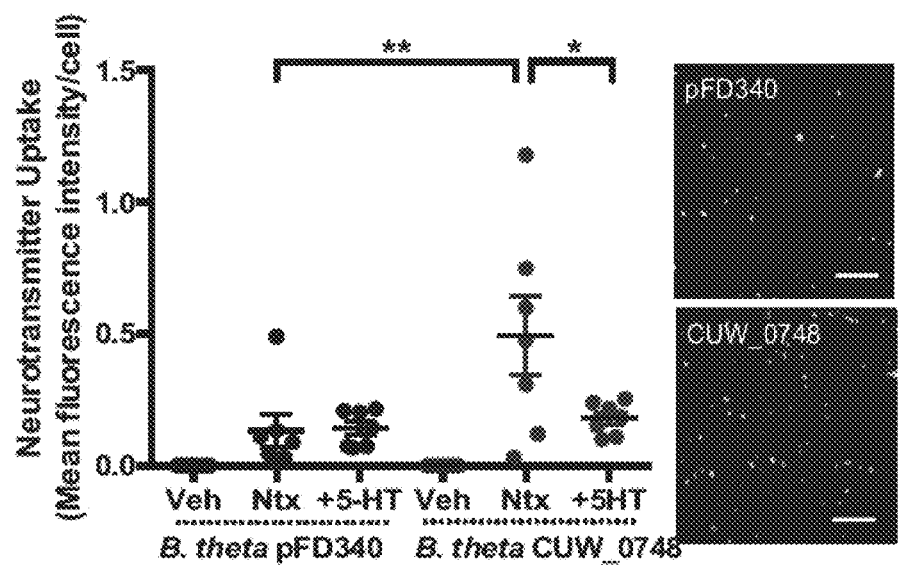
Figure 2L:
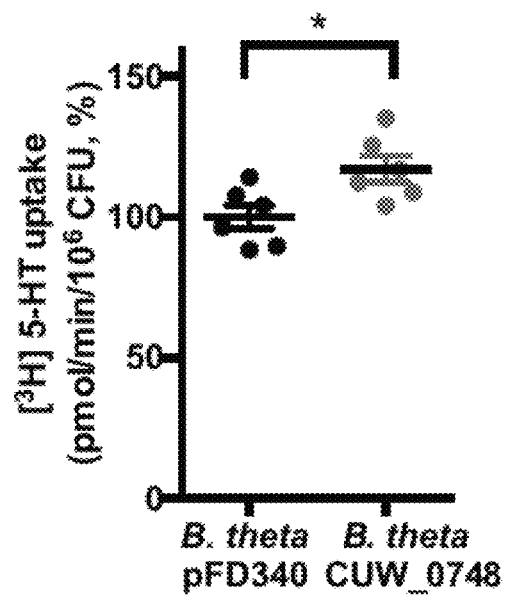

To gain insight into whether 5-HT uptake by *T. sanguinis* is mediated by the candidate protein, the gene from *T. sanguinis* MOL361 (CUW_0748, as annotated for *T. sanguinis* PC909) was cloned into the intestinal bacterium *Bacteroides thetaiotaomicron*, which shows no evidence of endogenous APP+ import (FIG. 10A). Heterologous expression of CUW_0748 in *B. thetaiotaomicron* (FIG. 10B-C) conferred uptake of APP+ and 1 μM $[_3H]$5-HT, which was inhibited by unlabelled 5-HT (FIG. 2K, L). CUW_0748 in *B. thetaiotaomicron* exhibited time-dependent saturation of $[_3H]$5-HT import (FIG. 10D), requiring longer durations than those reported for SERT expressed in mammalian systems. Notably, however, CUW_0748 in *B. thetaiotaomicron* failed to show dose-dependent saturation of $[_3H]$5-HT import; biological variation increased substantially with concentrations of $[_3H]$5-HT higher than the physiological range (>100 μM), which may have been due to stress to *B. thetaiotaomicron*. This indicates that additional studies are needed to validate active transportermediated 5-HT import. Notably, there was no effect of CUW_0748 expression on the uptake of tryptophan (FIG. 10F), suggesting that it does not function as a tryptophan transporter or broadly disrupt bacterial membrane integrity. These findings suggest that CUW_0748 contributes to 5-HT uptake in *T. sanguinis*, but also leave open the possibility that additional mechanisms for 5-HT import exist. Moreover, it is unclear whether the SERT orthologue, or any unknown 5-HT response elements in *Turicibacter*, are specific to 5-HT as opposed to other biogenic amines, indole-derivatives or amino acids. While more research is required to detail the structural and biochemical properties of CUW_0748, these findings demonstrate that *T. sanguinis* imports 5-HT at physiological levels, which is inhibited by fluoxetine, suggesting that transport through an NSS-like protein mediates bacterial 5-HT uptake.

Example 4: 5-HT and the Selective Serotonin Reuptake Inhibitor, Fluoxetine, Regulate Gene Expression and Intestinal Colonization of *Turicibacter sanguinis*

Figure 3I:
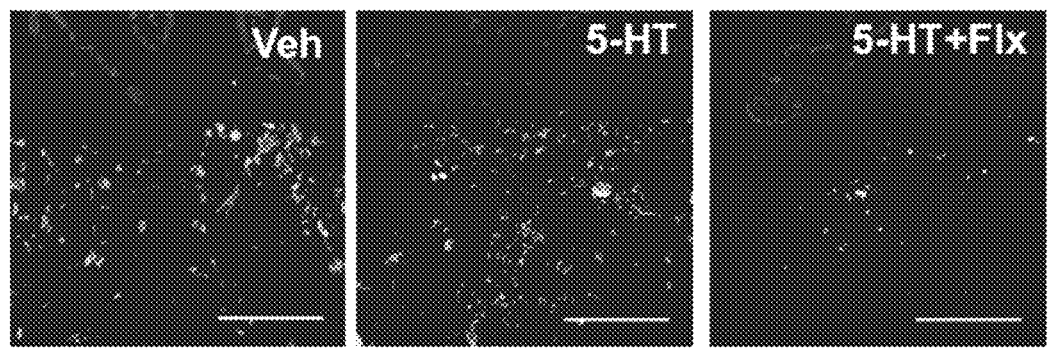
Figure 3J:
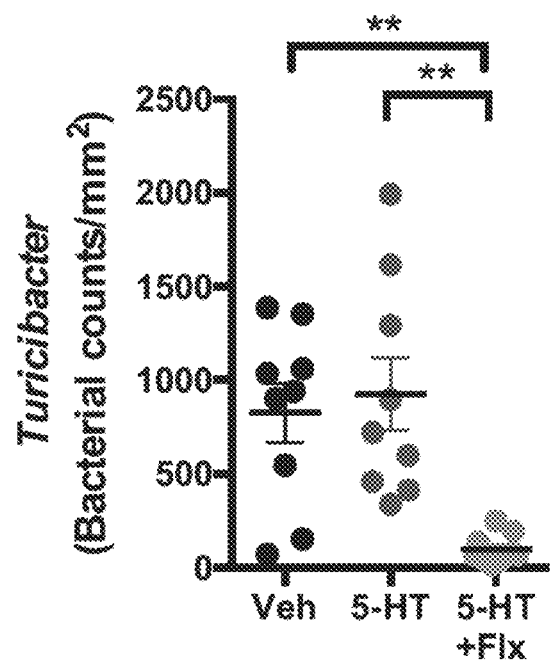
Figure 3K:
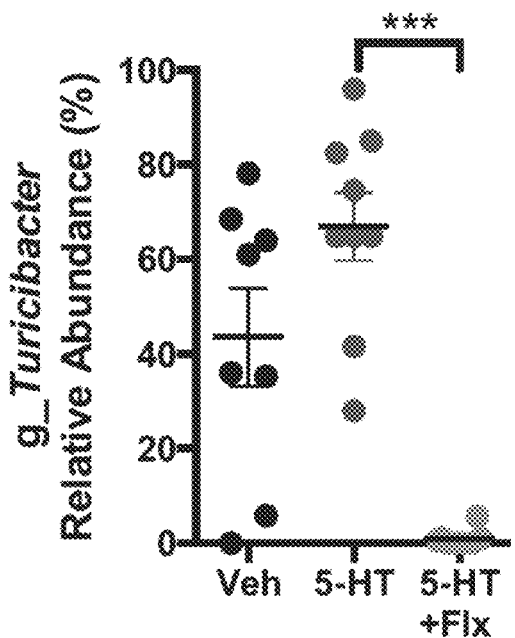
Figure 3L:
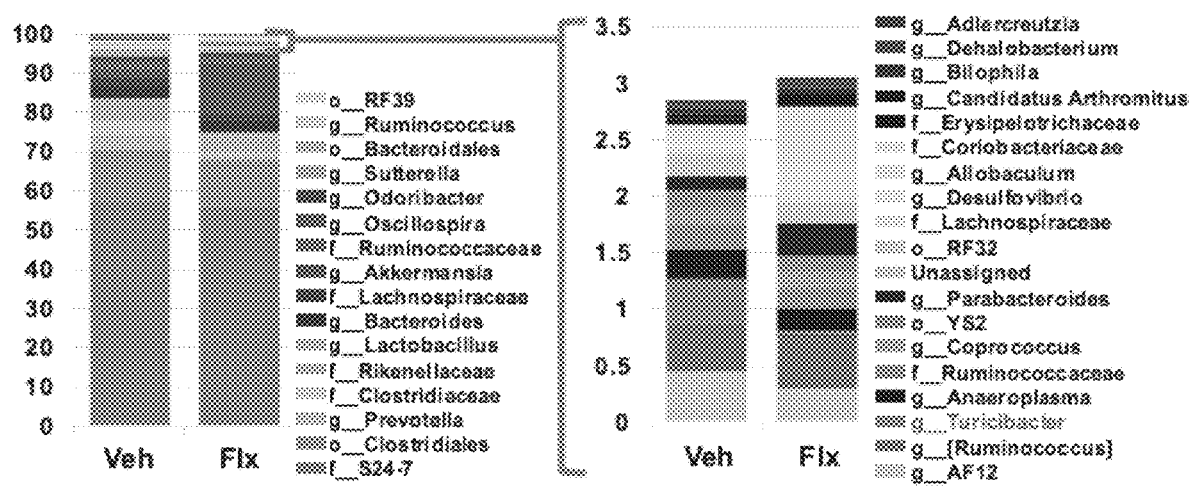
Figure 3M:
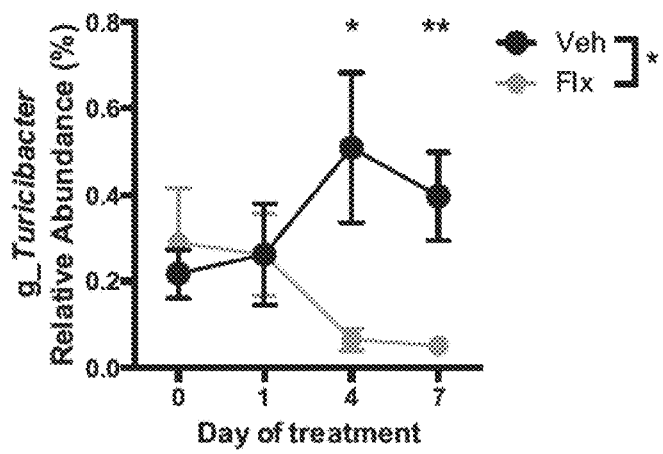

To identify the effects of 5-HT and fluoxetine on bacterial physiology, transcriptomes of *T. sanguinis* was performed after acute exposure to vehicle, 5-HT, fluoxetine or 5-HT with fluoxetine. 5-HT significantly altered the bacterial expression of 71 genes (FIG. 3A-B), suggesting that *T. sanguinis* responds functionally to 5-HT. Co-treatment of 5-HT with fluoxetine significantly altered 51 of the 71 genes that were differentially expressed in response to 5-HT alone, with additional changes in 344 genes, revealing substantial effects of fluoxetine on bacterial gene expression (FIG. 3A-B). In particular, 5-HT downregulated the expression of genes that clustered into pathways for cell differentiation, morphogenesis and sporulation (FIG. 3C), and encoded proteins related to efflux transporters, ABC transporters and sporulation (FIG. 3D). Compared with 5-HT-treated controls, fluoxetine upregulated the expression of genes encoding proteins relevant to efflux transporters, ABC transporters and sporulation (FIG. 3E), as well as energy metabolism, metal homeostasis and stress response, suggesting that fluoxetine prevents and/or reverses a subset of 5-HT-mediated changes in *T. sanguinis* gene expression. Consistent with fluoxetine-associated increases in the expression of sporulation-related genes, imaging of *T. sanguinis* exposed to 5-HT with fluoxetine revealed punctate staining of the membrane dye FM 4-64 (FIG. 3F,G)—a phenotype observed during spore formation. Notably, fluoxetine treatment in the absence of 5-HT yielded little change in *T. sanguinis* gene expression, indicating that 5-HT is required for fluoxetine-induced alterations in gene expression. In addition, *T. sanguinis* survival was not affected by acute treatment with 5-HT and/or fluoxetine (FIG. 3H), suggesting that gene expression changes were not due to altered bacterial viability. Overall, these data demonstrate that 5-HT directly alters *T. sanguinis* physiology to reduce the expression of genes related to sporulation and membrane transport, which is abrogated by fluoxetine. Sporulation is an important determinant of microbial colonization and transmission. Given that 5-HT and fluoxetine regulate the expression of sporulation-related genes in *T. sanguinis*, whether 5-HT and fluoxetine modulate *T. sanguinis* fitness in the intestine was tested. *T. sanguinis* pre-treated with vehicle, 5-HT or 5-HT with fluoxetine was orally-gavaged into antibiotic-treated SPF mice supplemented with the same chemical treatments in drinking water. Both vehicle and 5-HT treatment resulted in detectable *T. sanguinis* colonization (FIG. 3I-J). However, treatment with 5-HT and fluoxetine significantly reduced *T. sanguinis* levels in the small intestine (FIG. 3I-J) and colon (FIG. 11A-B), suggesting that fluoxetine-mediated inhibition of 5-HT uptake impairs *T. sanguinis* colonization. Reductions in *T. sanguinis* were similarly seen without additional chemical supplementation in the drinking water, where pre-treatment of *T. sanguinis* with 5-HT alone promoted its competitive colonization in antibiotic-treated mice (FIG. 12A-D). In contrast, this effect was not seen with hostsupplementation alone (FIG. 13A-B), suggesting that 5-HT and fluoxetine act directly on *T. sanguinis* to modulate intestinal colonization. Moreover, there was no effect of 5-HT and fluoxetine on *T. sanguinis* in monocolonized mice (FIG. 14A-B) suggesting that 5-HT and fluoxetine do not affect the stability of *T. sanguinis* that has already colonized the intestine. In addition, there was no effect of 5-HT and fluoxetine on bacterial colonization of GF mice (FIG. 15A-B), suggesting that 5-HT sensing by *T. sanguinis* is important for its competitive colonization within complex microbial communities., and that fluoxetine is not broadly antimicrobial to *T. sanguinis* under these conditions. Consistent with this, SPF mice gavaged with fluoxetine exhibited decreased *Turicibacter* (FIG. 3K-M) and Clostridiaceae, with no significant differences in bacterial alpha diversity (FIG. 16A-C) in the fecal microbiota. Collectively, these results suggest that inhibiting bacterial uptake of 5-HT and altering bacterial gene expression by fluoxetine limits the ability of *Turicibacter* to competitively colonize the intestine.

Example 5: *Turicibacter Sanguinis* Colonization Regulates Host Intestinal Gene Expression Changes in *Turicibacter* levels have been correlated with particular disease states; however, causal effects of *Turicibacter* on the host remain unknown. To determine how *Turicibacter* colonization impacts host physiology, we first examined intestinal transcriptomes from *T. sanguinis*-monocolonized mice relative to GF mice and SPF controls. *T. sanguinis* differentially regulated89 genes in the small intestine (FIG. 4A) and 87 genes in the colon (FIG. 17A), which were enriched in pathways for steroid and lipid metabolism (e.g. Hmgcs1, Insig1, Fift1, Msmo1, Hmgcr, and Npc1l1) across both intestinal sites (FIG. 4B-C and FIG. 17B-C). This was probably not due to bacterial colonization in general, as there was little overlap between the effects of *T. sanguinis* versus SPF colonization on intestinal gene expression (FIG. 4A, FIG. 17A-B and FIG. 18A-B). Moreover, *T. sanguinis*-induced transcriptomic changes were distinct from those reported in mice monocolonized with other species of gut bacteria. In addition to altering the intestinal expression of genes related to lipid metabolism, *T. sanguinis* also reduced host serum triglyceride levels (FIG. 4D). Consistent with this, fluoxetine-induced decreases in *T. sanguinis* were associated with increased serum triglyceride levels compared with mice colonized with vehicle-treated *T. sanguinis* (FIG. 4E). There was no effect of *T. sanguinis* on total serum cholesterol, free fatty acid, low-density lipoprotein or high-density lipoprotein levels (FIG. 19). To determine whether *T. sanguinis* modulates concentrations of specific lipid species, we profiled sera for 1,100 lipids spanning cholesterol esters, ceramides, diacylglycerides, free fatty acids, hexosyl ceramides, lysophosphatidylcholines, lysophosphatidylethanolamines, phosphatidylcholines, sphingomyelins and triacylglycerides (FIG. 4F-H, FIG. 20). Principal components analysis yielded clustering of lipidomic profiles from *T. sanguinis*-monocolonized mice distinctly from SPF and germ-free controls (FIG. 20A and FIG. 4F). A total of 184 lipids were significantly altered by *T. sanguinis* (FIG. 20B), including several triacylglycerides (FIG. 4G and FIG. 20C). In particular, *T. sanguinis* reduced levels of long-chain triglycerides containing 18:1 and 20:1 fatty acids, such as oleate and gadoleate, while increasing levels of long-chain triglycerides containing 20:4 and 20:5 polyunsaturated fatty acids, such as arachidonate and eicosapentaenoate (FIG. 4H). The reductions in monoenoic triacylglycerides were consistent with transcriptomic results wherein *T. sanguinis* downregulated the expression of stearoyl-coenzyme A desaturase 2 (Scd2) (FIG. 4C)—a rate-limiting enzyme for oleate synthesis22. Consistent with reductions in triglyceride levels (FIG. 4D,E), *T. sanguinis*-colonized mice exhibited small multilocular adipocytes in inguinal white adipose tissue (FIG. 4I and FIG. 21) and reduced the mass of inguinal white adipose tissue in female, but not male, mice (FIG. 22), suggesting that *T. sanguinis* regulates fat mass in a sex-specific manner. These results reveal that *T. sanguinis* modulates host lipid metabolism, and further suggest that regulation of *T. sanguinis* colonization by 5-HT and fluoxetine could have downstream consequences on host physiology (FIG. 23).

Considerable progress has been made in understanding host-microbial interactions that control intestinal colonization of select microbial species such as *Bacteroides*, but little is known about the molecular determinants of microbial colonization and community membership for other groups of bacteria, including those belonging to the dominant phylum Firmicutes. In addition, previous studies on bacterial responses to norepinephrine fuelled the concept of 'microbial endocrinology'24, but whether host microbial oninteractions occur via other canonical neurotransmitters remains poorly understood. Here, we identify a role for host-derived 5-HT and fluoxetine treatment in regulating the gut microbiota, including intestinal colonization of the gut bacterium *T. sanguinis*. Based the findings, particular bacteria indigenous to the gut microbiota, including *Turicibacter*, have co-evolved to induce host 5-HT and further sense host-derived 5-HT to promote their competitive colonization in the intestine (FIG. 20). Additional members of the gut microbiota, including particular Clostridia, may respond to 5-HT directly through as-yet uncharacterized 5-HT response elements or indirectly through other bacteria, such as *Turicibacter*. Findings from this study support the notion that bidirectional host-microbial signaling via the serotonergic system shapes bacterial communities within the gastrointestinal tract. These findings, along with increasing associations of *Turicibacter* species with altered immune and metabolic conditions, raise the question of whether *Turicibacter* impacts host health and disease. Supporting this, we find that monocolonization with *T. sanguinis* alters intestinal lipid metabolism, systemic triglyceride profiles and white adipose tissue physiology in mice, which could be relevant to reported links between SSRI use and symptoms of metabolic syndrome.

INCORPORATION BY REFERENCE

All publications and patents mentioned herein are hereby incorporated by reference in their entirety as if each individual publication or patent was specifically and individually indicated to be incorporated by reference. In case of conflict, the present application, including any definitions herein, will control.

EQUIVALENTS

While specific embodiments of the subject invention have been discussed, the above specification is illustrative and not restrictive. Many variations of the invention will become apparent to those skilled in the art upon review of this specification and the claims below. The full scope of the invention should be determined by reference to the claims, along with their full scope of equivalents, and the specification, along with such variations.

We claim:

1. A method for upregulating lipid and steroid metabolism comprising administering a composition comprising *Turicibacter sanguinis* to a patient's gut, wherein the patient is in need of upregulated lipid and steroid metabolism, and wherein at least 50% of the bacteria in the composition are *Turicibacter sanguinis*.

2. The method of claim 1, wherein the composition is administered orally, intravenously, intraperitoneally, subcutaneously, or rectally.

3. The method of claim 1, wherein the composition comprises bacteria consisting of *Turicibacter sanguinis*.

4. The method of claim 1, further comprising administering a serotonin receptor agonist.

5. The method of claim 4, wherein the serotonin receptor agonist is administered orally, rectally, intravenously, intraperitoneally, or subcutaneously.

6. The method of claim 4, wherein the serotonin receptor agonist is 5-HT, psilocybin, psilocin, N,N-dimethyltryptamine, 5-methoxy-N,N-dimethyltryptamine, bufotenin, lysergic acid diethylamide, ergine (LSA), mescaline, 2,5-dimethoxy-4-bromophenethylamine, 25I-NBOMe, 3,4-methylenedioxyamphetamine, or 2,5-dimethoxy-4-methylamphetamine.

7. A method for treating or inhibiting a cardiovascular disease in a patient in need thereof, the method comprising administering a composition comprising *Turicibacter sanguinis* to the patient's gut to treat or inhibit the cardiovascular disease, wherein at least 50% of the bacteria in the composition are *Turicibacter sanguinis*.

8. The method of claim 7, wherein the composition is administered orally, intravenously, intraperitoneally, subcutaneously, or rectally.

9. The method of claim 7, wherein the composition comprises bacteria consisting of *Turicibacter sanguinis*.

10. The method of claim 7, further comprising administering a serotonin receptor agonist.

11. The method of claim 10, wherein the serotonin receptor agonist is administered orally, rectally, intravenously, intraperitoneally, or subcutaneously.

12. The method of claim 10, wherein the serotonin receptor agonist is 5-HT, psilocybin, psilocin, N,N-dimethyltryptamine, 5-methoxy-N,N-dimethyltryptamine, bufotenin, lysergic acid diethylamide, ergine (LSA), mescaline, 2,5-dimethoxy-4-bromophenethylamine, 25I-NBOMe, 3,4-methylenedioxyamphetamine, or 2,5-dimethoxy-4-methylamphetamine.

13. The method of claim 7, wherein the cardiovascular disease is arteriosclerosis, atherosclerosis, stroke, ischemia, endothelium dysfunctions, peripheral vascular disease, coronary heart disease, myocardial infarction, cerebral infarction, restenosis, dyslipidemia, hyperlipidemia, dyslipoproteinemia, or hypertension.

14. A method for treating or inhibiting a metabolic disorder in a patient in need thereof, the method comprising administering a composition comprising *Turicibacter sanguinis* to the patient's gut to treat or inhibit the metabolic disorder, wherein at least 50% of the bacteria in the composition are *Turicibacter sanguinis*.

15. The method of claim 14, wherein the composition comprises bacteria consisting of *Turicibacter sanguinis*.

16. The method of claim 14, further comprising administering a serotonin receptor agonist.

17. The method of claim 16, wherein the serotonin receptor agonist is 5-HT, psilocybin, psilocin, N,N-dimethyltryptamine, 5-methoxy-N,N-dimethyltryptamine, bufotenin, lysergic acid diethylamide, ergine (LSA), mescaline, 2,5-dimethoxy-4-bromophenethylamine, 25I-NBOMe, 3,4-methylenedioxyamphetamine, or 2,5-dimethoxy-4-methylamphetamine.

18. The method of claim 14, wherein the metabolic disorder is type II diabetes, impaired glucose tolerance, insulin resistance, obesity, fatty liver, non-alcoholic steatohepatitis, hyperlipidemia, steatosis-induced liver injury, nonalcoholic fatty liver disease, hepatic steatosis, or dyslipidemia.

19. The method of claim 14, further comprising conjointly administering a selective serotonin reuptake inhibitor therapy to the patient.

20. The method of claim 14, wherein the patient is receiving conjoint therapy with a selective serotonin reuptake inhibitor therapy.

21. A method of administering a composition comprising *Turicibacter sanguinis* to a patient's gut, wherein the patient is receiving treatment with a selective serotonin reuptake inhibitor, and wherein at least 50% of the bacteria in the composition are *Turicibacter sanguinis*.

22. The method of claim 21, wherein the selective serotonin reuptake inhibitor is citalopram, escitalopram, fluoxetine, fluvoxamine, paroxetine, sertraline, dapoxetine, indalpine, zimelidine, alaproclate, centpropazine, cericlamine, femoxetine, ifoxetine, omiloxetine, panuramine, pirandamine, or seproxetine.

* * * * *